(12) United States Patent
Davydov et al.

(10) Patent No.: US 12,307,082 B2
(45) Date of Patent: May 20, 2025

(54) SCROLLABLE SET OF CONTENT ITEMS WITH LOCKING FEATURE

(71) Applicant: Apple Inc., Cupertino, CA (US)

(72) Inventors: Anton M Davydov, Gilroy, CA (US); Benjamin T Christie, Campbell, CA (US); Wyatt Mitchell, San Francisco, CA (US); Allison Styer, San Francisco, CA (US); Alden M Haley, Campbell, CA (US); Per Lindgren, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/175,565

(22) Filed: Oct. 30, 2018

(65) Prior Publication Data

US 2019/0258373 A1  Aug. 22, 2019

Related U.S. Application Data

(60) Provisional application No. 62/633,333, filed on Feb. 21, 2018.

(51) Int. Cl.
  *G06F 3/0485*    (2022.01)
  *G06F 3/0482*    (2013.01)
  *G06F 3/04883*   (2022.01)

(52) U.S. Cl.
  CPC .......... *G06F 3/0485* (2013.01); *G06F 3/0482* (2013.01); *G06F 3/04883* (2013.01); *G06F 2203/04803* (2013.01)

(58) Field of Classification Search
  CPC .. G06F 3/0485; G06F 3/0482; G06F 3/04883; G06F 2203/04803; G06F 3/0488; G06F 3/0483; G06F 40/114
  See application file for complete search history.

(56) References Cited

U.S. PATENT DOCUMENTS

| 2,718,550 A | 9/1955 | Hoyt et al. |
| 4,672,677 A | 6/1987 | Yamakawa |
| (Continued) | | |

FOREIGN PATENT DOCUMENTS

| AU | 2009255409 B2 | 7/2012 |
| AU | 2016100476 A4 | 5/2016 |
| (Continued) | | |

OTHER PUBLICATIONS

Advisory Action received for U.S. Appl. No. 15/167,801, mailed on Feb. 16, 2018, 4 pages.

(Continued)

*Primary Examiner* — Kenny Nguyen
(74) *Attorney, Agent, or Firm* — Kubota & Basol LLP

(57) ABSTRACT

The present disclosure generally relates to displaying content. The method includes displaying a portion of content and while displaying the portion of the content, detecting first movement that includes movement in a first direction. In response to detecting the first movement, the method includes scrolling the content to reveal a second portion of the content that was not displayed. After scrolling the content to reveal the second portion of the content, the method includes detecting a second movement. In response to detecting the second movement, in accordance with a determination that the scrolling of the content met content locking criteria, the methods includes maintaining display of the content without displaying a second content, and in accordance with a determination that the scrolling of the content did not meet the content locking criteria, the method includes switching from displaying the content to displaying the second content.

51 Claims, 52 Drawing Sheets

(56) References Cited

U.S. PATENT DOCUMENTS

| | | |
|---|---|---|
| 5,029,223 A | 7/1991 | Fujisaki |
| 5,483,261 A | 1/1996 | Yasutake |
| 5,488,204 A | 1/1996 | Mead et al. |
| 5,585,866 A | 12/1996 | Miller et al. |
| 5,596,373 A | 1/1997 | White et al. |
| 5,621,456 A | 4/1997 | Florin et al. |
| 5,677,708 A | 10/1997 | Matthews et al. |
| 5,818,439 A | 10/1998 | Nagasaka et al. |
| 5,825,352 A | 10/1998 | Bisset et al. |
| 5,835,079 A | 11/1998 | Shieh |
| 5,880,411 A | 3/1999 | Gillespie et al. |
| 5,886,690 A | 3/1999 | Pond et al. |
| 5,926,230 A | 7/1999 | Niijima et al. |
| 6,021,320 A | 2/2000 | Bickford et al. |
| 6,028,600 A | 2/2000 | Rosin et al. |
| 6,049,333 A | 4/2000 | Lajoie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,405,371 B1 | 6/2002 | Oosterhout et al. |
| 6,487,722 B1 | 11/2002 | Okura et al. |
| 6,570,557 B1 | 5/2003 | Westerman et al. |
| 6,628,304 B2 | 9/2003 | Mitchell et al. |
| 6,677,932 B1 | 1/2004 | Westerman |
| 6,690,387 B2 | 2/2004 | Zimmerman et al. |
| 6,745,391 B1 | 6/2004 | Macrae et al. |
| 6,909,837 B1 | 6/2005 | Unger |
| 6,928,433 B2 | 8/2005 | Goodman et al. |
| 7,015,894 B2 | 3/2006 | Morohoshi |
| 7,039,879 B2 | 5/2006 | Bergsten et al. |
| 7,103,906 B1 | 9/2006 | Katz et al. |
| 7,134,089 B2 | 11/2006 | Celik et al. |
| 7,184,064 B2 | 2/2007 | Zimmerman et al. |
| 7,213,255 B2 | 5/2007 | Markel et al. |
| 7,293,275 B1 | 11/2007 | Krieger et al. |
| 7,324,953 B1 | 1/2008 | Murphy |
| 7,330,192 B2 | 2/2008 | Brunner et al. |
| 7,596,761 B2 | 9/2009 | Lemay et al. |
| 7,614,008 B2 | 11/2009 | Ording |
| 7,631,278 B2 | 12/2009 | Miksovsky et al. |
| 7,633,076 B2 | 12/2009 | Huppi et al. |
| 7,636,897 B2 | 12/2009 | Koralski et al. |
| 7,649,526 B2 | 1/2010 | Ording et al. |
| 7,650,569 B1 | 1/2010 | Allen et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,665,022 B1 | 2/2010 | Bednarz, Jr. |
| 7,694,231 B2 | 4/2010 | Kocienda et al. |
| 7,712,051 B2 | 5/2010 | Chadzelek et al. |
| 7,783,892 B2 | 8/2010 | Russell et al. |
| 7,810,043 B2 | 10/2010 | Ostojic et al. |
| 7,814,023 B1 | 10/2010 | Rao et al. |
| 7,827,483 B2 | 11/2010 | Unbedacht et al. |
| 7,836,475 B2 | 11/2010 | Angiolillo et al. |
| 7,844,914 B2 | 11/2010 | Andre et al. |
| 7,849,487 B1 | 12/2010 | Vosseller |
| 7,856,605 B2 | 12/2010 | Ording et al. |
| 7,917,477 B2 | 3/2011 | Hutson et al. |
| 7,956,846 B2 | 6/2011 | Ording et al. |
| 7,957,762 B2 | 6/2011 | Herz et al. |
| 7,970,379 B2 | 6/2011 | White et al. |
| 8,006,002 B2 | 8/2011 | Kalayjian et al. |
| 8,026,805 B1 | 9/2011 | Rowe |
| 8,082,523 B2 | 12/2011 | Forstall et al. |
| 8,094,132 B1 | 1/2012 | Frischling et al. |
| 8,115,731 B2 | 2/2012 | Varanda |
| 8,145,617 B1 | 3/2012 | Verstak et al. |
| 8,170,931 B2 | 5/2012 | Ross et al. |
| 8,205,240 B2 | 6/2012 | Ansari et al. |
| 8,239,784 B2 | 8/2012 | Hotelling et al. |
| 8,279,180 B2 | 10/2012 | Hotelling et al. |
| 8,291,452 B1 | 10/2012 | Yong et al. |
| 8,299,889 B2 | 10/2012 | Kumar et al. |
| 8,301,484 B1 | 10/2012 | Kumar |
| 8,312,484 B1 | 11/2012 | Mccarty et al. |
| 8,312,486 B1 | 11/2012 | Briggs et al. |
| 8,316,394 B2 | 11/2012 | Yates |
| 8,325,160 B2 | 12/2012 | St. Pierre et al. |
| 8,346,798 B2 | 1/2013 | Spiegelman et al. |
| 8,370,874 B1 | 2/2013 | Chang et al. |
| 8,381,135 B2 | 2/2013 | Hotelling et al. |
| 8,386,588 B1 | 2/2013 | Cooley |
| 8,407,737 B1 | 3/2013 | Ellis |
| 8,416,217 B1 | 4/2013 | Eriksson et al. |
| 8,418,202 B2 | 4/2013 | Ahmad-taylor |
| 8,424,048 B1 | 4/2013 | Lyren et al. |
| 8,479,122 B2 | 7/2013 | Hotelling et al. |
| 8,495,499 B1 | 7/2013 | Denise |
| 8,516,063 B2 | 8/2013 | Fletcher |
| 8,516,525 B1 | 8/2013 | Jerding et al. |
| 8,560,398 B1 | 10/2013 | Few et al. |
| 8,584,165 B1 | 11/2013 | Kane et al. |
| 8,607,163 B2 | 12/2013 | Plummer |
| 8,607,268 B2 | 12/2013 | Migos |
| 8,613,015 B2 | 12/2013 | Gordon et al. |
| 8,613,023 B2 | 12/2013 | Narahara et al. |
| 8,625,974 B1 | 1/2014 | Pinson |
| 8,674,958 B1 | 3/2014 | Kravets et al. |
| 8,683,362 B2 | 3/2014 | Shiplacoff et al. |
| 8,683,517 B2 | 3/2014 | Carpenter et al. |
| 8,730,190 B2 | 5/2014 | Moloney |
| 8,742,885 B2 | 6/2014 | Brodersen et al. |
| 8,754,862 B2 | 6/2014 | Zaliva |
| 8,762,852 B2 | 6/2014 | Davis et al. |
| 8,769,408 B2 | 7/2014 | Madden et al. |
| 8,782,706 B2 | 7/2014 | Ellis |
| 8,850,471 B2 | 9/2014 | Kilar et al. |
| 8,850,490 B1 | 9/2014 | Thomas et al. |
| 8,869,207 B1 | 10/2014 | Earle |
| 8,887,202 B2 | 11/2014 | Hunter et al. |
| 8,930,839 B2 | 1/2015 | He et al. |
| 8,952,987 B2 | 2/2015 | Momeyer et al. |
| 8,963,847 B2 | 2/2015 | Hunt |
| 8,983,950 B2 | 3/2015 | Askey et al. |
| 8,988,356 B2 | 3/2015 | Tseng |
| 8,990,857 B2 | 3/2015 | Yong et al. |
| 9,007,322 B1 | 4/2015 | Young |
| 9,066,146 B2 | 6/2015 | Suh et al. |
| 9,081,421 B1 * | 7/2015 | Lai .................. G06F 3/017 |
| 9,092,057 B2 | 7/2015 | Varela et al. |
| 9,116,569 B2 | 8/2015 | Stacy et al. |
| 9,118,967 B2 | 8/2015 | Sirpal et al. |
| 9,129,656 B2 | 9/2015 | Prather et al. |
| 9,141,200 B2 | 9/2015 | Bernstein et al. |
| 9,196,309 B2 | 11/2015 | Schultz et al. |
| 9,214,290 B2 | 12/2015 | Xie et al. |
| 9,215,273 B2 | 12/2015 | Jonnala et al. |
| 9,219,634 B1 | 12/2015 | Morse et al. |
| 9,235,317 B2 | 1/2016 | Matas et al. |
| 9,241,121 B2 | 1/2016 | Rudolph |
| 9,244,600 B2 | 1/2016 | Mcintosh et al. |
| 9,247,014 B1 | 1/2016 | Rao |
| 9,247,174 B2 | 1/2016 | Sirpal et al. |
| 9,285,977 B1 * | 3/2016 | Greenberg ............ G06F 3/0483 |
| 9,319,727 B2 | 4/2016 | Phipps et al. |
| 9,348,458 B2 | 5/2016 | Hotelling et al. |
| 9,357,250 B1 | 5/2016 | Newman et al. |
| 9,380,343 B2 | 6/2016 | Webster et al. |
| 9,414,108 B2 | 8/2016 | Sirpal et al. |
| 9,454,288 B2 | 9/2016 | Raffle et al. |
| 9,509,798 B1 | 11/2016 | Thomas et al. |
| 9,514,476 B2 | 12/2016 | Kay et al. |
| 9,532,111 B1 | 12/2016 | Christie et al. |
| 9,538,310 B2 | 1/2017 | Fjeldsoe-Nielsen et al. |
| 9,542,060 B1 | 1/2017 | Brenner et al. |
| 9,560,399 B2 | 1/2017 | Kaya et al. |
| 9,575,944 B2 | 2/2017 | Neil et al. |
| 9,591,339 B1 | 3/2017 | Christie et al. |
| 9,600,159 B2 | 3/2017 | Lawson et al. |
| 9,602,566 B1 | 3/2017 | Lewis et al. |
| 9,639,241 B2 | 5/2017 | Penha et al. |
| 9,652,118 B2 | 5/2017 | Hill et al. |
| 9,652,448 B2 | 5/2017 | Pasquero et al. |

(56) References Cited

U.S. PATENT DOCUMENTS

| | | |
|---|---|---|
| 9,658,740 B2 | 5/2017 | Chaudhri |
| 9,774,917 B1 | 9/2017 | Christie et al. |
| 9,792,018 B2 | 10/2017 | Van Os et al. |
| 9,807,462 B2 | 10/2017 | Wood |
| 9,864,508 B2 | 1/2018 | Dixon et al. |
| 9,864,509 B2 | 1/2018 | Howard et al. |
| 9,871,905 B1 | 1/2018 | Habiger et al. |
| 9,913,142 B2 | 3/2018 | Folse et al. |
| 9,933,937 B2 | 4/2018 | Lemay et al. |
| 9,940,454 B2 | 4/2018 | Richardson et al. |
| 9,973,800 B2 | 5/2018 | Yellin et al. |
| 9,992,025 B2 | 6/2018 | Mahaffey et al. |
| 10,019,142 B2 | 7/2018 | Van Os et al. |
| 10,025,499 B2 | 7/2018 | Howard et al. |
| 10,079,872 B1 | 9/2018 | Thomas et al. |
| 10,091,558 B2 | 10/2018 | Christie et al. |
| 10,114,631 B2 | 10/2018 | Shin |
| 10,116,996 B1 | 10/2018 | Christie et al. |
| 10,126,904 B2 | 11/2018 | Agnetta et al. |
| 10,168,871 B2 | 1/2019 | Wallters et al. |
| 10,200,761 B1 | 2/2019 | Christie et al. |
| 10,205,985 B2 | 2/2019 | Lue-sang et al. |
| 10,209,866 B2 | 2/2019 | Johnston et al. |
| 10,237,599 B1 | 3/2019 | Gravino et al. |
| 10,275,148 B2* | 4/2019 | Matas ............... G06F 3/0483 |
| 10,282,088 B2 | 5/2019 | Kim et al. |
| 10,303,422 B1 | 5/2019 | Woo et al. |
| 10,405,015 B2 | 9/2019 | Kite et al. |
| 10,521,188 B1 | 12/2019 | Christie et al. |
| 10,551,995 B1 | 2/2020 | Ho et al. |
| 10,552,470 B2 | 2/2020 | Todd et al. |
| 10,564,823 B1* | 2/2020 | Dennis ............... H04L 67/26 |
| 10,601,808 B1 | 3/2020 | Nijim et al. |
| 10,606,539 B2 | 3/2020 | Bernstein et al. |
| 10,631,042 B2 | 4/2020 | Zerr et al. |
| 10,650,052 B2 | 5/2020 | Van Os et al. |
| 10,795,490 B2 | 10/2020 | Chaudhri et al. |
| 10,827,007 B2 | 11/2020 | Kode et al. |
| 11,062,358 B1 | 7/2021 | Lewis et al. |
| 11,461,397 B2 | 10/2022 | Van Os et al. |
| 11,843,838 B2 | 12/2023 | Ellingford et al. |
| 11,863,837 B2 | 1/2024 | Payne |
| 11,962,836 B2 | 4/2024 | Domm et al. |
| 2002/0015024 A1 | 2/2002 | Westerman et al. |
| 2002/0026637 A1 | 2/2002 | Markel et al. |
| 2002/0029170 A1 | 3/2002 | Gasser et al. |
| 2002/0042920 A1 | 4/2002 | Thomas et al. |
| 2002/0060750 A1 | 5/2002 | Istvan et al. |
| 2002/0085045 A1 | 7/2002 | Vong et al. |
| 2002/0100063 A1 | 7/2002 | Herigstad et al. |
| 2002/0112239 A1 | 8/2002 | Goldman |
| 2002/0113816 A1 | 8/2002 | Mitchell et al. |
| 2002/0144269 A1 | 10/2002 | Connelly |
| 2002/0171686 A1 | 11/2002 | Kamen et al. |
| 2002/0178446 A1 | 11/2002 | Sie et al. |
| 2003/0001907 A1 | 1/2003 | Bergsten et al. |
| 2003/0005445 A1 | 1/2003 | Schein et al. |
| 2003/0009757 A1 | 1/2003 | Kikinis |
| 2003/0011641 A1 | 1/2003 | Totman et al. |
| 2003/0013483 A1 | 1/2003 | Ausems et al. |
| 2003/0088872 A1 | 5/2003 | Maissel et al. |
| 2003/0093790 A1 | 5/2003 | Logan et al. |
| 2003/0126600 A1 | 7/2003 | Heuvelman |
| 2003/0149628 A1 | 8/2003 | Abbosh et al. |
| 2003/0158950 A1 | 8/2003 | Sako |
| 2003/0167471 A1 | 9/2003 | Roth et al. |
| 2003/0177075 A1 | 9/2003 | Burke |
| 2003/0177498 A1 | 9/2003 | Ellis et al. |
| 2003/0192060 A1 | 10/2003 | Levy |
| 2003/0221191 A1 | 11/2003 | Khusheim |
| 2003/0228130 A1 | 12/2003 | Tanikawa et al. |
| 2003/0234804 A1 | 12/2003 | Parker et al. |
| 2004/0019497 A1 | 1/2004 | Volk et al. |
| 2004/0046801 A1 | 3/2004 | Lin et al. |
| 2004/0070573 A1 | 4/2004 | Graham |
| 2004/0088328 A1 | 5/2004 | Cook et al. |
| 2004/0090463 A1 | 5/2004 | Celik et al. |
| 2004/0093262 A1 | 5/2004 | Weston et al. |
| 2004/0133909 A1 | 7/2004 | Ma |
| 2004/0139401 A1 | 7/2004 | Unbedacht et al. |
| 2004/0161151 A1 | 8/2004 | Iwayama et al. |
| 2004/0168184 A1 | 8/2004 | Steenkamp et al. |
| 2004/0193421 A1 | 9/2004 | Blass |
| 2004/0252120 A1 | 12/2004 | Hunleth et al. |
| 2004/0254883 A1 | 12/2004 | Kondrk et al. |
| 2004/0254958 A1 | 12/2004 | Volk |
| 2004/0267715 A1 | 12/2004 | Polson et al. |
| 2005/0012599 A1 | 1/2005 | Dematteo |
| 2005/0071761 A1 | 3/2005 | Kontio |
| 2005/0071785 A1 | 3/2005 | Chadzelek et al. |
| 2005/0076363 A1 | 4/2005 | Dukes et al. |
| 2005/0091254 A1 | 4/2005 | Stabb et al. |
| 2005/0091597 A1 | 4/2005 | Ackley |
| 2005/0134625 A1 | 6/2005 | Kubota |
| 2005/0162398 A1 | 7/2005 | Eliasson et al. |
| 2005/0162402 A1 | 7/2005 | Watanachote |
| 2005/0186988 A1 | 8/2005 | Lim et al. |
| 2005/0190059 A1 | 9/2005 | Wehrenberg |
| 2005/0223335 A1* | 10/2005 | Ichikawa ............... G06F 3/0481 715/801 |
| 2005/0235316 A1 | 10/2005 | Ahmad-taylor |
| 2005/0257166 A1 | 11/2005 | Tu |
| 2005/0283358 A1 | 12/2005 | Stephanick et al. |
| 2006/0017692 A1 | 1/2006 | Wehrenberg et al. |
| 2006/0020904 A1 | 1/2006 | Aaltonen et al. |
| 2006/0026521 A1 | 2/2006 | Hotelling et al. |
| 2006/0029374 A1 | 2/2006 | Park |
| 2006/0031872 A1 | 2/2006 | Hsiao et al. |
| 2006/0033724 A1 | 2/2006 | Chaudhri et al. |
| 2006/0053449 A1 | 3/2006 | Gutta |
| 2006/0053470 A1 | 3/2006 | Colter et al. |
| 2006/0069998 A1 | 3/2006 | Artman et al. |
| 2006/0071905 A1 | 4/2006 | Varanda |
| 2006/0080352 A1 | 4/2006 | Boubez et al. |
| 2006/0097991 A1 | 5/2006 | Hotelling et al. |
| 2006/0107304 A1 | 5/2006 | Cleron et al. |
| 2006/0112346 A1 | 5/2006 | Miksovsky et al. |
| 2006/0112352 A1 | 5/2006 | Tseng et al. |
| 2006/0117267 A1 | 6/2006 | Koralski et al. |
| 2006/0120624 A1 | 6/2006 | Jojic et al. |
| 2006/0195479 A1 | 8/2006 | Spiegelman et al. |
| 2006/0195512 A1 | 8/2006 | Rogers et al. |
| 2006/0197753 A1 | 9/2006 | Hotelling |
| 2006/0224987 A1 | 10/2006 | Caffarelli |
| 2006/0236847 A1 | 10/2006 | Withop |
| 2006/0248113 A1 | 11/2006 | Leffert et al. |
| 2006/0265637 A1 | 11/2006 | Marriott et al. |
| 2006/0271968 A1 | 11/2006 | Zellner |
| 2006/0282856 A1 | 12/2006 | Errico et al. |
| 2006/0288848 A1 | 12/2006 | Gould et al. |
| 2006/0294545 A1 | 12/2006 | Morris et al. |
| 2007/0005569 A1 | 1/2007 | Hurst-hiller et al. |
| 2007/0009229 A1 | 1/2007 | Liu |
| 2007/0011702 A1 | 1/2007 | Vaysman |
| 2007/0024594 A1 | 2/2007 | Sakata et al. |
| 2007/0028267 A1 | 2/2007 | Ostojic et al. |
| 2007/0038957 A1 | 2/2007 | White |
| 2007/0073596 A1 | 3/2007 | Alexander et al. |
| 2007/0092204 A1 | 4/2007 | Wagner et al. |
| 2007/0094602 A1 | 4/2007 | Murabayashi |
| 2007/0150802 A1 | 6/2007 | Wan et al. |
| 2007/0150918 A1 | 6/2007 | Carpenter et al. |
| 2007/0154163 A1 | 7/2007 | Cordray |
| 2007/0157220 A1 | 7/2007 | Cordray et al. |
| 2007/0157249 A1 | 7/2007 | Cordray et al. |
| 2007/0168413 A1 | 7/2007 | Barletta et al. |
| 2007/0186254 A1 | 8/2007 | Tsutsui et al. |
| 2007/0199035 A1 | 8/2007 | Schwartz et al. |
| 2007/0204057 A1 | 8/2007 | Shaver et al. |
| 2007/0220580 A1 | 9/2007 | Putterman et al. |
| 2007/0229465 A1 | 10/2007 | Sakai et al. |
| 2007/0233880 A1 | 10/2007 | Nieh et al. |
| 2007/0244902 A1 | 10/2007 | Seide et al. |
| 2007/0248317 A1 | 10/2007 | Bahn |

(56) References Cited

U.S. PATENT DOCUMENTS

| | | |
|---|---|---|
| 2008/0046928 A1 | 2/2008 | Poling et al. |
| 2008/0046931 A1 | 2/2008 | Corbett et al. |
| 2008/0059884 A1 | 3/2008 | Ellis et al. |
| 2008/0065989 A1 | 3/2008 | Conroy et al. |
| 2008/0066010 A1 | 3/2008 | Brodersen et al. |
| 2008/0077562 A1 | 3/2008 | Schleppe |
| 2008/0092168 A1 | 4/2008 | Logan et al. |
| 2008/0092173 A1 | 4/2008 | Shannon et al. |
| 2008/0111822 A1 | 5/2008 | Horowitz et al. |
| 2008/0120668 A1 | 5/2008 | Yau |
| 2008/0127281 A1 | 5/2008 | Van et al. |
| 2008/0155475 A1 | 6/2008 | Duhig |
| 2008/0163053 A1 | 7/2008 | Hwang et al. |
| 2008/0189740 A1 | 8/2008 | Carpenter et al. |
| 2008/0189742 A1 | 8/2008 | Ellis et al. |
| 2008/0208844 A1 | 8/2008 | Jenkins |
| 2008/0216020 A1 | 9/2008 | Plummer |
| 2008/0222677 A1 | 9/2008 | Woo et al. |
| 2008/0235331 A1 | 9/2008 | Melamed et al. |
| 2008/0235588 A1 | 9/2008 | Gonze et al. |
| 2008/0243817 A1 | 10/2008 | Chan et al. |
| 2008/0250312 A1 | 10/2008 | Curtis |
| 2008/0260252 A1 | 10/2008 | Borgaonkar et al. |
| 2008/0270886 A1 | 10/2008 | Gossweiler et al. |
| 2008/0276278 A1 | 11/2008 | Krieger et al. |
| 2008/0276279 A1 | 11/2008 | Gossweiler et al. |
| 2008/0301260 A1 | 12/2008 | Goldeen et al. |
| 2008/0301579 A1 | 12/2008 | Jonasson et al. |
| 2008/0301734 A1 | 12/2008 | Goldeen et al. |
| 2008/0307343 A1 | 12/2008 | Robert et al. |
| 2008/0307458 A1 | 12/2008 | Kim et al. |
| 2008/0307459 A1 | 12/2008 | Migos |
| 2008/0320391 A1 | 12/2008 | Lemay et al. |
| 2008/0320532 A1 | 12/2008 | Lee |
| 2009/0055385 A1 | 2/2009 | Jeon et al. |
| 2009/0063521 A1 | 3/2009 | Bull et al. |
| 2009/0063975 A1 | 3/2009 | Rottler et al. |
| 2009/0089837 A1 | 4/2009 | Momosaki |
| 2009/0094662 A1 | 4/2009 | Chang et al. |
| 2009/0106110 A1 | 4/2009 | Stannard et al. |
| 2009/0119754 A1 | 5/2009 | Schubert |
| 2009/0158325 A1 | 6/2009 | Johnson |
| 2009/0158326 A1 | 6/2009 | Hunt et al. |
| 2009/0161868 A1 | 6/2009 | Chaudhry |
| 2009/0164944 A1 | 6/2009 | Webster et al. |
| 2009/0165054 A1 | 6/2009 | Rudolph |
| 2009/0174679 A1 | 7/2009 | Westerman |
| 2009/0177301 A1 | 7/2009 | Hayes |
| 2009/0177989 A1 | 7/2009 | Ma et al. |
| 2009/0178083 A1 | 7/2009 | Carr et al. |
| 2009/0228491 A1 | 9/2009 | Malik |
| 2009/0228807 A1 | 9/2009 | Lemay |
| 2009/0228919 A1 | 9/2009 | Zott et al. |
| 2009/0239587 A1 | 9/2009 | Negron et al. |
| 2009/0256807 A1 | 10/2009 | Nurmi |
| 2009/0259957 A1 | 10/2009 | Slocum et al. |
| 2009/0278916 A1 | 11/2009 | Ito |
| 2009/0282444 A1 | 11/2009 | Laksono et al. |
| 2009/0288079 A1 | 11/2009 | Zuber et al. |
| 2009/0313100 A1 | 12/2009 | Ingleshwar |
| 2009/0322962 A1 | 12/2009 | Weeks |
| 2009/0327952 A1 | 12/2009 | Karas et al. |
| 2010/0009629 A1 | 1/2010 | Jung et al. |
| 2010/0009719 A1 | 1/2010 | Oh et al. |
| 2010/0017713 A1 | 1/2010 | Igarashi |
| 2010/0031162 A1 | 2/2010 | Wiser et al. |
| 2010/0046608 A1 | 2/2010 | Mccrossan et al. |
| 2010/0053220 A1 | 3/2010 | Ozawa et al. |
| 2010/0053432 A1 | 3/2010 | Cheng et al. |
| 2010/0057696 A1 | 3/2010 | Miyazawa et al. |
| 2010/0064313 A1 | 3/2010 | Beyabani |
| 2010/0080163 A1 | 4/2010 | Krishnamoorthi et al. |
| 2010/0083181 A1 | 4/2010 | Matsushima et al. |
| 2010/0095240 A1 | 4/2010 | Shiplacoff et al. |
| 2010/0100899 A1 | 4/2010 | Bradbury et al. |
| 2010/0104269 A1 | 4/2010 | Prestenback et al. |
| 2010/0115592 A1 | 5/2010 | Belz et al. |
| 2010/0121714 A1 | 5/2010 | Bryant et al. |
| 2010/0146442 A1 | 6/2010 | Nagasaka et al. |
| 2010/0153881 A1 | 6/2010 | Dinn |
| 2010/0153999 A1 | 6/2010 | Yates |
| 2010/0159898 A1 | 6/2010 | Krzyzanowski et al. |
| 2010/0162172 A1 | 6/2010 | Aroner |
| 2010/0194998 A1 | 8/2010 | Lee et al. |
| 2010/0198822 A1 | 8/2010 | Glennon et al. |
| 2010/0205628 A1 | 8/2010 | Davis et al. |
| 2010/0211636 A1 | 8/2010 | Starkenburg et al. |
| 2010/0211884 A1 | 8/2010 | Kashyap et al. |
| 2010/0223646 A1 | 9/2010 | Goldeen et al. |
| 2010/0229194 A1 | 9/2010 | Blanchard et al. |
| 2010/0235744 A1 | 9/2010 | Schultz et al. |
| 2010/0251304 A1 | 9/2010 | Donoghue et al. |
| 2010/0257005 A1 | 10/2010 | Phenner et al. |
| 2010/0269145 A1 | 10/2010 | Ingrassia et al. |
| 2010/0275143 A1 | 10/2010 | Fu et al. |
| 2010/0277337 A1 | 11/2010 | Brodersen et al. |
| 2010/0293190 A1 | 11/2010 | Kaiser et al. |
| 2010/0293586 A1 | 11/2010 | Simoes et al. |
| 2010/0299606 A1 | 11/2010 | Morita |
| 2010/0312824 A1 | 12/2010 | Smith et al. |
| 2010/0325660 A1 | 12/2010 | Holden |
| 2010/0333142 A1 | 12/2010 | Busse et al. |
| 2010/0333143 A1 | 12/2010 | Civanlar et al. |
| 2011/0004831 A1 | 1/2011 | Steinberg et al. |
| 2011/0033168 A1 | 2/2011 | Tyer |
| 2011/0047513 A1 | 2/2011 | Onogi et al. |
| 2011/0052146 A1 | 3/2011 | Murthy et al. |
| 2011/0054649 A1 | 3/2011 | Sarkis et al. |
| 2011/0055762 A1 | 3/2011 | Jung et al. |
| 2011/0055870 A1 | 3/2011 | Yum et al. |
| 2011/0071977 A1 | 3/2011 | Nakajima et al. |
| 2011/0078739 A1 | 3/2011 | Grad |
| 2011/0080935 A1 | 4/2011 | Kim et al. |
| 2011/0087992 A1 | 4/2011 | Wang et al. |
| 2011/0090402 A1 | 4/2011 | Huntington et al. |
| 2011/0093415 A1 | 4/2011 | Rhee et al. |
| 2011/0099519 A1 | 4/2011 | Ma et al. |
| 2011/0107220 A1 | 5/2011 | Perlman |
| 2011/0119710 A1 | 5/2011 | Jang et al. |
| 2011/0119715 A1 | 5/2011 | Chang et al. |
| 2011/0122315 A1 | 5/2011 | Schweiger et al. |
| 2011/0131607 A1 | 6/2011 | Thomas et al. |
| 2011/0154194 A1 | 6/2011 | Mathai et al. |
| 2011/0154305 A1 | 6/2011 | Leroux et al. |
| 2011/0157029 A1 | 6/2011 | Tseng |
| 2011/0162022 A1 | 6/2011 | Xia |
| 2011/0163971 A1 | 7/2011 | Wagner et al. |
| 2011/0167339 A1 | 7/2011 | Lemay |
| 2011/0175930 A1 | 7/2011 | Hwang et al. |
| 2011/0179388 A1 | 7/2011 | Fleizach et al. |
| 2011/0179453 A1 | 7/2011 | Poniatowski |
| 2011/0197153 A1 | 8/2011 | King et al. |
| 2011/0209177 A1 | 8/2011 | Sela et al. |
| 2011/0218948 A1 | 9/2011 | De et al. |
| 2011/0231280 A1 | 9/2011 | Farah |
| 2011/0231823 A1 | 9/2011 | Fryc et al. |
| 2011/0231872 A1 | 9/2011 | Gharachorloo et al. |
| 2011/0231878 A1 | 9/2011 | Hunter et al. |
| 2011/0246332 A1 | 10/2011 | Alcodray et al. |
| 2011/0281517 A1 | 11/2011 | Ukkadam |
| 2011/0283304 A1 | 11/2011 | Roberts et al. |
| 2011/0283333 A1 | 11/2011 | Ukkadam |
| 2011/0289064 A1 | 11/2011 | Lebeau et al. |
| 2011/0289317 A1 | 11/2011 | Darapu et al. |
| 2011/0289419 A1 | 11/2011 | Yu et al. |
| 2011/0289421 A1 | 11/2011 | Jordan et al. |
| 2011/0289452 A1 | 11/2011 | Jordan et al. |
| 2011/0289531 A1 | 11/2011 | Moonka et al. |
| 2011/0289534 A1 | 11/2011 | Jordan et al. |
| 2011/0296351 A1 | 12/2011 | Ewing et al. |
| 2011/0302532 A1 | 12/2011 | Missig |
| 2011/0307631 A1 | 12/2011 | Park et al. |
| 2011/0312278 A1 | 12/2011 | Matsushita et al. |
| 2011/0314497 A1 | 12/2011 | Warrick et al. |

(56) References Cited

U.S. PATENT DOCUMENTS

| | | |
|---|---|---|
| 2011/0321072 A1 | 12/2011 | Patterson et al. |
| 2012/0019674 A1 | 1/2012 | Ohnishi et al. |
| 2012/0036552 A1 | 2/2012 | Dare et al. |
| 2012/0042245 A1 | 2/2012 | Askey et al. |
| 2012/0042343 A1 | 2/2012 | Laligand et al. |
| 2012/0053887 A1 | 3/2012 | Nurmi |
| 2012/0054178 A1 | 3/2012 | Tran et al. |
| 2012/0054642 A1 | 3/2012 | Balsiger et al. |
| 2012/0054679 A1 | 3/2012 | Ma et al. |
| 2012/0054797 A1 | 3/2012 | Skog et al. |
| 2012/0059910 A1 | 3/2012 | Cassidy |
| 2012/0060092 A1 | 3/2012 | Hill et al. |
| 2012/0064204 A1 | 3/2012 | Davila et al. |
| 2012/0084136 A1 | 4/2012 | Seth et al. |
| 2012/0093481 A1 | 4/2012 | Mcdowell et al. |
| 2012/0096011 A1 | 4/2012 | Kay et al. |
| 2012/0102573 A1 | 4/2012 | Spooner et al. |
| 2012/0105367 A1 | 5/2012 | Son et al. |
| 2012/0110616 A1 | 5/2012 | Kilar et al. |
| 2012/0110621 A1 | 5/2012 | Gossweiler |
| 2012/0114303 A1 | 5/2012 | Chung et al. |
| 2012/0117584 A1 | 5/2012 | Gordon |
| 2012/0124615 A1 | 5/2012 | Lee |
| 2012/0131615 A1 | 5/2012 | Kobayashi et al. |
| 2012/0139938 A1 | 6/2012 | Khedouri et al. |
| 2012/0141095 A1 | 6/2012 | Schwesinger et al. |
| 2012/0144003 A1 | 6/2012 | Rosenbaum et al. |
| 2012/0158524 A1 | 6/2012 | Hintz et al. |
| 2012/0159543 A1 | 6/2012 | Jin et al. |
| 2012/0166998 A1 | 6/2012 | Cotterill et al. |
| 2012/0173991 A1 | 7/2012 | Roberts et al. |
| 2012/0174157 A1 | 7/2012 | Stinson et al. |
| 2012/0198020 A1 | 8/2012 | Parker et al. |
| 2012/0198336 A1 | 8/2012 | Novotny et al. |
| 2012/0210366 A1 | 8/2012 | Wong et al. |
| 2012/0215684 A1 | 8/2012 | Kidron |
| 2012/0216113 A1 | 8/2012 | Li |
| 2012/0216117 A1 | 8/2012 | Arriola et al. |
| 2012/0216296 A1 | 8/2012 | Kidron |
| 2012/0221498 A1 | 8/2012 | Kaszynski et al. |
| 2012/0222056 A1 | 8/2012 | Donoghue et al. |
| 2012/0233640 A1 | 9/2012 | Odryna et al. |
| 2012/0242704 A1 | 9/2012 | Bamford et al. |
| 2012/0260291 A1 | 10/2012 | Wood |
| 2012/0260293 A1 | 10/2012 | Young et al. |
| 2012/0262371 A1 | 10/2012 | Lee et al. |
| 2012/0262407 A1 | 10/2012 | Hinckley et al. |
| 2012/0266069 A1 | 10/2012 | Moshiri et al. |
| 2012/0272261 A1 | 10/2012 | Reynolds et al. |
| 2012/0284753 A1 | 11/2012 | Roberts et al. |
| 2012/0290933 A1 | 11/2012 | Rajaraman et al. |
| 2012/0291079 A1 | 11/2012 | Gordon et al. |
| 2012/0308143 A1 | 12/2012 | Bellegarda et al. |
| 2012/0311443 A1 | 12/2012 | Chaudhri et al. |
| 2012/0311638 A1 | 12/2012 | Reyna et al. |
| 2012/0317482 A1 | 12/2012 | Barraclough et al. |
| 2012/0323938 A1 | 12/2012 | Skeen et al. |
| 2012/0324504 A1 | 12/2012 | Archer et al. |
| 2012/0327125 A1 | 12/2012 | Kutliroff et al. |
| 2013/0007656 A1 | 1/2013 | Li et al. |
| 2013/0014150 A1 | 1/2013 | Seo et al. |
| 2013/0014159 A1 | 1/2013 | Wiser et al. |
| 2013/0021288 A1 | 1/2013 | Kaerkkaeinen et al. |
| 2013/0024895 A1 | 1/2013 | Yong et al. |
| 2013/0031585 A1 | 1/2013 | Itagaki et al. |
| 2013/0033643 A1 | 2/2013 | Kim et al. |
| 2013/0042271 A1 | 2/2013 | Yellin et al. |
| 2013/0061234 A1 | 3/2013 | Piira et al. |
| 2013/0061267 A1 | 3/2013 | Cansino et al. |
| 2013/0067366 A1 | 3/2013 | Almosnino |
| 2013/0073403 A1 | 3/2013 | Tuchman et al. |
| 2013/0080968 A1 | 3/2013 | Hanson et al. |
| 2013/0083076 A1 | 4/2013 | Liu et al. |
| 2013/0097009 A1 | 4/2013 | Akadiri |
| 2013/0110978 A1 | 5/2013 | Gordon et al. |
| 2013/0124998 A1 | 5/2013 | Pendergast et al. |
| 2013/0132874 A1 | 5/2013 | He et al. |
| 2013/0132966 A1 | 5/2013 | Chanda et al. |
| 2013/0151300 A1 | 6/2013 | Le et al. |
| 2013/0173034 A1 | 7/2013 | Reimann et al. |
| 2013/0174193 A1 | 7/2013 | Yu et al. |
| 2013/0179812 A1 | 7/2013 | Bianrosa et al. |
| 2013/0179995 A1 | 7/2013 | Basile et al. |
| 2013/0198686 A1 | 8/2013 | Kawai et al. |
| 2013/0205312 A1 | 8/2013 | Huang |
| 2013/0212531 A1 | 8/2013 | Yoshida |
| 2013/0227482 A1 | 8/2013 | Thorsander et al. |
| 2013/0247105 A1 | 9/2013 | Jovanovski et al. |
| 2013/0254308 A1 | 9/2013 | Rose et al. |
| 2013/0262431 A1 | 10/2013 | Garner et al. |
| 2013/0262558 A1 | 10/2013 | Wood et al. |
| 2013/0262619 A1 | 10/2013 | Goodwin et al. |
| 2013/0262633 A1 | 10/2013 | Goodwin et al. |
| 2013/0263189 A1 | 10/2013 | Garner |
| 2013/0283154 A1* | 10/2013 | Sasakura ............... G06F 40/106 715/253 |
| 2013/0283168 A1 | 10/2013 | Brown et al. |
| 2013/0283317 A1 | 10/2013 | Guntupalli et al. |
| 2013/0283318 A1 | 10/2013 | Wannamaker |
| 2013/0285937 A1 | 10/2013 | Billings et al. |
| 2013/0290233 A1 | 10/2013 | Ferren et al. |
| 2013/0290848 A1 | 10/2013 | Billings et al. |
| 2013/0291018 A1 | 10/2013 | Billings et al. |
| 2013/0291037 A1 | 10/2013 | Im et al. |
| 2013/0294755 A1 | 11/2013 | Arme et al. |
| 2013/0312044 A1 | 11/2013 | Itagaki |
| 2013/0326499 A1 | 12/2013 | Mowatt et al. |
| 2013/0326554 A1 | 12/2013 | Shkedi |
| 2013/0326561 A1 | 12/2013 | Pandey |
| 2013/0332838 A1 | 12/2013 | Naggar et al. |
| 2013/0332871 A1 | 12/2013 | Bucur et al. |
| 2013/0332960 A1 | 12/2013 | Young et al. |
| 2013/0339877 A1 | 12/2013 | Skeen et al. |
| 2013/0340006 A1 | 12/2013 | Kwan |
| 2013/0346564 A1 | 12/2013 | Warrick et al. |
| 2013/0347044 A1 | 12/2013 | Lee et al. |
| 2014/0006635 A1 | 1/2014 | Braness et al. |
| 2014/0006795 A1 | 1/2014 | Han et al. |
| 2014/0006951 A1 | 1/2014 | Hunter |
| 2014/0012859 A1 | 1/2014 | Heilprin et al. |
| 2014/0013283 A1 | 1/2014 | Matas et al. |
| 2014/0020017 A1 | 1/2014 | Stern et al. |
| 2014/0024341 A1 | 1/2014 | Johan |
| 2014/0028780 A1 | 1/2014 | Croen et al. |
| 2014/0033245 A1 | 1/2014 | Barton et al. |
| 2014/0049692 A1 | 2/2014 | Sirpal et al. |
| 2014/0052683 A1 | 2/2014 | Kirkham et al. |
| 2014/0053116 A1 | 2/2014 | Smith et al. |
| 2014/0053195 A1 | 2/2014 | Sirpal et al. |
| 2014/0059605 A1 | 2/2014 | Sirpal et al. |
| 2014/0059615 A1 | 2/2014 | Sirpal et al. |
| 2014/0059625 A1 | 2/2014 | Dourado et al. |
| 2014/0059635 A1 | 2/2014 | Sirpal et al. |
| 2014/0067425 A1 | 3/2014 | Dudar et al. |
| 2014/0068654 A1 | 3/2014 | Marlow et al. |
| 2014/0071068 A1* | 3/2014 | Shih ............... G06F 3/04883 345/173 |
| 2014/0074454 A1 | 3/2014 | Brown et al. |
| 2014/0075313 A1 | 3/2014 | Bachman et al. |
| 2014/0075316 A1 | 3/2014 | Li |
| 2014/0075394 A1 | 3/2014 | Nawle et al. |
| 2014/0075574 A1 | 3/2014 | Zheng et al. |
| 2014/0082497 A1 | 3/2014 | Chalouhi et al. |
| 2014/0082660 A1 | 3/2014 | Zhang et al. |
| 2014/0088952 A1 | 3/2014 | Fife et al. |
| 2014/0089816 A1 | 3/2014 | Dipersia et al. |
| 2014/0098102 A1 | 4/2014 | Raffle et al. |
| 2014/0101706 A1 | 4/2014 | Kardatzke |
| 2014/0104646 A1 | 4/2014 | Nishiyama |
| 2014/0109204 A1 | 4/2014 | Papillon et al. |
| 2014/0111416 A1 | 4/2014 | Sugiura |
| 2014/0115636 A1 | 4/2014 | Stuckman |
| 2014/0123006 A1 | 5/2014 | Chen et al. |
| 2014/0129232 A1 | 5/2014 | Jones et al. |

(56) References Cited

U.S. PATENT DOCUMENTS

| | | |
|---|---|---|
| 2014/0130097 A1 | 5/2014 | Londero |
| 2014/0136946 A1* | 5/2014 | Matas ................. G06F 3/04842 715/234 |
| 2014/0137029 A1 | 5/2014 | Stephenson et al. |
| 2014/0137030 A1* | 5/2014 | Matas ....................... G06F 3/00 715/784 |
| 2014/0143260 A1 | 5/2014 | Simonson et al. |
| 2014/0143683 A1 | 5/2014 | Underwood et al. |
| 2014/0156792 A1 | 6/2014 | Roberts et al. |
| 2014/0157204 A1 | 6/2014 | Roberts et al. |
| 2014/0157329 A1 | 6/2014 | Roberts et al. |
| 2014/0164966 A1 | 6/2014 | Kim et al. |
| 2014/0168071 A1 | 6/2014 | Ahmed et al. |
| 2014/0171153 A1 | 6/2014 | Kienzle et al. |
| 2014/0172622 A1 | 6/2014 | Baronshin |
| 2014/0172953 A1 | 6/2014 | Blanksteen |
| 2014/0173660 A1 | 6/2014 | Correa et al. |
| 2014/0184471 A1 | 7/2014 | Martynov et al. |
| 2014/0189523 A1* | 7/2014 | Shuttleworth ...... G06F 3/04817 715/741 |
| 2014/0189574 A1 | 7/2014 | Stallings et al. |
| 2014/0189606 A1 | 7/2014 | Shuttleworth et al. |
| 2014/0196064 A1 | 7/2014 | Kennedy et al. |
| 2014/0196069 A1 | 7/2014 | Ahmed et al. |
| 2014/0208268 A1 | 7/2014 | Jimenez |
| 2014/0208360 A1 | 7/2014 | Kardatzke |
| 2014/0219637 A1 | 8/2014 | Mcintosh et al. |
| 2014/0224867 A1 | 8/2014 | Werner et al. |
| 2014/0244751 A1 | 8/2014 | Tseng |
| 2014/0245148 A1 | 8/2014 | Silva et al. |
| 2014/0245186 A1 | 8/2014 | Tseng |
| 2014/0245222 A1 | 8/2014 | Kovacevic et al. |
| 2014/0250465 A1 | 9/2014 | Mulholland et al. |
| 2014/0250479 A1 | 9/2014 | Lee et al. |
| 2014/0253463 A1 | 9/2014 | Hicks |
| 2014/0259074 A1 | 9/2014 | Ansari et al. |
| 2014/0278072 A1 | 9/2014 | Fino et al. |
| 2014/0278940 A1 | 9/2014 | Wade |
| 2014/0280728 A1 | 9/2014 | Szerlip Joyce et al. |
| 2014/0282208 A1 | 9/2014 | Chaudhri |
| 2014/0282636 A1 | 9/2014 | Petander et al. |
| 2014/0282677 A1 | 9/2014 | Mantell et al. |
| 2014/0288686 A1 | 9/2014 | Sant et al. |
| 2014/0289226 A1 | 9/2014 | English et al. |
| 2014/0289751 A1 | 9/2014 | Hsu et al. |
| 2014/0310742 A1 | 10/2014 | Kim |
| 2014/0317653 A1 | 10/2014 | Mlodzinski |
| 2014/0325357 A1 | 10/2014 | Sant et al. |
| 2014/0333530 A1 | 11/2014 | Agnetta et al. |
| 2014/0337607 A1 | 11/2014 | Peterson et al. |
| 2014/0340358 A1 | 11/2014 | Martinoli |
| 2014/0341109 A1 | 11/2014 | Cartmell et al. |
| 2014/0344247 A1 | 11/2014 | Procopio et al. |
| 2014/0344291 A9 | 11/2014 | Simonson et al. |
| 2014/0344294 A1 | 11/2014 | Skeen et al. |
| 2014/0351691 A1 | 11/2014 | Neil et al. |
| 2014/0359598 A1 | 12/2014 | Oliver et al. |
| 2014/0364056 A1 | 12/2014 | Belk et al. |
| 2014/0365479 A1 | 12/2014 | Lyons et al. |
| 2014/0365481 A1 | 12/2014 | Novosel et al. |
| 2014/0365604 A1 | 12/2014 | Lewis et al. |
| 2014/0365919 A1 | 12/2014 | Shaw et al. |
| 2014/0366040 A1 | 12/2014 | Parker et al. |
| 2014/0366047 A1 | 12/2014 | Thomas et al. |
| 2015/0020127 A1 | 1/2015 | Doshi et al. |
| 2015/0039685 A1 | 2/2015 | Lewis et al. |
| 2015/0046866 A1 | 2/2015 | Shimadate |
| 2015/0067582 A1* | 3/2015 | Donnelly ............... G06F 3/0485 715/784 |
| 2015/0067724 A1 | 3/2015 | Johnson et al. |
| 2015/0074522 A1 | 3/2015 | Harned et al. |
| 2015/0074552 A1 | 3/2015 | Chai et al. |
| 2015/0074603 A1 | 3/2015 | Abe et al. |
| 2015/0082187 A1 | 3/2015 | Wallters et al. |
| 2015/0095460 A1 | 4/2015 | Berger et al. |
| 2015/0095845 A1* | 4/2015 | Chun .................. G06F 3/04886 715/784 |
| 2015/0106856 A1 | 4/2015 | Rankine |
| 2015/0113000 A1 | 4/2015 | Scheer et al. |
| 2015/0113429 A1 | 4/2015 | Edwards et al. |
| 2015/0121408 A1 | 4/2015 | Jacoby et al. |
| 2015/0134653 A1 | 5/2015 | Bayer et al. |
| 2015/0135049 A1 | 5/2015 | Murphy |
| 2015/0135071 A1 | 5/2015 | Glotzer |
| 2015/0150049 A1 | 5/2015 | White |
| 2015/0150066 A1 | 5/2015 | Park et al. |
| 2015/0153571 A1 | 6/2015 | Ballard et al. |
| 2015/0161251 A1 | 6/2015 | Ramanarayanan et al. |
| 2015/0169705 A1 | 6/2015 | Korbecki et al. |
| 2015/0169975 A1 | 6/2015 | Kienzle et al. |
| 2015/0186002 A1 | 7/2015 | Suzuki et al. |
| 2015/0189347 A1 | 7/2015 | Oztaskent et al. |
| 2015/0193119 A1 | 7/2015 | Chai et al. |
| 2015/0193192 A1 | 7/2015 | Kidron |
| 2015/0195624 A1 | 7/2015 | Gossweiler, III |
| 2015/0205591 A1 | 7/2015 | Jitkoff et al. |
| 2015/0237389 A1 | 8/2015 | Grouf et al. |
| 2015/0296072 A1 | 10/2015 | Zhou et al. |
| 2015/0301729 A1* | 10/2015 | Wang .................... G06F 3/0485 715/707 |
| 2015/0309670 A1 | 10/2015 | Wheeler et al. |
| 2015/0312603 A1 | 10/2015 | Singh et al. |
| 2015/0317343 A1 | 11/2015 | Cselle et al. |
| 2015/0318020 A1 | 11/2015 | Pribula |
| 2015/0331685 A1 | 11/2015 | Bourke |
| 2015/0334464 A1 | 11/2015 | Shin |
| 2015/0346975 A1 | 12/2015 | Lee et al. |
| 2015/0350741 A1 | 12/2015 | Rajaraman et al. |
| 2015/0355816 A1 | 12/2015 | Shim |
| 2015/0363035 A1 | 12/2015 | Hinckley et al. |
| 2015/0365729 A1 | 12/2015 | Kaya et al. |
| 2015/0370435 A1 | 12/2015 | Kirmse et al. |
| 2015/0370455 A1 | 12/2015 | Van Os et al. |
| 2015/0370920 A1 | 12/2015 | Van Os et al. |
| 2015/0373107 A1 | 12/2015 | Chan et al. |
| 2015/0382047 A1 | 12/2015 | Van Os et al. |
| 2015/0382066 A1 | 12/2015 | Heeter et al. |
| 2016/0004425 A1 | 1/2016 | Yoon et al. |
| 2016/0004772 A1 | 1/2016 | Kim et al. |
| 2016/0004773 A1 | 1/2016 | Jannink et al. |
| 2016/0005013 A1 | 1/2016 | Perry |
| 2016/0014461 A1 | 1/2016 | Leech et al. |
| 2016/0021412 A1 | 1/2016 | Zito, Jr. |
| 2016/0035119 A1 | 2/2016 | Lee et al. |
| 2016/0036897 A1 | 2/2016 | Kim et al. |
| 2016/0041702 A1 | 2/2016 | Wang |
| 2016/0043962 A1 | 2/2016 | Kim et al. |
| 2016/0066004 A1 | 3/2016 | Lieu et al. |
| 2016/0066021 A1 | 3/2016 | Thomas et al. |
| 2016/0066040 A1 | 3/2016 | Webster et al. |
| 2016/0066049 A1 | 3/2016 | Mountain |
| 2016/0078465 A1 | 3/2016 | Chai et al. |
| 2016/0078526 A1 | 3/2016 | Nations et al. |
| 2016/0080815 A1 | 3/2016 | Ruffini et al. |
| 2016/0092042 A1 | 3/2016 | Yenigalla et al. |
| 2016/0092559 A1 | 3/2016 | Lind et al. |
| 2016/0096113 A1 | 4/2016 | Decoufle |
| 2016/0099991 A1 | 4/2016 | Lonkar et al. |
| 2016/0105540 A1 | 4/2016 | Kwon et al. |
| 2016/0110064 A1 | 4/2016 | Shapira |
| 2016/0127783 A1 | 5/2016 | Garcia Navarro |
| 2016/0127789 A1 | 5/2016 | Roberts et al. |
| 2016/0133230 A1 | 5/2016 | Daniels et al. |
| 2016/0142783 A1 | 5/2016 | Bagga et al. |
| 2016/0165307 A1 | 6/2016 | Lavender et al. |
| 2016/0188902 A1 | 6/2016 | Jin |
| 2016/0191639 A1 | 6/2016 | Dai et al. |
| 2016/0192017 A1 | 6/2016 | Tirpak |
| 2016/0231885 A1 | 8/2016 | Lee et al. |
| 2016/0249105 A1 | 8/2016 | Carney Landow |
| 2016/0255379 A1 | 9/2016 | Langan et al. |
| 2016/0277785 A1 | 9/2016 | Newman et al. |
| 2016/0345070 A1 | 11/2016 | Beeson et al. |
| 2016/0357305 A1 | 12/2016 | Wells et al. |

(56) References Cited

U.S. PATENT DOCUMENTS

| | | | |
|---|---|---|---|
| 2016/0357352 A1* | 12/2016 | Matas | H04N 21/475 |
| 2016/0357355 A1 | 12/2016 | Carrigan et al. | |
| 2016/0357366 A1* | 12/2016 | Migos | G06F 3/0482 |
| 2016/0370982 A1 | 12/2016 | Penha et al. | |
| 2016/0378283 A1 | 12/2016 | Cockcroft et al. | |
| 2017/0010846 A1 | 1/2017 | Bernstein et al. | |
| 2017/0010847 A1 | 1/2017 | Bernstein et al. | |
| 2017/0013295 A1 | 1/2017 | Wertheimer et al. | |
| 2017/0046039 A1 | 2/2017 | Karunamuni et al. | |
| 2017/0046339 A1 | 2/2017 | Bhat et al. | |
| 2017/0068402 A1 | 3/2017 | Lochhead et al. | |
| 2017/0068511 A1 | 3/2017 | Brown et al. | |
| 2017/0070786 A1 | 3/2017 | Keene et al. | |
| 2017/0094360 A1 | 3/2017 | Keighran et al. | |
| 2017/0097969 A1 | 4/2017 | Stein et al. | |
| 2017/0115867 A1 | 4/2017 | Bargmann | |
| 2017/0124594 A1 | 5/2017 | Naiga et al. | |
| 2017/0132659 A1 | 5/2017 | Dirks et al. | |
| 2017/0132829 A1* | 5/2017 | Blas, Jr | G06F 3/0485 |
| 2017/0134778 A1 | 5/2017 | Christie et al. | |
| 2017/0140748 A1 | 5/2017 | Roberts et al. | |
| 2017/0185240 A1 | 6/2017 | Delrosario et al. | |
| 2017/0188116 A1 | 6/2017 | Major et al. | |
| 2017/0192642 A1 | 7/2017 | Fishman et al. | |
| 2017/0195736 A1 | 7/2017 | Chai et al. | |
| 2017/0201850 A1 | 7/2017 | Raleigh et al. | |
| 2017/0214975 A1 | 7/2017 | Schmidt et al. | |
| 2017/0220228 A1 | 8/2017 | Sang et al. | |
| 2017/0242913 A1 | 8/2017 | Tijssen et al. | |
| 2017/0245017 A1 | 8/2017 | Chaudhri et al. | |
| 2017/0251257 A1 | 8/2017 | Obrien | |
| 2017/0272543 A1 | 9/2017 | Lo et al. | |
| 2017/0300151 A1 | 10/2017 | Lue-sang et al. | |
| 2017/0339443 A1 | 11/2017 | Lue-sang et al. | |
| 2017/0344553 A1 | 11/2017 | Evnine et al. | |
| 2017/0345040 A1 | 11/2017 | Pirnack et al. | |
| 2017/0353603 A1 | 12/2017 | Grunewald et al. | |
| 2017/0357387 A1 | 12/2017 | Clarke | |
| 2017/0359722 A1 | 12/2017 | Folse et al. | |
| 2017/0364246 A1 | 12/2017 | Van Os et al. | |
| 2017/0364274 A1 | 12/2017 | Hammons et al. | |
| 2018/0011580 A1* | 1/2018 | Lebowitz | G06F 3/04842 |
| 2018/0027279 A1 | 1/2018 | Templeman | |
| 2018/0041814 A1 | 2/2018 | Christie et al. | |
| 2018/0053094 A1 | 2/2018 | Patel et al. | |
| 2018/0063591 A1 | 3/2018 | Newman et al. | |
| 2018/0070121 A1 | 3/2018 | Zimmerman et al. | |
| 2018/0070138 A1 | 3/2018 | Chai et al. | |
| 2018/0107353 A1 | 4/2018 | Lee | |
| 2018/0113579 A1 | 4/2018 | Johnston et al. | |
| 2018/0130097 A1* | 5/2018 | Tran | G06Q 30/0267 |
| 2018/0136800 A1 | 5/2018 | Johnston et al. | |
| 2018/0146377 A1 | 5/2018 | Folse et al. | |
| 2018/0189076 A1 | 7/2018 | Liston et al. | |
| 2018/0253900 A1 | 9/2018 | Finding et al. | |
| 2018/0275855 A1 | 9/2018 | Van Os et al. | |
| 2018/0293210 A1 | 10/2018 | Xue et al. | |
| 2018/0293771 A1 | 10/2018 | Piemonte et al. | |
| 2018/0295403 A1 | 10/2018 | Christie et al. | |
| 2018/0302680 A1 | 10/2018 | Cormican | |
| 2018/0343497 A1 | 11/2018 | Brown et al. | |
| 2018/0349509 A1 | 12/2018 | Abou Mahmoud et al. | |
| 2018/0367834 A1 | 12/2018 | Carpenter et al. | |
| 2018/0367863 A1 | 12/2018 | Newman et al. | |
| 2019/0012048 A1 | 1/2019 | Johnston et al. | |
| 2019/0020925 A1 | 1/2019 | Christie et al. | |
| 2019/0028769 A1 | 1/2019 | Jeon et al. | |
| 2019/0045271 A1 | 2/2019 | Christie et al. | |
| 2019/0052744 A1 | 2/2019 | Jung et al. | |
| 2019/0058921 A1 | 2/2019 | Christie et al. | |
| 2019/0066672 A1 | 2/2019 | Wood et al. | |
| 2019/0073104 A1 | 3/2019 | Wang | |
| 2019/0073680 A1 | 3/2019 | Knox | |
| 2019/0129588 A1 | 5/2019 | Johnston et al. | |
| 2019/0138163 A1 | 5/2019 | Howland et al. | |
| 2019/0141399 A1 | 5/2019 | Auxer et al. | |
| 2019/0272853 A1 | 9/2019 | Moore | |
| 2019/0324614 A1 | 10/2019 | Brillon et al. | |
| 2019/0342616 A1 | 11/2019 | Domm et al. | |
| 2019/0354264 A1 | 11/2019 | Van Os et al. | |
| 2019/0373320 A1 | 12/2019 | Balsamo | |
| 2020/0034792 A1 | 1/2020 | Rogers et al. | |
| 2020/0068274 A1 | 2/2020 | Aher et al. | |
| 2020/0084488 A1 | 3/2020 | Christie et al. | |
| 2020/0099985 A1 | 3/2020 | Keighran et al. | |
| 2020/0133631 A1 | 4/2020 | Christie et al. | |
| 2020/0137175 A1 | 4/2020 | Ganci et al. | |
| 2020/0145726 A1 | 5/2020 | Ciuca et al. | |
| 2020/0213642 A1 | 7/2020 | Bartos et al. | |
| 2020/0257415 A1 | 8/2020 | Clarke | |
| 2020/0272666 A1 | 8/2020 | Van Os et al. | |
| 2020/0301567 A1 | 9/2020 | Park et al. | |
| 2020/0301575 A1 | 9/2020 | Lindholm et al. | |
| 2020/0304863 A1 | 9/2020 | Domm et al. | |
| 2020/0304876 A1 | 9/2020 | Cielak et al. | |
| 2020/0304879 A1 | 9/2020 | Ellingford | |
| 2020/0304880 A1 | 9/2020 | Diaz Delgado et al. | |
| 2020/0356160 A1 | 11/2020 | Kosugi et al. | |
| 2020/0363934 A1 | 11/2020 | Van Os et al. | |
| 2020/0374595 A1 | 11/2020 | Yang et al. | |
| 2020/0380029 A1 | 12/2020 | Chen | |
| 2020/0382845 A1 | 12/2020 | Payne | |
| 2020/0396507 A1 | 12/2020 | Balsamo | |
| 2021/0021903 A1 | 1/2021 | Christie et al. | |
| 2021/0092489 A1 | 3/2021 | Dutta et al. | |
| 2021/0168424 A1 | 6/2021 | Sharma | |
| 2021/0181901 A1 | 6/2021 | Johnston et al. | |
| 2021/0195277 A1 | 6/2021 | Thurlow et al. | |
| 2021/0286454 A1 | 9/2021 | Beaumier et al. | |
| 2021/0306711 A1 | 9/2021 | Ellingford et al. | |
| 2021/0337280 A1 | 10/2021 | Diaz Delgado et al. | |
| 2021/0345004 A1 | 11/2021 | Christie et al. | |
| 2021/0365134 A1 | 11/2021 | Beaumier et al. | |
| 2021/0397306 A1 | 12/2021 | Rajam et al. | |
| 2021/0406995 A1 | 12/2021 | Peters et al. | |
| 2022/0057984 A1 | 2/2022 | Yang et al. | |
| 2022/0132215 A1 | 4/2022 | Venugopal et al. | |
| 2022/0179526 A1 | 6/2022 | Schöberl | |
| 2022/0244824 A1 | 8/2022 | Cielak | |
| 2022/0321940 A1 | 10/2022 | Christie et al. | |
| 2022/0329891 A1 | 10/2022 | Christie et al. | |
| 2022/0337914 A1 | 10/2022 | Christie et al. | |
| 2022/0360858 A1 | 11/2022 | Christie et al. | |
| 2022/0413796 A1 | 12/2022 | Christie et al. | |
| 2023/0022781 A1 | 1/2023 | Lindholm et al. | |
| 2023/0033604 A1 | 2/2023 | Diaz Delgado et al. | |
| 2023/0096458 A1 | 3/2023 | Van Os et al. | |
| 2023/0127228 A1 | 4/2023 | Clarke | |
| 2023/0132595 A1 | 5/2023 | Van Os et al. | |
| 2023/0300415 A1 | 9/2023 | Balsamo | |
| 2023/0328327 A1 | 10/2023 | Cielak et al. | |
| 2024/0037144 A1 | 2/2024 | Chen | |
| 2024/0089550 A1 | 3/2024 | Ellingford et al. | |
| 2024/0089553 A1 | 3/2024 | Payne | |
| 2024/0126401 A1 | 4/2024 | Rajam et al. | |
| 2024/0220195 A1 | 7/2024 | Christie et al. | |
| 2024/0267583 A1 | 8/2024 | Domm et al. | |
| 2024/0302952 A1 | 9/2024 | Wood et al. | |
| 2024/0323473 A1 | 9/2024 | Newman et al. | |
| 2024/0388761 A1 | 11/2024 | Christie et al. | |
| 2024/0402899 A1 | 12/2024 | Sart et al. | |
| 2024/0419736 A1 | 12/2024 | Van Os et al. | |
| 2024/0422394 A1 | 12/2024 | Keighran et al. | |
| 2025/0021218 A1 | 1/2025 | Os et al. | |

FOREIGN PATENT DOCUMENTS

| | | |
|---|---|---|
| AU | 2017101431 A4 | 11/2017 |
| AU | 2018100810 A4 | 7/2018 |
| CN | 1295419 A | 5/2001 |
| CN | 1391765 A | 1/2003 |
| CN | 1985277 A | 6/2007 |
| CN | 1985327 A | 6/2007 |
| CN | 101160932 A | 4/2008 |

(56) References Cited

FOREIGN PATENT DOCUMENTS

| | | |
|---|---|---|
| CN | 101228570 A | 7/2008 |
| CN | 101317149 A | 12/2008 |
| CN | 101370104 A | 2/2009 |
| CN | 101405679 A | 4/2009 |
| CN | 101436110 A | 5/2009 |
| CN | 101465993 A | 6/2009 |
| CN | 101529437 A | 9/2009 |
| CN | 2009-276557 A | 11/2009 |
| CN | 101641662 A | 2/2010 |
| CN | 101699505 A | 4/2010 |
| CN | 101706704 A | 5/2010 |
| CN | 101719125 A | 6/2010 |
| CN | 101860447 A | 10/2010 |
| CN | 2011-76588 A | 4/2011 |
| CN | 2011-123750 A | 6/2011 |
| CN | 102098537 A | 6/2011 |
| CN | 102103460 A | 6/2011 |
| CN | 102187338 A | 9/2011 |
| CN | 102265586 A | 11/2011 |
| CN | 102325144 A | 1/2012 |
| CN | 102541419 A | 7/2012 |
| CN | 102819715 A | 12/2012 |
| CN | 2013-12021 A | 1/2013 |
| CN | 102859484 A | 1/2013 |
| CN | 102880404 A | 1/2013 |
| CN | 102890615 A | 1/2013 |
| CN | 102939515 A | 2/2013 |
| CN | 102955653 A | 3/2013 |
| CN | 102981695 A | 3/2013 |
| CN | 103037265 A | 4/2013 |
| CN | 103177738 A | 6/2013 |
| CN | 2013-235523 A | 11/2013 |
| CN | 103399967 A | 11/2013 |
| CN | 2013-242610 A | 12/2013 |
| CN | 103516933 A | 1/2014 |
| CN | 103546816 A | 1/2014 |
| CN | 103562848 A | 2/2014 |
| CN | 103562947 A | 2/2014 |
| CN | 103620531 A | 3/2014 |
| CN | 103620541 A | 3/2014 |
| CN | 103620639 A | 3/2014 |
| CN | 103686418 A | 3/2014 |
| CN | 103985045 A | 8/2014 |
| CN | 103999017 A | 8/2014 |
| CN | 104508618 A | 4/2015 |
| CN | 104822098 A | 8/2015 |
| CN | 105190590 A | 12/2015 |
| CN | 105247526 A | 1/2016 |
| CN | 105264479 A | 1/2016 |
| CN | 105303372 A | 2/2016 |
| CN | 105308634 A | 2/2016 |
| CN | 105308923 A | 2/2016 |
| CN | 105336350 A | 2/2016 |
| CN | 105657554 A | 6/2016 |
| CN | 105812849 A | 7/2016 |
| CN | 105828098 A | 8/2016 |
| CN | 105955520 A | 9/2016 |
| CN | 105955607 A | 9/2016 |
| CN | 105989085 A | 10/2016 |
| CN | 105992068 A | 10/2016 |
| CN | 106101982 A | 11/2016 |
| CN | 107710131 A | 2/2018 |
| CN | 108292190 A | 7/2018 |
| CN | 109313491 A | 2/2019 |
| CN | 109313651 A | 2/2019 |
| DE | 202016003233 U1 | 8/2016 |
| EP | 0608708 A2 | 8/1994 |
| EP | 0624853 A2 | 11/1994 |
| EP | 2386984 A2 | 11/2011 |
| EP | 2453667 A1 | 5/2012 |
| EP | 2535844 A2 | 12/2012 |
| EP | 2574089 A1 | 3/2013 |
| EP | 2605203 A1 | 6/2013 |
| EP | 2642402 A2 | 9/2013 |
| EP | 2672703 A1 | 12/2013 |
| EP | 2679017 A2 | 1/2014 |
| EP | 2704032 A2 | 3/2014 |
| EP | 2725531 A1 | 4/2014 |
| EP | 2879398 A1 | 6/2015 |
| JP | 2000-112977 A | 4/2000 |
| JP | 2000-163031 A | 6/2000 |
| JP | 2001-197445 A | 7/2001 |
| JP | 2002-027381 A | 1/2002 |
| JP | 2002-342033 A | 11/2002 |
| JP | 2003-99452 A | 4/2003 |
| JP | 2003-534737 A | 11/2003 |
| JP | 2004-62237 A | 2/2004 |
| JP | 2006-31219 A | 2/2006 |
| JP | 2007-124465 A | 5/2007 |
| JP | 2007-512640 A | 5/2007 |
| JP | 2007-140910 A | 6/2007 |
| JP | 2007-294068 A | 11/2007 |
| JP | 2008-71112 A | 3/2008 |
| JP | 2008-135911 A | 6/2008 |
| JP | 2009-60328 A | 3/2009 |
| JP | 2009-206957 A | 9/2009 |
| JP | 2009-260947 A | 11/2009 |
| JP | 2010-28437 A | 2/2010 |
| JP | 2010-56595 A | 3/2010 |
| JP | 2010-509684 A | 3/2010 |
| JP | 2010-114733 A | 5/2010 |
| JP | 2011-512701 A | 4/2011 |
| JP | 2011-154455 A | 8/2011 |
| JP | 2011-182146 A | 9/2011 |
| JP | 2011-205562 A | 10/2011 |
| JP | 2011-257930 A | 12/2011 |
| JP | 2012-95123 A | 5/2012 |
| JP | 2012-123685 A | 6/2012 |
| JP | 2012-208622 A | 10/2012 |
| JP | 2013-8369 A | 1/2013 |
| JP | 2013-223150 A | 10/2013 |
| JP | 2014-81740 A | 5/2014 |
| JP | 2014-102660 A | 6/2014 |
| JP | 2015-50655 A | 3/2015 |
| JP | 2015-70404 A | 4/2015 |
| KR | 2001-0005939 A | 1/2001 |
| KR | 2001-0035356 A | 5/2001 |
| KR | 10-2002-0010151 A | 2/2002 |
| KR | 10-2007-0114329 A | 12/2007 |
| KR | 10-2009-0106104 A | 10/2009 |
| KR | 10-2010-0039194 A | 4/2010 |
| KR | 10-2011-0036408 A | 4/2011 |
| KR | 10-2011-0061811 A | 6/2011 |
| KR | 10-2012-0076682 A | 7/2012 |
| KR | 10-2012-0124445 A | 11/2012 |
| KR | 10-2013-0014712 A | 2/2013 |
| KR | 10-2013-0058034 A | 6/2013 |
| KR | 10-2013-0137969 A | 12/2013 |
| KR | 102014-0041939 A | 4/2014 |
| KR | 10-2019-0033658 A | 3/2019 |
| KR | 10-2022-0041231 A | 3/2022 |
| TV | 201337717 A | 9/2013 |
| TW | 200622893 A | 7/2006 |
| TW | 200719204 A | 5/2007 |
| TW | 201349049 A | 12/2013 |
| TW | 201351261 A | 12/2013 |
| WO | 1994/009438 A2 | 4/1994 |
| WO | 1999/040728 A1 | 8/1999 |
| WO | 2004/063862 A2 | 7/2004 |
| WO | 2004/102285 A2 | 11/2004 |
| WO | 2005/050652 A1 | 6/2005 |
| WO | 2005/109345 A1 | 11/2005 |
| WO | 2007/078623 A2 | 7/2007 |
| WO | 2008/005135 A1 | 1/2008 |
| WO | 2008/060486 A2 | 5/2008 |
| WO | 2009/016607 A2 | 2/2009 |
| WO | 2009/039786 A1 | 4/2009 |
| WO | 2009/148781 A1 | 12/2009 |
| WO | 2010/022570 A1 | 3/2010 |
| WO | 2010/025168 A1 | 3/2010 |
| WO | 2010/118690 A1 | 10/2010 |
| WO | 2011/095693 A1 | 8/2011 |
| WO | 2011/158475 A1 | 12/2011 |
| WO | 2012/012446 A2 | 1/2012 |

(56) References Cited

FOREIGN PATENT DOCUMENTS

| WO | 2012/061760 A2 | 5/2012 |
|---|---|---|
| WO | 2012/088665 A1 | 7/2012 |
| WO | 2013/000741 A1 | 1/2013 |
| WO | 2013/149128 A2 | 10/2013 |
| WO | 2013/169849 A2 | 11/2013 |
| WO | 2013/169877 A2 | 11/2013 |
| WO | 2013/187370 A1 | 12/2013 |
| WO | 2013/149128 A3 | 2/2014 |
| WO | 2014/105276 A1 | 7/2014 |
| WO | 2014/144908 A1 | 9/2014 |
| WO | 2014/177929 A2 | 11/2014 |
| WO | 2014/200730 A1 | 12/2014 |
| WO | 2015/200227 A1 | 12/2015 |
| WO | 2015/200228 A1 | 12/2015 |
| WO | 2015/200537 A2 | 12/2015 |
| WO | 2016/030437 A1 | 3/2016 |
| WO | 2016/048308 A1 | 3/2016 |
| WO | 2016/048310 A1 | 3/2016 |
| WO | 2016/111065 A1 | 7/2016 |
| WO | 2017/008079 A1 | 1/2017 |
| WO | 2017/124116 A1 | 7/2017 |
| WO | 2017/200923 A1 | 11/2017 |
| WO | 2017/218104 A1 | 12/2017 |
| WO | 2018/081157 A1 | 5/2018 |

OTHER PUBLICATIONS

Applicant Initiated Interview Summary received for U.S. Appl. No. 15/167,801, mailed on Apr. 23, 2018, 3 pages.
Applicant Initiated Interview Summary received for U.S. Appl. No. 15/167,801, mailed on Jul. 29, 2019, 3 pages.
Corrected Notice of Allowance received for U.S. Appl. No. 14/242,575, mailed on Dec. 15, 2016, 7 pages.
Corrected Notice of Allowance received for U.S. Appl. No. 14/242,575, mailed on Nov. 16, 2016, 7 pages.
Corrected Notice of Allowance received for U.S. Appl. No. 14/255,664, mailed on Aug. 29, 2017, 4 pages.
Corrected Notice of Allowance received for U.S. Appl. No. 14/267,671, mailed on Nov. 29, 2018, 3 pages.
Corrected Notice of Allowance received for U.S. Appl. No. 14/749,288, mailed on Sep. 21, 2017, 5 pages.
Corrected Notice of Allowance received for U.S. Appl. No. 15/276,633, mailed on Sep. 10, 2019, 7 pages.
Corrected Notice of Allowance received for U.S. Appl. No. 15/695,880, mailed on Jun. 11, 2018, 6 pages.
Corrected Notice of Allowance received for U.S. Appl. No. 15/714,904, mailed on Sep. 7, 2018, 5 pages.
Corrected Notice of Allowance received for U.S. Appl. No. 16/010,280, mailed on Aug. 6, 2019, 2 pages.
Corrected Notice of Allowance received for U.S. Appl. No. 16/036,810, mailed on Nov. 19, 2018, 6 pages.
Cover Flow—Wikipedia, Available online at: <https://en.wikipedia.org/w/index.php?t%20itle=Cover%20Flow&oldid=879285208>, Jan. 20, 2019, 3 pages.
Examiner Initiated Interview Summary received for U.S. Appl. No. 15/390,377, mailed on Oct. 30, 2017, 2 pages.
Examiner's Answer to Appeal Brief received for U.S. Appl. No. 15/876,715, mailed on Aug. 18, 2020, 16 pages.
Extended European Search Report received for European Patent Application No. 17813728.7, mailed on Feb. 11, 2019, 8 pages.
Extended European Search Report received for European Patent Application No. 20190698.9, mailed on Oct. 30, 2020, 6 pages.
Extended European Search Report received for European Patent Application No. 20199219.5, mailed on Apr. 22, 2021, 8 pages.
Final Office Action received for U.S. Appl. No. 14/255,664, mailed on Oct. 17, 2016, 16 pages.
Final Office Action received for U.S. Appl. No. 14/267,671, mailed on May 23, 2018, 17 pages.
Final Office Action received for U.S. Appl. No. 14/267,671, mailed on Oct. 26, 2016, 21 pages.
Final Office Action received for U.S. Appl. No. 14/271,179, mailed on Dec. 15, 2016, 10 pages.
Final Office Action received for U.S. Appl. No. 14/271,179, mailed on Jun. 20, 2019, 15 pages.
Final Office Action received for U.S. Appl. No. 14/271,179, mailed on Jun. 21, 2018, 14 pages.
Final Office Action received for U.S. Appl. No. 14/746,095, mailed on Jul. 16, 2018, 33 pages.
Final Office Action received for U.S. Appl. No. 14/746,662, mailed on Apr. 24, 2017, 8 pages.
Final Office Action received for U.S. Appl. No. 14/746,662, mailed on Jun. 27, 2017, 9 pages.
Final Office Action received for U.S. Appl. No. 15/167,801, mailed on Apr. 5, 2019, 18 pages.
Final Office Action received for U.S. Appl. No. 15/167,801, mailed on May 28, 2020, 17 pages.
Final Office Action received for U.S. Appl. No. 15/167,801, mailed on Nov. 29, 2017, 12 pages.
Final Office Action received for U.S. Appl. No. 15/235,000, mailed on Dec. 19, 2018, 33 pages.
Final Office Action received for U.S. Appl. No. 15/235,000, mailed on Mar. 13, 2018, 31 pages.
Final Office Action received for U.S. Appl. No. 15/272,393, mailed on Mar. 25, 2019, 54 pages.
Final Office Action received for U.S. Appl. No. 15/272,397, mailed on Mar. 7, 2017, 23 pages.
Final Office Action received for U.S. Appl. No. 15/276,633, mailed on Jul. 26, 2017, 15 pages.
Final Office Action received for U.S. Appl. No. 15/276,633, mailed on Oct. 29, 2018, 12 pages.
Final Office Action received for U.S. Appl. No. 15/390,377, mailed on Nov. 9, 2017, 18 pages.
Final Office Action received for U.S. Appl. No. 15/507,229, mailed on Jul. 15, 2020, 20 pages.
Final Office Action received for U.S. Appl. No. 15/507,229, mailed on Sep. 18, 2019, 15 pages.
Final Office Action received for U.S. Appl. No. 15/719,404, mailed on Aug. 8, 2019, 19 pages.
Final Office Action received for U.S. Appl. No. 15/719,404, mailed on Mar. 30, 2021, 19 pages.
Final Office Action received for U.S. Appl. No. 15/876,715, mailed on Nov. 5, 2018, 15 pages.
Final Office Action received for U.S. Appl. No. 16/108,519, mailed on Dec. 12, 2019, 10 pages.
Final Office Action received for U.S. Appl. No. 16/108,519, mailed on Nov. 25, 2020, 12 pages.
Final Office Action received for U.S. Appl. No. 16/126,962, mailed on Apr. 8, 2020, 20 pages.
Final Office Action received for U.S. Appl. No. 16/136,005, mailed on Mar. 9, 2020, 9 pages.
Final Office Action received for U.S. Appl. No. 16/142,635, mailed on Feb. 3, 2021, 23 pages.
Final Office Action received for U.S. Appl. No. 16/144,077, mailed on Jul. 12, 2019, 22 pages.
Final Office Action received for U.S. Appl. No. 16/233,990, mailed on Jan. 11, 2021, 17 pages.
Final Office Action received for U.S. Appl. No. 16/584,790, mailed on Jun. 15, 2021, 30 pages.
Final Office Action received for U.S. Appl. No. 16/584,790, mailed on May 27, 2020, 27 pages.
Final Office Action received for U.S. Appl. No. 16/682,443, mailed on Mar. 9, 2021, 9 pages.
Final Office Action received for U.S. Appl. No. 16/697,090, mailed on Jan. 27, 2021, 18 pages.
Final Office Action received for U.S. Appl. No. 16/827,918, mailed on Jul. 8, 2021, 31 pages.
Final Office Action received for U.S. Appl. No. 16/827,926, mailed on Mar. 17, 2021, 44 pages.
Final Office Action received for U.S. Appl. No. 16/865,172, mailed on Feb. 12, 2021, 29 pages.
International Search Report received for PCT Patent Application No. PCT/US2014/057272, mailed on May 28, 2015, 4 pages.

(56) References Cited

OTHER PUBLICATIONS

International Search Report received for PCT Patent Application No. PCT/US2014/057280, mailed on May 27, 2015, 4 pages.
International Search Report received for PCT Patent Application No. PCT/US2015/037027, mailed on Sep. 28, 2015, 3 pages.
International Search Report received for PCT Patent Application No. PCT/US2015/037030, mailed on Dec. 10, 2015, 7 pages.
International Search Report received for PCT Patent Application No. PCT/US2015/037520, mailed on Mar. 7, 2016, 6 pages.
International Search Report received for PCT Patent Application No. PCT/US2017/029448, mailed on Jul. 13, 2017, 3 pages.
International Search Report received for PCT Patent Application No. PCT/US2017/031764, mailed on Aug. 7, 2017, 2 pages.
International Search Report received for PCT Patent Application No. PCT/US2017/058132, mailed on Mar. 27, 2018, 6 pages.
International Search Report received for PCT Patent Application No. PCT/US2019/034921, mailed on Nov. 19, 2019, 5 pages.
International Search Report received for PCT Patent Application No. PCT/US2020/024452, mailed on Aug. 6, 2020, 6 pages.
International Search Report received for PCT Patent Application No. PCT/US2020/024485, mailed on Aug. 3, 2020, 6 pages.
International Search Report received for PCT Patent Application No. PCT/US2020/024486, mailed on Aug. 11, 2020, 6 pages.
International Search Report received for PCT Patent Application No. PCT/US2020/024492, mailed on Aug. 10, 2020, 6 pages.
International Search Report received for PCT Patent Application No. PCT/US2020/035423, mailed on Oct. 13, 2020, 4 pages.
Invitation to Pay Additional Fees received for PCT Patent Application No. PCT/US2019/034921, mailed on Sep. 24, 2019, 12 pages.
Invitation to Pay Additional Fees received for PCT Patent Application No. PCT/US2020/024452, mailed on Jun. 15, 2020, 13 pages.
Invitation to Pay Additional Fees received for PCT Patent Application No. PCT/US2020/024485, mailed on Jun. 8, 2020, 11 pages.
Invitation to Pay Additional Fees received for PCT Patent Application No. PCT/US2020/024486, mailed on Jun. 3, 2020, 11 pages.
Invitation to Pay Additional Fees received for PCT Patent Application No. PCT/US2020/024492, mailed on Jun. 8, 2020, 10 pages.
Non-Final Office Action received for U.S. Appl. No. 14/208,099, mailed on Jun. 25, 2015, 12 pages.
Non-Final Office Action received for U.S. Appl. No. 14/242,575, mailed on Mar. 21, 2016, 12 pages.
Non-Final Office Action received for U.S. Appl. No. 14/255,664, mailed on Apr. 1, 2016, 15 pages.
Non-Final Office Action received for U.S. Appl. No. 14/262,435, mailed on Feb. 22, 2016, 22 pages.
Non-Final Office Action received for U.S. Appl. No. 14/267,671, mailed on Apr. 1, 2016, 16 pages.
Non-Final Office Action received for U.S. Appl. No. 14/267,671, mailed on Dec. 1, 2017, 18 pages.
Non-Final Office Action received for U.S. Appl. No. 14/267,671, mailed on May 26, 2017, 18 pages.
Non-Final Office Action received for U.S. Appl. No. 14/271,179, mailed on May 29, 2015, 25 pages.
Non-Final Office Action received for U.S. Appl. No. 14/271,179, mailed on Oct. 5, 2018, 15 pages.
Non-Final Office Action received for U.S. Appl. No. 14/271,179, mailed on Sep. 21, 2017, 12 pages.
Non-Final Office Action received for U.S. Appl. No. 14/746,095, mailed on Dec. 1, 2017, 34 pages.
Non-Final Office Action received for U.S. Appl. No. 14/746,095, mailed on Jul. 25, 2019, 33 pages.
Non-Final Office Action received for U.S. Appl. No. 14/746,620, mailed on Jan. 11, 2017, 16 pages.
Non-Final Office Action received for U.S. Appl. No. 14/746,662, mailed on Aug. 9, 2016, 8 pages.
Non-Final Office Action received for U.S. Appl. No. 14/749,288, mailed on Oct. 12, 2016, 11 pages.
Non-Final Office Action received for U.S. Appl. No. 15/167,801, mailed on Mar. 24, 2017, 12 Pages.
Non-Final Office Action received for U.S. Appl. No. 15/167,801, mailed on Aug. 30, 2018, 15 pages.
Non-Final Office Action received for U.S. Appl. No. 15/167,801, mailed on Dec. 11, 2020, 18 pages.
Non-Final Office Action received for U.S. Appl. No. 15/167,801, mailed on Sep. 26, 2019, 18 pages.
Non-Final Office Action received for U.S. Appl. No. 15/224,370, mailed on Oct. 3, 2017, 14 pages.
Non-Final Office Action received for U.S. Appl. No. 15/235,000, mailed on Jul. 14, 2017, 31 pages.
Non-Final Office Action received for U.S. Appl. No. 15/235,000, mailed on Jul. 25, 2018, 31 pages.
Non-Final Office Action received for U.S. Appl. No. 15/235,000, mailed on Jun. 26, 2019, 31 pages.
Non-Final Office Action received for U.S. Appl. No. 15/272,393, mailed on Oct. 2, 2018, 52 pages.
Non-Final Office Action received for U.S. Appl. No. 15/272,397, mailed on Nov. 22, 2016, 20 pages.
Non-Final Office Action received for U.S. Appl. No. 15/276,633, mailed on Feb. 23, 2018, 12 pages.
Non-Final Office Action received for U.S. Appl. No. 15/276,633, mailed on Mar. 5, 2019, 16 pages.
Non-Final Office Action received for U.S. Appl. No. 15/276,633, mailed on Nov. 17, 2016, 12 pages.
Non-Final Office Action received for U.S. Appl. No. 15/390,377, mailed on Apr. 5, 2017, 17 pages.
Non-Final Office Action received for U.S. Appl. No. 15/414,493, mailed on Oct. 6, 2017, 15 pages.
Non-Final Office Action received for U.S. Appl. No. 15/507,229, mailed on Feb. 27, 2020, 16 pages.
Non-Final Office Action received for U.S. Appl. No. 15/507,229, mailed on Jun. 3, 2019, 14 pages.
Non-Final Office Action received for U.S. Appl. No. 15/674,992, mailed on May 11, 2018, 8 pages.
Non-Final Office Action received for U.S. Appl. No. 15/719,404, mailed on Dec. 14, 2018, 14 pages.
Non-Final Office Action received for U.S. Appl. No. 15/719,404, mailed on Oct. 16, 2020, 18 pages.
Non-Final Office Action received for U.S. Appl. No. 15/798,092, mailed on Dec. 20, 2017, 20 pages.
Non-Final Office Action received for U.S. Appl. No. 15/876,715, mailed on Jun. 4, 2018, 12 pages.
Non-Final Office Action received for U.S. Appl. No. 15/876,715, mailed on Sep. 10, 2019, 13 pages.
Non-Final Office Action received for U.S. Appl. No. 15/990,327, mailed on Jul. 31, 2018, 8 pages.
Non-Final Office Action received for U.S. Appl. No. 16/010,280, mailed on Mar. 7, 2019, 5 pages.
Non-Final Office Action received for U.S. Appl. No. 16/108,519, mailed on Apr. 5, 2021, 13 pages.
Non-Final Office Action received for U.S. Appl. No. 16/108,519, mailed on Aug. 2, 2019, 10 pages.
Non-Final Office Action received for U.S. Appl. No. 16/108,519, mailed on May 8, 2020, 11 pages.
Non-Final Office Action received for U.S. Appl. No. 16/126,962, mailed on Aug. 25, 2020, 22 pages.
Non-Final Office Action received for U.S. Appl. No. 16/126,962, mailed on Sep. 3, 2019, 16 pages.
Non-Final Office Action received for U.S. Appl. No. 16/136,005, mailed on Sep. 9, 2020, 10 pages.
Non-Final Office Action received for U.S. Appl. No. 16/136,005, mailed on Sep. 18, 2019, 9 pages.
Non-Final Office Action received for U.S. Appl. No. 16/142,635, mailed on Jun. 8, 2020, 19 pages.
Non-Final Office Action received for U.S. Appl. No. 16/142,635, mailed on Jun. 11, 2021, 23 pages.
Non-Final Office Action received for U.S. Appl. No. 16/144,077, mailed on Feb. 19, 2019, 24 pages.
Non-Final Office Action received for U.S. Appl. No. 16/144,077, mailed on Nov. 27, 2019, 40 pages.

(56) References Cited

OTHER PUBLICATIONS

Non-Final Office Action received for U.S. Appl. No. 16/233,990, mailed on Jul. 9, 2021, 18 pages.
Non-Final Office Action received for U.S. Appl. No. 16/233,990, mailed on Jun. 18, 2020, 17 pages.
Non-Final Office Action received for U.S. Appl. No. 16/392,467, mailed on Sep. 27, 2019, 5 pages.
Non-Final Office Action received for U.S. Appl. No. 16/584,790, mailed on Dec. 23, 2020, 30 pages.
Non-Final Office Action received for U.S. Appl. No. 16/584,790, mailed on Dec. 26, 2019, 24 pages.
Non-Final Office Action received for U.S. Appl. No. 16/682,443, mailed on Sep. 23, 2020, 10 pages.
Non-Final Office Action received for U.S. Appl. No. 16/697,090, mailed on Jul. 6, 2020, 14 pages.
Non-Final Office Action received for U.S. Appl. No. 16/827,910, mailed on Jun. 17, 2021, 16 pages.
Non-Final Office Action received for U.S. Appl. No. 16/827,918, mailed on Dec. 10, 2020, 28 pages.
Non-Final Office Action received for U.S. Appl. No. 16/827,926, mailed on Oct. 29, 2020, 45 pages.
Non-Final Office Action received for U.S. Appl. No. 16/827,931, mailed on Mar. 3, 2021, 24 pages.
Non-Final Office Action received for U.S. Appl. No. 16/865,172 mailed on Jun. 29, 2021, 29 pages.
Non-Final Office Action received for U.S. Appl. No. 16/865,172, mailed on Aug. 20, 2020, 19 pages.
Non-Final Office Action received for U.S. Appl. No. 16/872,274, mailed on Jul. 9, 2021, 19 pages.
Non-Final Office Action received for U.S. Appl. No. 16/888,453, mailed on Jun. 4, 2021, 37 pages.
Non-Final Office Action received for U.S. Appl. No. 16/888,478, mailed on Feb. 8, 2021, 24 pages.
Non-Final Office Action received for U.S. Appl. No. 16/945,724, mailed on Jul. 19, 2021, 8 pages.
Non-Final Office Action received for U.S. Appl. No. 17/065,387, mailed on Jan. 28, 2021, 28 pages.
Non-Final Office Action received for U.S. Appl. No. 17/065,387, mailed on Jun. 1, 2021, 25 pages.
Non-Final Office Action received for U.S. Appl. No. 17/133,550, mailed on Jun. 8, 2021, 23 pages.
Notice of Allowance received for U.S. Appl. No. 14/208,099, mailed on Feb. 3, 2016, 10 pages.
Notice of Allowance received for U.S. Appl. No. 14/242,575, mailed on Oct. 27, 2016, 11 pages.
Notice of Allowance received for U.S. Appl. No. 14/255,664, mailed on May 5, 2017, 7 pages.
Notice of Allowance received for U.S. Appl. No. 14/262,435, mailed on Aug. 16, 2016, 6 pages.
Notice of Allowance received for U.S. Appl. No. 14/267,671, mailed on Sep. 19, 2018, 8 pages.
Notice of Allowance received for U.S. Appl. No. 14/746,095, mailed on Dec. 31, 2019, 8 pages.
Notice of Allowance received for U.S. Appl. No. 14/746,620, mailed on Sep. 25, 2017, 8 pages.
Notice of Allowance received for U.S. Appl. No. 14/746,662, mailed on Sep. 25, 2017, 7 pages.
Notice of Allowance received for U.S. Appl. No. 14/749,288, mailed on May 25, 2017, 8 pages.
Notice of Allowance received for U.S. Appl. No. 15/272,393, mailed on Jan. 15, 2020, 7 pages.
Notice of Allowance received for U.S. Appl. No. 15/272,393, mailed on Sep. 18, 2019, 10 pages.
Notice of Allowance received for U.S. Appl. No. 15/272,397, mailed on Oct. 18, 2017, 8 pages.
Notice of Allowance received for U.S. Appl. No. 15/276,633, mailed on Aug. 26, 2019, 8 pages.
Notice of Allowance received for U.S. Appl. No. 15/390,377, mailed on Jul. 2, 2018, 9 pages.
Notice of Allowance received for U.S. Appl. No. 15/414,493, mailed on Mar. 14, 2018, 7 pages.
Notice of Allowance received for U.S. Appl. No. 15/674,992, mailed on Oct. 1, 2018, 7 pages.
Notice of Allowance received for U.S. Appl. No. 15/695,880, mailed on Feb. 28, 2018, 10 pages.
Notice of Allowance received for U.S. Appl. No. 15/695,880, mailed on Oct. 18, 2017, 9 pages.
Notice of Allowance received for U.S. Appl. No. 15/714,904, mailed on May 22, 2018, 8 pages.
Notice of Allowance received for U.S. Appl. No. 15/798,092, mailed on Jun. 7, 2018, 9 pages.
Notice of Allowance received for U.S. Appl. No. 15/798,092, mailed on Oct. 9, 2018, 5 pages.
Notice of Allowance received for U.S. Appl. No. 15/833,618, mailed on Mar. 14, 2018, 9 pages.
Notice of Allowance received for U.S. Appl. No. 15/990,327, mailed on Jan. 11, 2019, 7 pages.
Notice of Allowance received for U.S. Appl. No. 16/010,280, mailed on Jul. 29, 2019, 7 pages.
Notice of Allowance received for U.S. Appl. No. 16/036,810, mailed on Oct. 31, 2018, 9 pages.
Notice of Allowance received for U.S. Appl. No. 16/136,005, mailed on Feb. 24, 2021, 8 pages.
Notice of Allowance received for U.S. Appl. No. 16/136,005, mailed on Jun. 9, 2021, 7 pages.
Notice of Allowance received for U.S. Appl. No. 16/144,077, mailed on May 8, 2020, 15 pages.
Notice of Allowance received for U.S. Appl. No. 16/392,467, mailed on Mar. 23, 2020, 9 pages.
Notice of Allowance received for U.S. Appl. No. 16/726,179, mailed on Jun. 17, 2021, 9 pages.
Notice of Allowance received for U.S. Appl. No. 16/827,942, mailed on Apr. 28, 2021, 5 pages.
Notice of Allowance received for U.S. Appl. No. 16/827,942, mailed on Jan. 22, 2021, 5 pages.
Notice of Allowance received for U.S. Appl. No. 16/827,942, mailed on Oct. 5, 2020, 10 pages.
Restriction Requirement received for U.S. Appl. No. 14/208,099, mailed on Feb. 24, 2015, 5 pages.
Search Report received for Chinese Patent Application No. 201580028382.1, mailed on Oct. 12, 2018, 5 pages (2 pages of English Translation & 3 pages of Official copy).
Search Report received for Chinese Patent Application No. 201780033590.X, mailed on Mar. 24, 2021, 4 pages (2 page of English Translation and 2 pages of Official Copy).
Search Report received for Chinese Patent Application No. 201910469185.3, mailed on Feb. 23, 2021, 6 pages (3 page of English Translation and 3 page of Official Copy).
Search Report received for Danish Patent Application No. PA 201670581, mailed on Apr. 4, 2017, 2 pages.
Search Report received for Danish Patent Application No. PA 201670581, mailed on Feb. 5, 2018, 1 page.
Search Report received for Danish Patent Application No. PA 201670581, mailed on Nov. 3, 2016, 1 page.
Search Report received for Danish Patent Application No. PA 201870354, mailed on Sep. 26, 2018, 4 pages.
Search Report received for Danish Patent Application No. PA201670582, mailed on Feb. 9, 2017, 1 pages.
Search Report received for Danish Patent Application No. PA201670582, mailed on Mar. 6, 2018, 2 pages.
Search Report received for Danish Patent Application No. PA201670582, mailed on Oct. 28, 2016, 4 pages.
Search Report received for Danish Patent Application No. PA201770200, Completed on Jul. 12, 2017, 4 pages.
Search Report received for Taiwanese Patent Application No. 104120369, mailed on Aug. 8, 2016, 2 Pages (1 page of official copy & 1 page of English translation).
Search Report received for Taiwanese Patent Application No. 104120385, mailed on Nov. 25, 2016, 2 Pages (1 page of official copy & 1 page of English translation).
Supplemental Notice of Allowability received for U.S. Appl. No. 16/827,942, mailed on Nov. 4, 2020, 3 pages.

(56) References Cited

OTHER PUBLICATIONS

Supplemental Notice of Allowance received for U.S. Appl. No. 15/798,092, mailed on Jan. 9, 2019, 2 pages.
Akhtar Iyaz, "Movies Anywhere: Everything You Need To Know", Available online at: <https://www.cnet.com/how-to/movies-anywhere-ultraviolet-movies-locker-streaming-redeem-faq/>, 2017, 8 pages.
Alvarez Edgar, "Sling TV Redesign Makes It Easy to Find Your Favorite Content", Engadget, Available online at: <https://www.engadget.com/2016/01/05/sling-tv-major-redesign/>, May 1, 2016, pp. 1-12.
Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, Jan. 6, 2014, 5 pages.
Cheredar Tom, "Verizon's Viewdini lets you watch Netflix, Comcast, & Hulu videos from a single app", venturebeat.com, May 22, 2012, 6 pages.
Episodecalendar.com, "Keep track of your favorite TV shows!—TV Episode Calendar", Available Online At: <https://web.archive.org/web/20140517060612/https://episodecalendar.com/>, May 17, 2014, 6 pages.
Fingas Roger, "Walmart's Vudu to get Native Apple TV", AppleInsider, 2017, pp. 1-4.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Kaijser Martijn, "Mimic skin for Kodi 15.x: Installation and showcase", Time 2:23-2:28, Available online at: <https://www.youtube.com/watch?v=RGfpbUWVkgQ&t=143s>, Aug. 3, 2015, 1 page.
Lee et al., "A Multi-Touch Three Dimensional Touch-Sensitive Tablet", CHI'85 Proceedings, Apr. 1985, pp. 21-25.
Li Xiaoshan, "CNTV, HULU, BBC iPlayer Comparative Study on User Interface of Three Network TV Stations", Modern Communication (Journal of Communication University of China), Issue 11, Nov. 5, 2010, pp. 156-158. See attached Communication 37 CFR § 1.98(a) (3).
Ng Gary, "New Netflix User Interface Coming This Month, First Redesign in Four Years", iPhone in Canada, Available online at: <https://www.iphoneincanada.ca/news/new-netflix-user-interface/>, Jun. 1, 2015, 3 pages.
Panzarino Matthew, "Apple Announces Voice Activated Siri Assistant Feature For iOS 5, Integrates Wolfram Alpha and Wikipedia", Available online at: <www.thenextweb.com>, Oct. 4, 2011, pp. 1-6.
Pierce David, "Got Hulu and Netflix? You Need an App to Search It All", Wired, Available online at: <https://www.wired.com/2016/03/got-hulu-netflix-need-app-search/>, Mar. 10, 2016, pp. 1-4.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Corrected Notice of Allowability received for U.S. Appl. No. 16/108,519, mailed on Dec. 22, 2021, 3 pages.
Corrected Notice of Allowance received for U.S. Appl. No. 15/876,715, mailed on Oct. 20, 2021, 2 pages.
Corrected Notice of Allowance received for U.S. Appl. No. 16/827,931, mailed on Dec. 6, 2021, 4 pages.
Final Office Action received for U.S. Appl. No. 16/872,274, mailed on Dec. 23, 2021, 20 pages.
Final Office Action received for U.S. Appl. No. 16/888,478, mailed on Nov. 15, 2021, 27 pages.
Final Office Action received for U.S. Appl. No. 17/133,550, mailed on Feb. 11, 2022, 18 pages.
Non-Final Office Action received for U.S. Appl. No. 15/167,801, mailed on Sep. 3, 2021, 17 pages.
Non-Final Office Action received for U.S. Appl. No. 15/719,404, mailed on Nov. 26, 2021, 19 pages.
Non-Final Office Action received for U.S. Appl. No. 16/584,790, mailed on Feb. 1, 2022, 33 pages.
Non-Final Office Action received for U.S. Appl. No. 16/697,090, mailed on Aug. 3, 2021, 16 pages.
Non-Final Office Action received for U.S. Appl. No. 17/000,112, mailed on Dec. 7, 2021, 15 pages.
Non-Final Office Action received for U.S. Appl. No. 17/210,352, mailed on Oct. 18, 2021, 18 pages.
Non-Final Office Action received for U.S. Appl. No. 17/353,527, mailed on Oct. 5, 2021, 14 pages.
Notice of Allowance received for U.S. Appl. No. 15/876,715, mailed on Oct. 14, 2021, 7 pages.
Notice of Allowance received for U.S. Appl. No. 16/108,519, mailed on Sep. 21, 2021, 8 pages.
Notice of Allowance received for U.S. Appl. No. 16/142,635, mailed on Nov. 10, 2021, 8 pages.
Notice of Allowance received for U.S. Appl. No. 16/682,443, mailed on Aug. 20, 2021, 7 pages.
Notice of Allowance received for U.S. Appl. No. 16/682,443, mailed on Nov. 17, 2021, 8 pages.
Notice of Allowance received for U.S. Appl. No. 16/726,179, mailed on Sep. 30, 2021, 8 pages.
Notice of Allowance received for U.S. Appl. No. 16/827,918, mailed on Feb. 7, 2022, 9 pages.
Notice of Allowance received for U.S. Appl. No. 16/827,926, mailed on Nov. 1, 2021, 35 pages.
Notice of Allowance received for U.S. Appl. No. 16/827,931, mailed on Jan. 5, 2022, 7 pages.
Notice of Allowance received for U.S. Appl. No. 16/827,931, mailed on Sep. 15, 2021, 11 pages.
Notice of Allowance received for U.S. Appl. No. 16/865,172, mailed on Dec. 16, 2021, 10 pages.
Notice of Allowance received for U.S. Appl. No. 16/945,724, mailed on Dec. 20, 2021, 7 pages.
Notice of Allowance received for U.S. Appl. No. 17/065,387, mailed on Dec. 1, 2021, 10 pages.
Patent Board Decision received for U.S. Appl. No. 15/876,715, mailed on Aug. 3, 2021, 8 pages.
Search Report received for Chinese Patent Application No. 201910587972.8, mailed on Jan. 4, 2022, 4 pages (2 page of English Translation and 2 pages of Official Copy).
Notice of Allowance received for U.S. Appl. No. 16/233,990, mailed on Feb. 22, 2022, 8 pages.
Applicant Initiated Interview Summary received for U.S. Appl. No. 17/210,352, mailed on Feb. 28, 2022, 4 pages.
Corrected Notice of Allowance received for U.S. Appl. No. 15/876,715, mailed on Apr. 11, 2022, 4 Pages.
Corrected Notice of Allowance received for U.S. Appl. No. 15/876,715, mailed on Apr. 19, 2022, 4 Pages.
Corrected Notice of Allowance received for U.S. Appl. No. 16/142,635, mailed on Mar. 10, 2022, 2 Pages.
Corrected Notice of Allowance received for U.S. Appl. No. 16/233,990, mailed on Mar. 8, 2022, 4 pages.
Corrected Notice of Allowance received for U.S. Appl. No. 17/065,387, mailed on Mar. 30, 2022, 2 Pages.
Final Office Action received for U.S. Appl. No. 16/888,453, mailed on Apr. 8, 2022, 39 pages.
Final Office Action received for U.S. Appl. No. 16/697,090, mailed on Feb. 23, 2022, 25 pages.
Final Office Action received for U.S. Appl. No. 16/827,910, mailed on Feb. 28, 2022, 17 pages.

(56) References Cited

OTHER PUBLICATIONS

Final Office Action received for U.S. Appl. No. 17/353,527, mailed on May 11, 2022, 17 Pages.
Non-Final Office Action received for U.S. Appl. No. 15/167,801, mailed on May 18, 2022, 17 Pages.
Non-Final Office Action received for U.S. Appl. No. 16/827,926, mailed on Apr. 25, 2022, 27 pages.
Non-Final Office Action received for U.S. Appl. No. 16/888,478, mailed on May 2, 2022, 29 pages.
Non-Final Office Action received for U.S. Appl. No. 17/379,785, mailed on Mar. 30, 2022, 18 Pages.
Notice of Allowance received for U.S. Appl. No. 15/876,715, mailed on Apr. 4, 2022, 7 pages.
Notice of Allowance received for U.S. Appl. No. 16/827,931, mailed on Apr. 19, 2022, 7 Pages.
Notice of Allowance received for U.S. Appl. No. 16/865,172, mailed on Apr. 13, 2022, 8 pages.
Notice of Allowance received for U.S. Appl. No. 16/872,274, mailed on Apr. 19, 2022, 10 Pages.
Notice of Allowance received for U.S. Appl. No. 16/945,724, mailed on Apr. 4, 2022, 8 Pages.
Search Report received for Chinese Patent Application No. 201680050096.X, mailed on Jan. 10, 2022, 4 pages (2 pages of English Translation and 2 pages of Official Copy).
Corrected Notice of Allowance received for U.S. Appl. No. 16/233,990, mailed on Oct. 20, 2022, 2 pages.
Corrected Notice of Allowance received for U.S. Appl. No. 16/872,274, mailed on Aug. 12, 2022, 5 pages.
Corrected Notice of Allowance received for U.S. Appl. No. 16/945,724, mailed on Aug. 31, 2022, 2 pages.
Corrected Notice of Allowance received for U.S. Appl. No. 17/000,112, mailed on Jun. 17, 2022, 2 pages.
Extended European Search Report received for European Patent Application No. 22167405.4, mailed on Jul. 4, 2022, 11 Pages.
Final Office Action received for U.S. Appl. No. 16/584,790, mailed on Jun. 14, 2022, 37 pages.
Final Office Action received for U.S. Appl. No. 17/210,352, mailed on Jun. 3, 2022, 21 pages.
Final Office Action received for U.S. Appl. No. 17/379,785, mailed on Oct. 28, 2022, 14 pages.
Non-Final Office Action received for U.S. Appl. No. 16/697,090, mailed on Jul. 7, 2022, 25 pages.
Non-Final Office Action received for U.S. Appl. No. 16/827,910, mailed on Sep. 14, 2022, 18 pages.
Non-Final Office Action received for U.S. Appl. No. 17/133,550, mailed on Sep. 9, 2022, 23 pages.
Non-Final Office Action received for U.S. Appl. No. 17/457,901, mailed on Apr. 28, 2022, 24 Pages.
Notice of Allowance received for U.S. Appl. No. 15/719,404, mailed on Jul. 13, 2022, 8 Pages.
Notice of Allowance received for U.S. Appl. No. 15/719,404, mailed on Nov. 9, 2022, 7 pages.
Notice of Allowance received for U.S. Appl. No. 15/876,715, mailed on Aug. 3, 2022, 7 Pages.
Notice of Allowance received for U.S. Appl. No. 16/233,990, mailed on May 26, 2022, 5 pages.
Notice of Allowance received for U.S. Appl. No. 16/233,990, mailed on Oct. 5, 2022, 5 pages.
Notice of Allowance received for U.S. Appl. No. 16/827,918, mailed on Jun. 8, 2022, 9 Pages.
Notice of Allowance received for U.S. Appl. No. 16/865,172, mailed on Aug. 25, 2022, 8 Pages.
Notice of Allowance received for U.S. Appl. No. 16/945,724, mailed on Jul. 20, 2022, 8 Pages.
Notice of Allowance received for U.S. Appl. No. 17/000,112, mailed on Jun. 3, 2022, 14 pages.
Notice of Allowance received for U.S. Appl. No. 17/000,112, mailed on Oct. 18, 2022, 10 pages.
Notice of Allowance received for U.S. Appl. No. 17/654,578, mailed on Oct. 25, 2022, 8 pages.
Notice of Allowance received for U.S. Appl. No. 17/457,901, mailed on Nov. 16, 2022, 9 pages.
Search Report received for Chinese Patent Application No. 201780066823.6, mailed on Nov. 1, 2022, 4 pages (2 pages of English Translation and 2 Pages of Official Copy).
Final Office Action received for U.S. Appl. No. 16/697,090, mailed on Dec. 14, 2022, 28 pages.
Final Office Action received for U.S. Appl. No. 16/827,910, mailed on Mar. 15, 2023, 18 pages.
Final Office Action received for U.S. Appl. No. 16/827,926, mailed on Apr. 18, 2023, 32 pages.
Final Office Action received for U.S. Appl. No. 16/888,478, mailed on Feb. 13, 2023, 27 pages.
Final Office Action received for U.S. Appl. No. 17/133,550, mailed on Feb. 15, 2023, 22 pages.
Final Office Action received for U.S. Appl. No. 17/586,625, mailed on May 4, 2023, 15 pages.
Final Office Action received for U.S. Appl. No. 17/660,622, mailed on May 24, 2023, 20 pages.
Non-Final Office Action received for U.S. Appl. No. 15/167,801, mailed on Feb. 8, 2023, 23 pages.
Non-Final Office Action received for U.S. Appl. No. 15/719,404, mailed on May 10, 2023, 14 pages.
Non-Final Office Action received for U.S. Appl. No. 17/353,527, mailed on Dec. 8, 2022, 17 pages.
Non-Final Office Action received for U.S. Appl. No. 17/379,785, mailed on Mar. 9, 2023, 14 pages.
Non-Final Office Action received for U.S. Appl. No. 17/586,625, mailed on Sep. 1, 2022, 13 pages.
Non-Final Office Action received for U.S. Appl. No. 17/651,731, mailed on Apr. 25, 2023, 9 pages.
Non-Final Office Action received for U.S. Appl. No. 17/656,610, mailed on Feb. 6, 2023, 10 pages.
Non-Final Office Action received for U.S. Appl. No. 17/660,622, mailed on Dec. 20, 2022, 17 pages.
Non-Final Office Action received for U.S. Appl. No. 17/937,410, mailed on Mar. 2, 2023, 15 pages.
Non-Final Office Action received for U.S. Appl. No. 17/937,704, mailed on Mar. 30, 2023, 18 pages.
Non-Final Office Action received for U.S. Appl. No. 18/060,902, mailed on Mar. 10, 2023, 8 pages.
Notice of Allowability received for U.S. Appl. No. 17/457,901, mailed on Mar. 8, 2023, 9 pages.
Notice of Allowance received for U.S. Appl. No. 16/233,990, mailed on Jan. 31, 2023, 5 pages.
Notice of Allowance received for U.S. Appl. No. 16/584,790, mailed on Feb. 3, 2023, 9 pages.
Notice of Allowance received for U.S. Appl. No. 16/888,453, mailed on Mar. 1, 2023, 8 pages.
Notice of Allowance received for U.S. Appl. No. 17/210,352, mailed on Dec. 5, 2022, 9 pages.
Notice of Allowance received for U.S. Appl. No. 17/210,352, mailed on Mar. 16, 2023, 7 pages.
Notice of Allowance received for U.S. Appl. No. 17/367,227, mailed on Mar. 23, 2023, 12 pages.
Notice of Allowance received for U.S. Appl. No. 17/654,578, mailed on Feb. 15, 2023, 8 pages.
Search Report received for Chinese Patent Application No. 201811143102.3, mailed on Nov. 22, 2022, 5 pages (2 pages of English Translation and 3 pages of Official Copy).
Search Report received for Chinese Patent Application No. 201911313480.6, mailed on Jan. 20, 2023, 4 pages (2 pages of English Translation and 2 pages of Official Copy).
Search Report received for Chinese Patent Application No. 201911313496.7, mailed on Jan. 20, 2023, 4 pages (2 pages of English Translation and 2 pages of Official Copy).
Search Report received for Chinese Patent Application No. 201911313497.1, mailed on Apr. 11, 2023, 5 pages (2 pages of English Translation and 3 pages of Official Copy).
Search Report received for Chinese Patent Application No. 201911313497.1, mailed on Dec. 14, 2022, 3 pages (1 page of English Translation and 2 pages of Official Copy).

(56) References Cited

OTHER PUBLICATIONS

Search Report received for Chinese Patent Application No. 202010011436.6, mailed on Dec. 15, 2022, 9 pages (4 pages of English Translation and 5 pages of Official Copy).
Search Report received for Chinese Patent Application No. 202010662190.9, mailed on Apr. 28, 2023, 5 pages (2 pages of English Translation and 3 pages of Official Copy).
Search Report received for Chinese Patent Application No. 202010662206.6, mailed on Apr. 28, 2023, 5 pages (2 pages of English Translation and 3 pages of Official Copy).
Search Report received for Chinese Patent Application No. 202010662994.9, mailed on Apr. 28, 2023, 5 pages (2 pages of English Translation and 3 pages of Official Copy).
Search Report received for European Patent Application No. 20718506.7, mailed on Mar. 21, 2023, 2 pages.
Anonymous, "Video Progress Bar¿YouTube Help", Retrieved from the Internet: <https://web.archive.org/web/20190317001501/https://support.google.com/youtube/answer/7174115?hl=en>, [retrieved on Mar. 22, 202322], Mar. 17, 2019, 2 pages.
Apple, "The control is all yours", Available online at : <https://www.apple.com.cn/privacy/control/>, [Retrieved Dec. 29, 2022], Nov. 30, 2022, 12 pages. See attached Communication 37 CFR § 1.98(a)(3).
Beer et al., "The Odds of Running a Nonlinear TV Program Using Web Technologies", IEEE International Symposium on Broadband Multimedia Systems and Broadcasting (BMSB), 2011, 4 pages.
Biao et al., "Research on UI Optimization of Chinese Network Television Stations", Southeast Communications, 2013, 4 pages. See attached Communication 37 CFR § 1.98(a)(3).
Budhraja et al., "Probability Based Playlist Generation Based on Music Similarity and User Customization", National Conference on Computing and Communication Systems, 2012, 5 pages.
Cheng, Luo, "The Designing of Dynamic Play-list Based on Flash Streaming Media Technology", Computer and Telecommunication, 2008, 3 pages. See attached Communication 37 CFR § 1.98(a)(3).
Drews et al., "Virtual Jukebox—Reviving a Classic", Proceedings of the 35th Hawaii International Conference on System Sciences, 2022, 7 pages.
Jin et al., "Pricing Sponsored Content in Wireless Networks with Multiple Content Providers", The Fourth IEEE Workshop on Smart Data Pricing 2015, 2015, pp. 668-673.
Kimbler, Kristofer, "App Store Strategies for Service Providers", 2010 4th International Conference on Intelligence in Next Generation Networks, Nov. 18, 2010, 5 pages.
Liu, Chang, "Functions and Design of Multi-Screen Playing System in TV Variety Studio", Modern TV Technology, 2013, 5 pages. See attached Communication 37 CFR § 1.98(a)(3).
Meng et al., "Role Authorization Based Web Service Access Control Model", Journal of Lanzhou University (Natural Science Edition), vol. 42, No. 2, 2007, pp. 84-88. See attached Communication 37 CFR § 1.98(a)(3).
Tinari, George, "What's New in the Netflix Redesign and How to Use It", Retrieved from the Internet: <https://web.archive.org/web/20161110092133/https://www.guidingtech.com/48443/netflix-redesign-overview/ >, [retrieved on Mar. 22, 2023], Nov. 10, 2016, 9 pages.
Wang et al., "Authorization Management Mechanism of Web Application System", Network and Information Technology, vol. 25, No. 11, 2006, 3 pages. See attached Communication 37 CFR § 1.98(a)(3).
Zhang et al., "Music Playlist Prediction Via Detecting Song Moods", IEEE China Summit and International Conference on Signal and Information Processing, 2013, pp. 174-178.
Corrected Notice of Allowability received for U.S. Appl. No. 17/656,610, mailed on Jan. 13, 2025, 2 pages.
Corrected Notice of Allowability received for U.S. Appl. No. 17/657,913, mailed on Jan. 23, 2025, 2 pages.
Final Office Action received for U.S. Appl. No. 18/336,569, mailed on Feb. 4, 2025, 24 pages.
Final Office Action received for U.S. Appl. No. 18/391,448, mailed on Jan. 29, 2025, 14 pages.
Notice of Allowance received for U.S. Appl. No. 17/657,913, mailed on Jan. 14, 2025, 5 pages.
Notice of Allowance received for U.S. Appl. No. 17/937,410, mailed on Jan. 29, 2025, 8 pages.
Notice of Allowance received for U.S. Appl. No. 18/518,109, mailed on Jan. 17, 2025, 8 pages.
Advisory Action received for U.S. Appl. No. 18/060,902, mailed on Nov. 13, 2023, 2 pages.
Applicant Initiated Interview Summary received for U.S. Appl. No. 17/656,610, mailed on Apr. 10, 2024, 2 pages.
Corrected Notice of Allowability received for U.S. Appl. No. 18/060,902, mailed on Sep. 5, 2024, 4 pages.
Corrected Notice of Allowability received for U.S. Appl. No. 15/719,404, mailed on Mar. 22, 2024, 2 pages.
Corrected Notice of Allowability received for U.S. Appl. No. 17/586,625, mailed on Feb. 20, 2024, 2 pages.
Corrected Notice of Allowability received for U.S. Appl. No. 17/656,610, mailed on Dec. 19, 2024, 2 pages.
Corrected Notice of Allowability received for U.S. Appl. No. 17/657,913, mailed on Sep. 16, 2024, 2 pages.
Corrected Notice of Allowability received for U.S. Appl. No. 17/657,913, mailed on Sep. 26, 2024, 2 pages.
Corrected Notice of Allowability received for U.S. Appl. No. 17/937,704, mailed on Jul. 31, 2024, 8 pages.
Corrected Notice of Allowance received for U.S. Appl. No. 16/888,453, mailed on Jul. 26, 2023, 5 pages.
Corrected Notice of Allowance received for U.S. Appl. No. 16/888,478, mailed on Oct. 31, 2023, 6 pages.
Corrected Notice of Allowance received for U.S. Appl. No. 17/210,352, mailed on Sep. 20, 2023, 5 pages.
Corrected Notice of Allowance received for U.S. Appl. No. 17/367,227, mailed on Jul. 27, 2023, 2 pages.
European Search Report received for European Patent Application No. 20718505.9, mailed on Sep. 27, 2024, 5 pages.
Examiner's Answer to Appeal Brief received for U.S. Appl. No. 16/697,090, mailed on Oct. 26, 2023, 10 pages.
Examiner's Answer to Appeal Brief received for U.S. Appl. No. 17/133,550, mailed on Sep. 23, 2024, 26 pages.
Extended European Search Report received for European Patent Application No. 24152097.2, mailed on Jul. 23, 2024, 9 pages.
Extended European Search Report received for European Patent Application No. 24195286.0, mailed on Nov. 5, 2024, 9 pages.
Final Office Action received for U.S. Appl. No. 15/167,801, mailed on Sep. 19, 2023, 19 pages.
Final Office Action received for U.S. Appl. No. 17/379,785, mailed on Aug. 16, 2024, 14 pages.
Final Office Action received for U.S. Appl. No. 17/379,785, mailed on Aug. 23, 2023, 13 pages.
Final Office Action received for U.S. Appl. No. 17/656,610, mailed on Jan. 16, 2024, 12 pages.
Final Office Action received for U.S. Appl. No. 17/930,703, mailed on Nov. 6, 2024, 39 pages.
Final Office Action received for U.S. Appl. No. 17/937,410, mailed on Aug. 3, 2023, 15 pages.
Final Office Action received for U.S. Appl. No. 17/937,704, mailed on Aug. 31, 2023, 18 pages.
Final Office Action received for U.S. Appl. No. 18/060,902, mailed on Aug. 25, 2023, 8 pages.
Office Action received for U.S. Appl. No. 18/146,336, mailed on Feb. 23, 2024, 23 pages.
Office Action received for U.S. Appl. No. 17/133,550, mailed on Dec. 18, 2023, 25 pages.
Office Action received for U.S. Appl. No. 17/379,785, mailed on Feb. 15, 2024, 14 pages.
Office Action received for U.S. Appl. No. 17/656,610, mailed on Apr. 30, 2024, 12 pages.
Office Action received for U.S. Appl. No. 17/656,610, mailed on Jul. 26, 2023, 10 pages.
Office Action received for U.S. Appl. No. 17/657,913, mailed on Jan. 11, 2024, 20 pages.
Office Action received for U.S. Appl. No. 17/657,913, mailed on Jul. 21, 2023, 16 pages.

(56) References Cited

OTHER PUBLICATIONS

Office Action received for U.S. Appl. No. 17/930,703, mailed on May 16, 2024, 36 pages.
Office Action received for U.S. Appl. No. 17/937,410, mailed on Feb. 29, 2024, 16 pages.
Office Action received for U.S. Appl. No. 17/937,704, mailed on Feb. 1, 2024, 21 pages.
Office Action received for U.S. Appl. No. 18/060,902, mailed on Dec. 1, 2023, 9 pages.
Office Action received for U.S. Appl. No. 18/146,336, mailed on Aug. 3, 2023, 23 pages.
Office Action received for U.S. Appl. No. 18/168,490, mailed on Jun. 27, 2024, 19 pages.
Office Action received for U.S. Appl. No. 18/336,569, mailed on Oct. 23, 2024, 22 pages.
Office Action received for U.S. Appl. No. 18/391,448, mailed on Sep. 24, 2024, 12 pages.
Non-Final Office Action received for U.S. Appl. No. 18/518,109, mailed on Jul. 9, 2024, 26 pages.
Non-Final Office Action received for U.S. Appl. No. 18/602,342 mailed on Sep. 24, 2024, 19 pages.
Notice of Allowance received for U.S. Appl. No. 17/656,610, mailed on Sep. 11, 2024, 7 pages.
Notice of Allowance received for U.S. Appl. No. 17/657,913, mailed on Aug. 30, 2024, 7 pages.
Notice of Allowance received for U.S. Appl. No. 17/660,622, mailed on Aug. 22, 2024, 9 pages.
Notice of Allowance received for U.S. Appl. No. 18/168,490, mailed on Sep. 18, 2024, 10 pages.
Notice of Allowance received for U.S. Appl. No. 15/719,404, mailed on Dec. 8, 2023, 10 pages.
Notice of Allowance received for U.S. Appl. No. 16/827,910, mailed on Aug. 3, 2023, 21 pages.
Notice of Allowance received for U.S. Appl. No. 16/827,910, mailed on Dec. 13, 2023, 19 pages.
Notice of Allowance received for U.S. Appl. No. 16/827,926, mailed on Feb. 2, 2024, 8 pages.
Notice of Allowance received for U.S. Appl. No. 16/827,926, mailed on Sep. 13, 2023, 9 pages.
Notice of Allowance received for U.S. Appl. No. 16/888,453, mailed on Jun. 21, 2023, 7 pages.
Notice of Allowance received for U.S. Appl. No. 16/888,478, mailed on Aug. 2, 2023, 9 pages.
Notice of Allowance received for U.S. Appl. No. 17/353,527, mailed on Jul. 21, 2023, 7 pages.
Notice of Allowance received for U.S. Appl. No. 17/353,527, mailed on Oct. 4, 2023, 7 pages.
Notice of Allowance received for U.S. Appl. No. 17/586,625, mailed on Oct. 26, 2023, 7 pages.
Notice of Allowance received for U.S. Appl. No. 17/651,731, mailed on Jan. 25, 2024, 5 pages.
Notice of Allowance received for U.S. Appl. No. 17/651,731, mailed on Jul. 10, 2024, 5 pages.
Notice of Allowance received for U.S. Appl. No. 17/651,731, mailed on Oct. 3, 2023, 5 pages.
Notice of Allowance received for U.S. Appl. No. 17/654,578, mailed on Jun. 13, 2023, 7 pages.
Notice of Allowance received for U.S. Appl. No. 17/660,622, mailed on Jan. 24, 2024, 11 pages.
Notice of Allowance received for U.S. Appl. No. 17/937,410, mailed on Sep. 26, 2024, 8 pages.
Notice of Allowance received for U.S. Appl. No. 17/937,704, mailed on Apr. 25, 2024, 12 pages.
Notice of Allowance received for U.S. Appl. No. 18/060,902, mailed on May 21, 2024, 8 pages.
Notice of Allowance received for U.S. Appl. No. 18/146,336, mailed on Nov. 22, 2024, 11 pages.
Notice of Allowance received for U.S. Appl. No. 18/395,268, mailed on Dec. 2, 2024, 8 pages.
Notice of Allowance received for U.S. Appl. No. 18/487,837, mailed on May 30, 2024, 8 pages.
Notice of Allowance received for U.S. Appl. No. 18/487,837, mailed on Nov. 8, 2024, 7 pages.
Notice of Allowance received for U.S. Appl. No. 18/503,515, mailed on Jun. 13, 2024, 8 pages.
Notice of Allowance received for U.S. Appl. No. 18/503,515, mailed on Oct. 1, 2024, 8 pages.
Notice of Allowance received for U.S. Appl. No. 18/518,365, mailed on Jul. 3, 2024, 8 pages.
Notice of Allowance received for U.S. Appl. No. 18/518,365, mailed on Nov. 6, 2024, 8 pages.
Patent Board Decision received for U.S. Appl. No. 16/697,090, mailed on Jul. 26, 2024, 33 pages.
Search Report received for Chinese Patent Application No. 201811143102.3, mailed on Nov. 2, 2023, 5 pages (3 pages of English Translation and 2 pages of Official copy).
Search Report received for Chinese Patent Application No. 202010011436.6 mailed on Aug. 30, 2023, 4 pages (2 pages of English Translation and 2 pages of Official Copy).
Search Report received for Chinese Patent Application No. 202010662994.9, mailed on Sep. 28, 2023, 3 pages (1 page of English Translation and 2 pages of Official Copy).
Search Report received for Chinese Patent Application No. 202080040260.5, mailed on Apr. 4, 2024, 8 pages (4 pages of English Translation and 4 pages of Official Copy).
Search Report received for Chinese Patent Application No. 202110201931.8, mailed on Oct. 16, 2023, 3 pages (1 page of English Translation and 2 pages of Official Copy).
Search Report received for Chinese Patent Application No. 202111293833.8, mailed on Dec. 9, 2023, 4 pages (2 pages of English Translation and 2 pages of Official Copy).
Search Report received for Chinese Patent Application No. 202111314528.2, mailed on Mar. 30, 2024, 4 pages (2 pages of English Translation and 2 pages of Official Copy).
Search Report received for Chinese Patent Application No. 202111635535.2, mailed on Dec. 21, 2023, 5 pages (2 pages of English Translation and 3 pages of Official Copy).
Search Report received for Chinese Patent Application No. 202210608296.X, mailed on Aug. 15, 2024, 4 pages (1 page of English Translation and 3 pages of Official Copy).
Search Report received for Chinese Patent Application No. 202210799020.4, mailed on Jul. 27, 2023, 5 pages (1 page of English Translation and 4 pages of Official Copy).
Usainbolt.com, Available online at: <https://usainbolt.com/>; <https://web.archive.org>, Archived on Mar. 15, 2015 in Wayback Machine, 2015, 4 pages.
Anonymous, "YouTube(TM) On Hover : addOn.com", Retrieved from the Internet: <URL: https://web.archive.org/web/20180713134812/https://addOn.com/youtube- hover.html>, [retrieved on 2024-11-08], Jul. 13, 2018, 4 pages.
Cai Chongshan, "Analysis of Copyright Infringement Problems of Video Aggregation App", China Copyright, vol. 02, [retrieved on 2023-10-06], Available online at: <http://www.cqvip.com/qk/81889a/2015002/9071668150484953485048.html>, Apr. 15, 2015, 2 pages (1 page English Translation and 1 page Official Copy).
Chen et al., "What a Juke! A Collaborative Music Sharing System", IEEE, 2012, 6 pages.
Cunningham et al., "An Ethnographic Study of Music Information Seeking: Implications for the Design of a Music Digital Library", IEEE, 2003, 13 pages.
Kim et al., "Towards Optimal Navigation Through Video Content on Interactive TV", Interacting with Computers, vol. 18, No. 4, Mar. 3, 2006, pp. 723-746.
Leonard Sengere, "You can now hover over videos on Youtube to get GIF like previews—Techzim", Retrieved from the Internet: URL: <https://web.archive.org/web/20171007193435/https://www.techzim.co.zw/2017/07/can-now-hover-videos-youtube-get-gif-like-previews/>, [retrieved on Nov. 8, 2024], Oct. 7, 2017, 6 pages.
Matejka et al., "Swifter: Improved Online Video Scrubbing", Proceedings of the SIGCHI Conference on Human Factors in Computing Systems, Apr. 27-May 2, 2013, 10 pages.

(56) References Cited

OTHER PUBLICATIONS

Schmidt Alexander, "Graphical User Interface for Video on Demand Navigation from an IPTV Set Top Box", Jun. 16, 2009, 52 pages.
Tech Life Unity, "How to Use Netflix | Netflix Guide Part 2", Available online at: <https://www.youtube.com/watch?v=Hg4IC_BIHss> [Retrieved 2024-09-16], Aug. 19, 2017, 2 pages.

* cited by examiner

The second portion of the first content includes a scrollable set of content affordances, and a first content affordance of the scrollable set of content affordances is displayed in a second respective region of the display, and
in response to detecting the second movement of the contact, and in accordance with a determination that the scrollable set of content affordances is selected, scroll the scrollable set of content affordances, where scrolling the scrollable set of content affordances replaces displaying the first content affordance in the second respective region of the display with displaying a second content affordance of the scrollable set of content affordances in the second respective region of the display, and where the second content affordance was not displayed in the second respective region prior to detecting the second movement of the contact
724

Detect a selection of the second content affordance, and
in response to detecting the selection of the second content affordance, display a portion of content associated with the second content affordance in the respective region affordance
726

In response to detecting the selection of the second content affordance, obtain content associated with the second content affordance,
overlay a content user interface on top of a portion of the first content, and
display a portion of content associated with the second content affordance in the content user interface
728

FIG. 7C

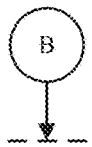

After scrolling the first content to reveal the second portion of the first content, and in response to detecting the second movement of the contact after the determination that the scrolling of the first content met the content locking criteria, overlay the second portion of the first content with a content user interface, and display additional content associated with the first content in the content user interface overlaid on top of the second portion of the first content
730

While the content user interface is overlaid on top of the second portion of the first content, detect a selection of a region of the display that does not display the content user interface, and
in response to detecting a selection of a region of the display that does not display the content user interface, cease to display the overlay of the content user interface
732

The locking criteria include a criterion that is met when the scrolling of the first content comprises two discrete vertical scrolls within the predetermined period of time and in the fourth direction
734

After determining that the scrolling of the first content met content locking criteria, detect inputs indicative of a second scrolling of the first content, where the second scrolling of the first content comprises two discrete vertical scrolls within a second predetermined period of time and in a fifth direction opposite the fourth direction, and
in response to detecting the second movement of the contact after determining that the content unlocking criteria are met,
where content unlocking criteria include a criterion that is met when the first content comprises two discrete vertical scrolls within the predetermined period of time and in the fifth direction, switch from displaying the first content in the respective region of the display to displaying the second content in the respective region of the display
736

FIG. 7D

Display a first content preview affordance in a parent user interface,
detect a selection of the first content preview affordance, and
in response to detecting a selection of the first content preview affordance, overlay the parent user interface with a content information user interface, where displaying the first portion of first content in the respective region of the display includes displaying the first portion of the first content in the content information user interface
738

Display a scrollable set of content preview affordances in the parent user interface, where the first content preview affordance is one content preview affordance of the scrollable set of content preview affordances,
detect fourth movement of the contact on the touch-sensitive surface, and
in accordance with a determination that the scrollable set of content preview affordances is selected, scroll the scrollable set of content preview affordances, where scrolling the scrollable set of content preview affordances replaces displaying the first content preview affordance with displaying a second content preview affordance of the scrollable set of content preview affordances in the parent user interface
740

The first content and the second content are two of a set of content displayed in the content information user interface, and the scrollable set of content preview affordances displayed in the parent user interface and the set of content displayed in the content information user interface are displayed in the same order
742

While the content information user interface is overlaid on top of the parent user interface, detect a selection of a region of the display that does not display the content information user interface, and
in response to detecting a selection of a region of the display that does not display the content information user interface, remove the overlay of the content information user interface
744

Display an indication of the parent user interface in a region of the display that does not display the content information user interface
746

FIG. 7E

SCROLLABLE SET OF CONTENT ITEMS WITH LOCKING FEATURE

CLAIM FOR PRIORITY

This application claims benefit of U.S. Provisional Patent Application No. 62/633,333, entitled "SCROLLABLE SET OF CONTENT ITEMS WITH LOCKING FEATURE," filed on Feb. 21, 2018, which is hereby incorporated by reference in its entirety.

FIELD

The present disclosure relates generally to computer user interfaces, and more specifically to electronic devices with touch-sensitive surfaces that organize and present content items.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to navigate between related and unrelated user interfaces (e.g., between user interfaces for different applications and/or within a hierarchy of user interfaces within a single application).

Exemplary user interface hierarchies include groups of related user interfaces used for: organizing files and applications; storing and/or displaying digital images, editable documents (e.g., word processing, spreadsheet, and presentation documents), and/or non-editable documents (e.g., secured files and/or .pdf documents); recording and/or playing video and/or music; text-based communication (e.g., e-mail, texts, tweets, and social networking); voice and/or video communication (e.g., phone calls and video conferencing); and web browsing. A user will, in some circumstances, need to perform such user interface navigations within or between a file management program (e.g., Finder from Apple Inc. of Cupertino, Calif.), an image management application (e.g., Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these navigations and animating the transition between related user interfaces in a user interface hierarchy are cumbersome and inefficient. In addition, these methods take longer than necessary, thereby wasting energy. This latter consideration is particularly important in battery-operated devices.

Additionally, abrupt transitions between different user interfaces can be distracting and jarring for users, reducing the efficiency and enjoyment of the user when using the device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF SUMMARY

Some techniques for presenting content using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for presenting content. Such methods and interfaces optionally complement or replace other methods for presenting content. Such methods and interfaces reduce the number, extent, and/or nature of the inputs from a user, reduce the cognitive burden on the user, and produce a more efficient human-machine interface. For battery-operated computing devices, such methods and interfaces conserve power and increase the time between battery charges. Further, such methods and interfaces also streamline presentation of content, which reduces unnecessary received inputs and improves user efficiency and output.

The above deficiencies and other problems associated with user interfaces for electronic devices (e.g., with touch-sensitive surfaces) are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display and a touch-sensitive surface. The method also includes displaying a first portion of first content in a respective region of the display, wherein the first content is associated with second content that is not displayed on the display. While displaying the first portion of the first content, the method further includes detecting first movement of a contact on the touch-sensitive surface that includes movement in a first direction. In response to detecting the first movement of the contact on the touch-sensitive surface, the method further includes scrolling the first content in the respective region of the display to reveal a second portion of the first content that was not displayed in the respective region of the display prior to detecting the first movement of the contact, wherein the an amount of scrolling the first content is determined based on an amount of movement of the contact in a first direction. After scrolling the first content to reveal the second portion of the first content, the method further includes detecting second movement of the contact on the touch-sensitive surface that includes more than a threshold amount of movement in a second direction that is perpendicular to the first direction. In response to detecting the second movement of the contact, and in accordance with a determination that the scrolling of the first content met content locking criteria, wherein the content locking criteria include a requirement that the first content is scrolled by more than a predetermined amount (e.g., from a starting position or from a top of the first content), the method further includes maintaining display of the first content in the respective region of the display without displaying the second content in the respective region of the display. In response to detecting the second movement of the contact, and in accordance with a determination that the scrolling of the first content did not meet the content locking criteria, the method further includes switching from displaying the first content in the respective region of the display to displaying the second content in the respective region of the display.

In accordance with some embodiments, a non-transitory computer-readable storage medium comprising one or more programs, the one or more programs including instructions which, when executed by an electronic device with a display and a touch-sensitive surface, causes the electronic device to display a first portion of first content in a respective region of the display, wherein the first content is associated with second content that is not displayed on the display. While displaying the first portion of the first content, the instructions also cause the electronic device to detect first movement of a contact on the touch-sensitive surface that includes movement in a first direction. In response to detecting the first movement of the contact on the touch-sensitive surface, the instructions also cause the electronic device to, scroll the first content in the respective region of the display to reveal a second portion of the first content that was not displayed in the respective region of the display prior to detecting the first movement of the contact, wherein the an amount of scrolling the first content is determined based on an amount of movement of the contact in a first direction. After scrolling the first content to reveal the second portion of the first content, the instructions also cause the electronic device to, detect second movement of the contact on the touch-sensitive surface that includes more than a threshold amount of movement in a second direction that is perpendicular to the first direction. The instructions also cause the electronic device to, in response to detecting the second movement of the contact, and in accordance with a determination that the scrolling of the first content met content locking criteria, wherein the content locking criteria include a requirement that the first content is scrolled by more than a predetermined amount, maintain display of the first content in the respective region of the display without displaying the second content in the respective region of the display; and in accordance with a determination that the scrolling of the first content did not meet the content locking criteria, switch from displaying the first content in the respective region of the display to displaying the second content in the respective region of the display.

In accordance with some embodiments, an electronic device includes a display, a touch-sensitive surface, one or more processors, memory, and one or more programs; the one or more programs are stored in the memory and configured to be executed by the one or more processors, and the one or more programs include instructions for performing or causing performance of the operations of any of the methods described herein. In accordance with some embodiments, a non-transitory computer readable storage medium has stored therein one or more programs, the one or more programs including instructions which, when executed by one or more processors of an electronic device with a display and a touch-sensitive surface, cause the electronic device to perform or cause performance of the operations of any of the methods described herein. In accordance with some embodiments, a graphical user interface on an electronic device with a display and a touch-sensitive surface, memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and means for performing or causing performance of the operations of any of the methods described herein. In accordance with some embodiments, an information processing apparatus, for use in an electronic device with a display and a touch-sensitive surface, includes means for performing or causing performance of the operations of any of the methods described herein.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing content, thereby increasing the effectiveness, efficiency, and user satisfaction with such devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7E are flow diagrams of a process for displaying content items in accordance with some embodiments.

DESCRIPTION OF EMBODIMENTS

Figure 1A:
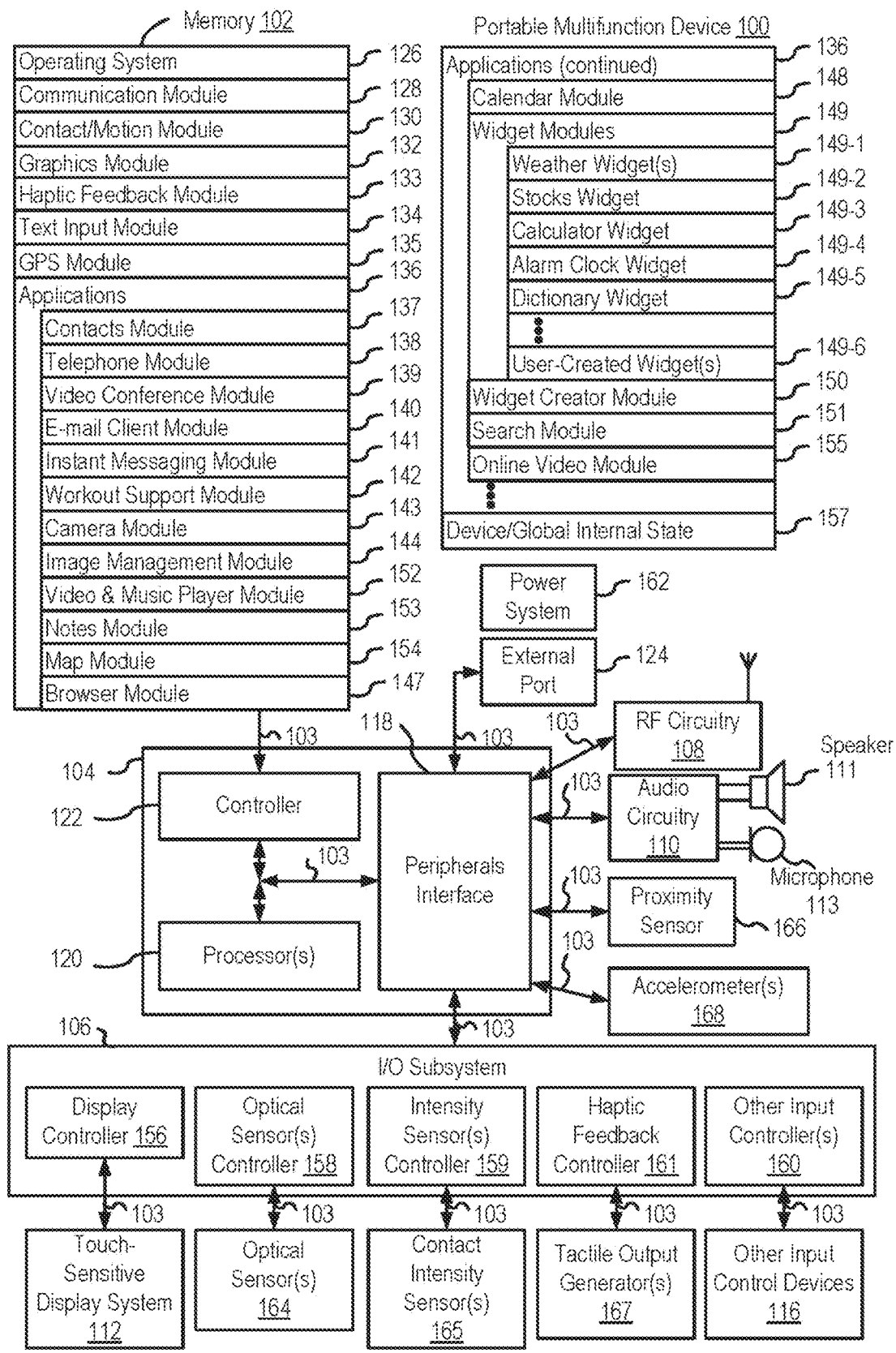
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces to streamline presentation of content. Such techniques can reduce the cognitive burden on a user when viewing content or interacting with content, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for presenting content. FIGS. 6A-6AG illustrate exemplary user interfaces for presenting content. FIGS. 7A-7E are flow diagrams illustrating methods of presenting content in accordance with some embodiments. The user interfaces in FIGS. 6A-6AG are used to illustrate the processes described below, including the processes in FIGS. 7A-7E.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S.

patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system)

receiver (not shown) for obtaining information concerning the location and orientation (e.g., portrait or landscape) of device 100.

Figure 3:
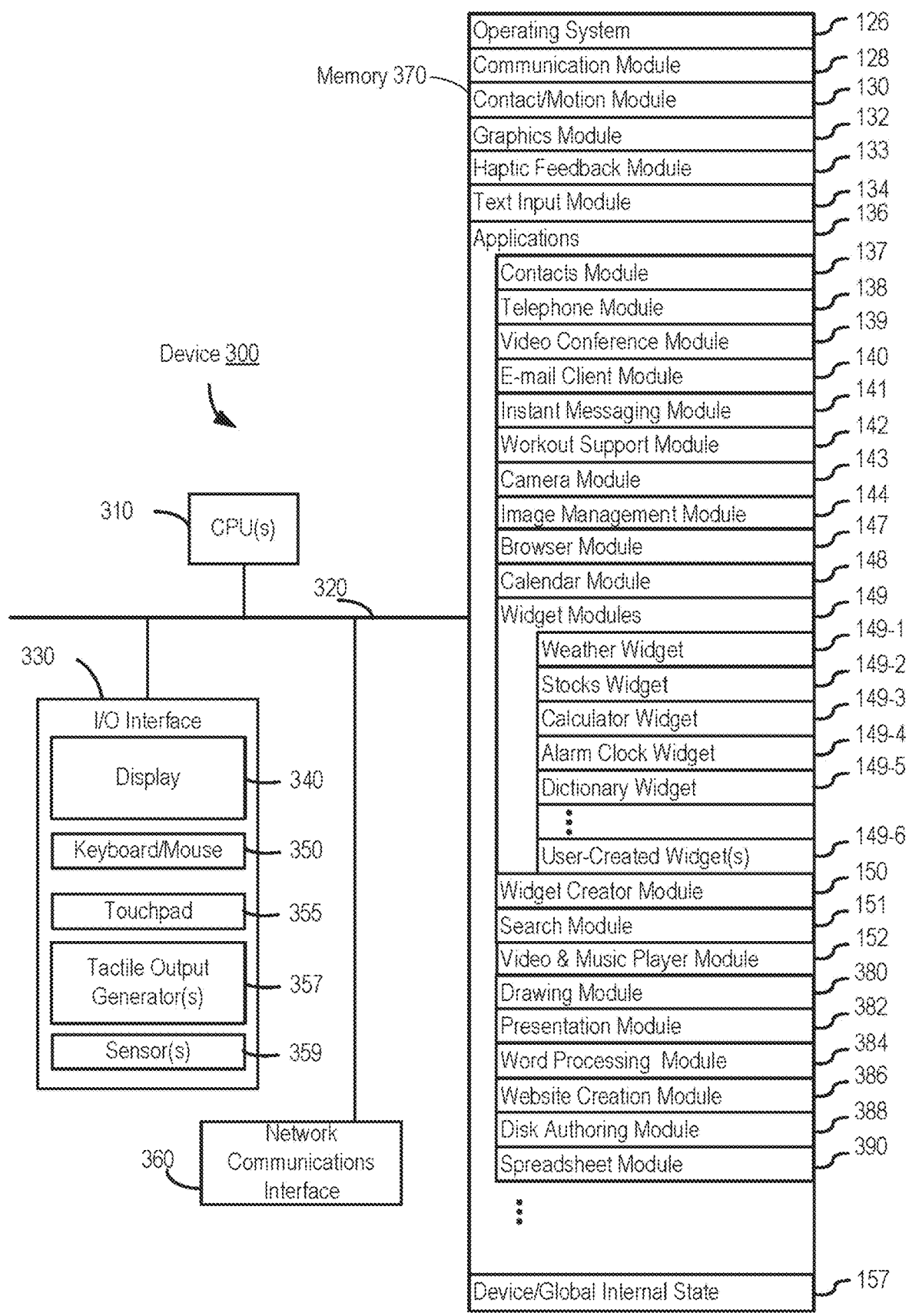
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
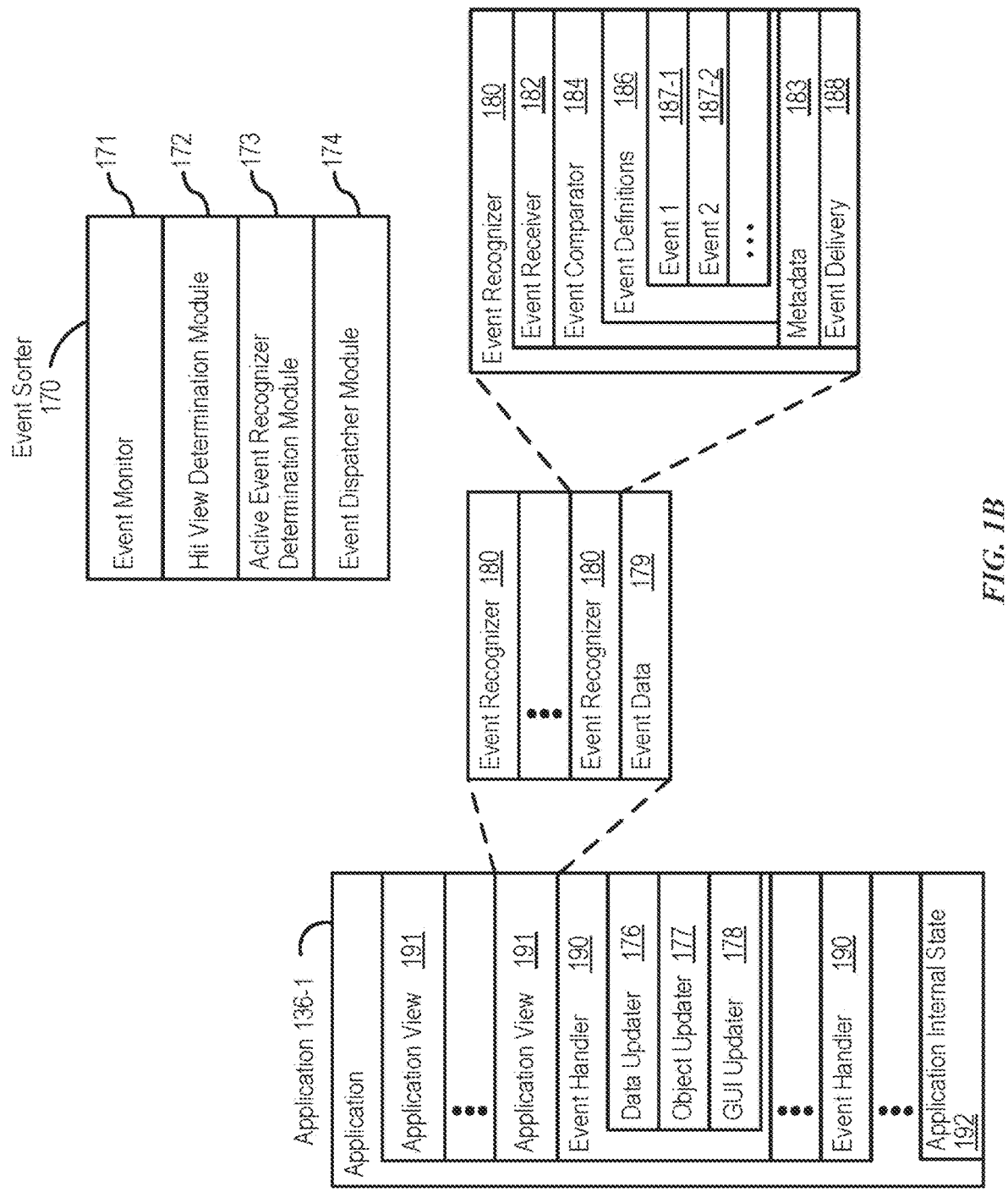
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180).

In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
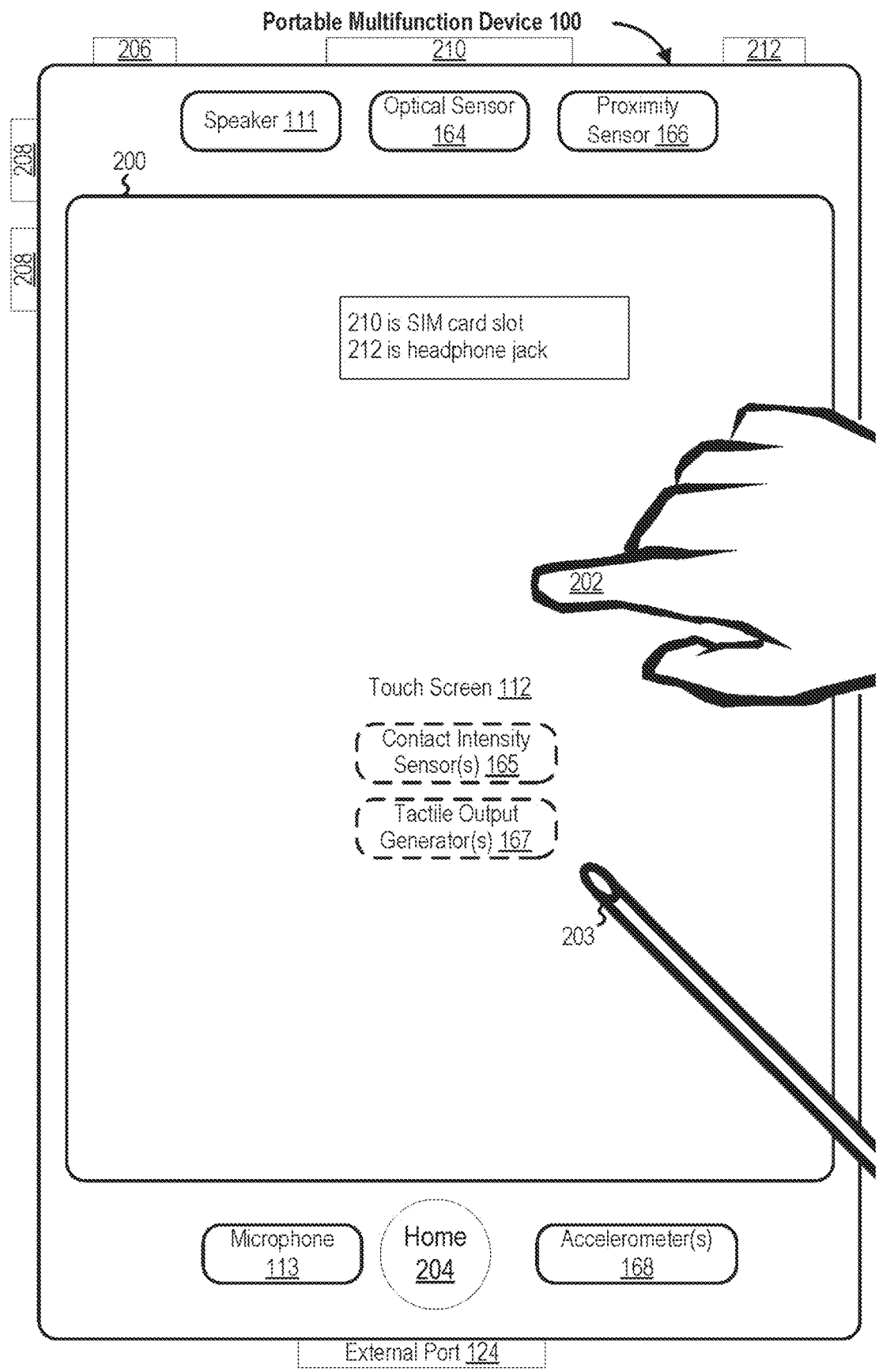
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
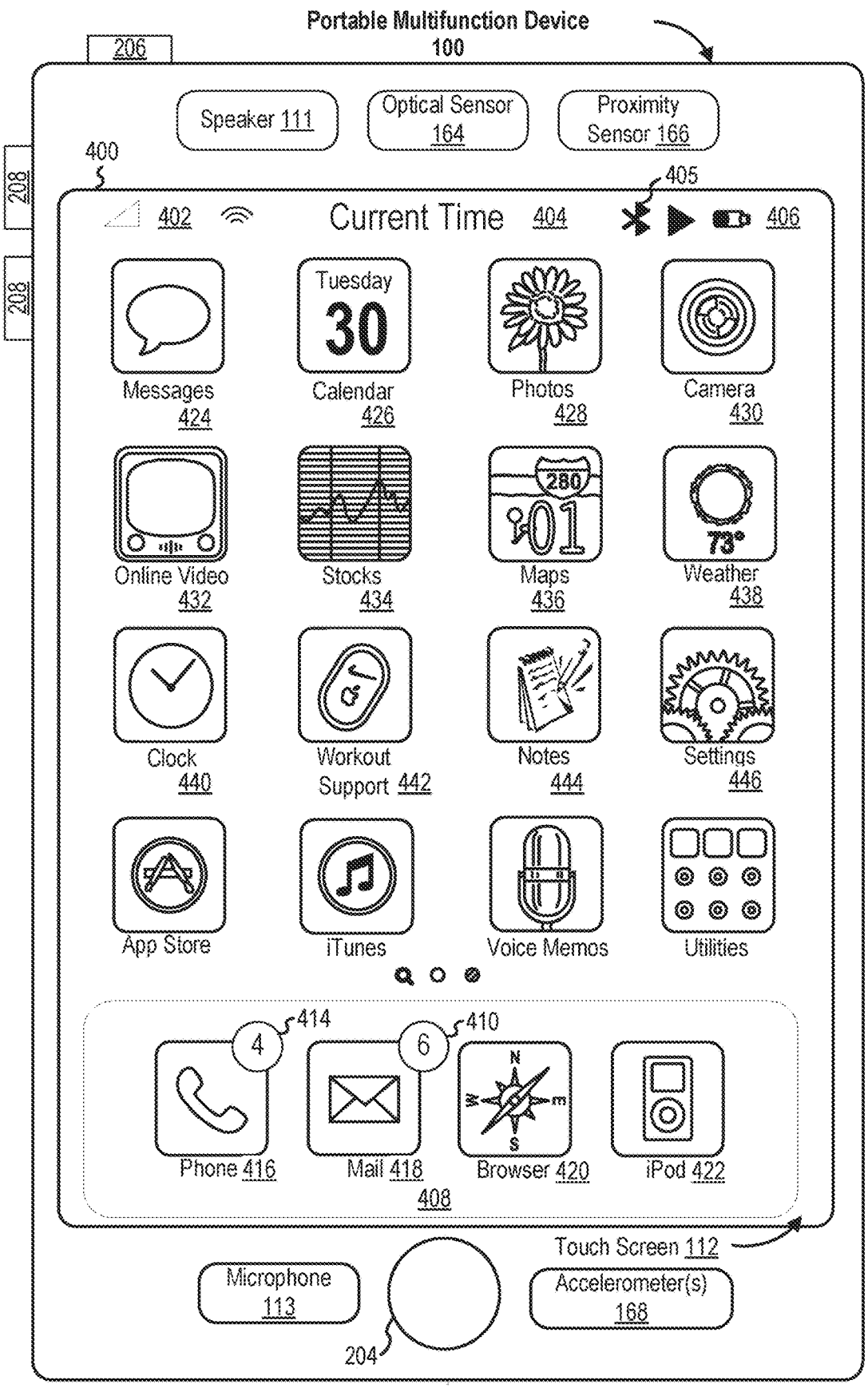
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
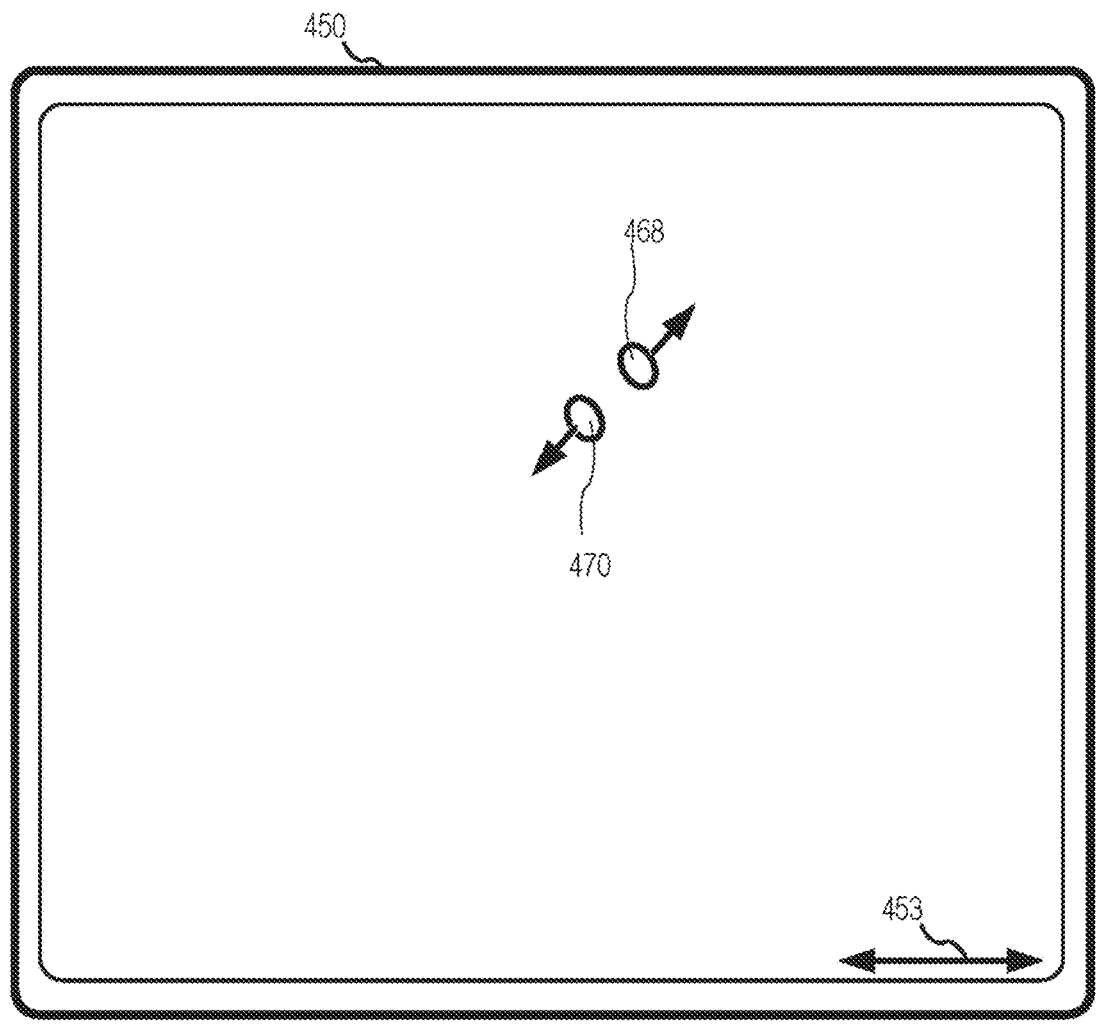
FIG. 4B illustrates an exemplary user interface for a multifunction device with a touch-sensitive surface that is separate from the display in accordance with some embodiments.
Figure 4B:
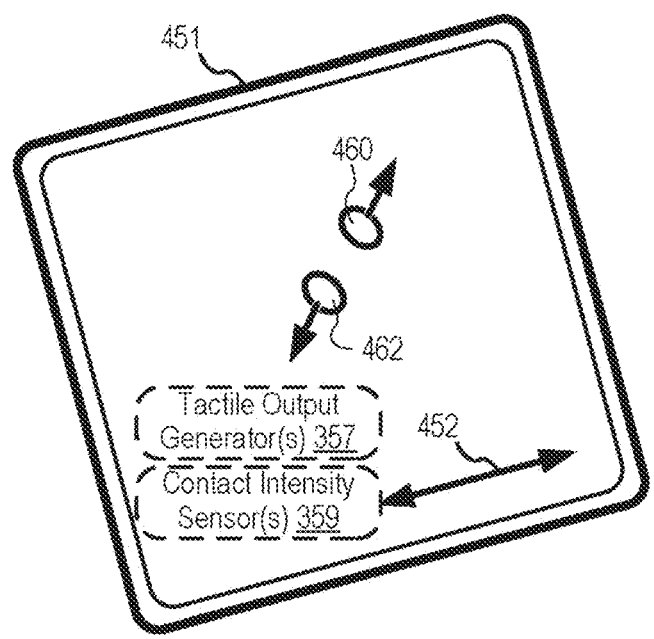

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
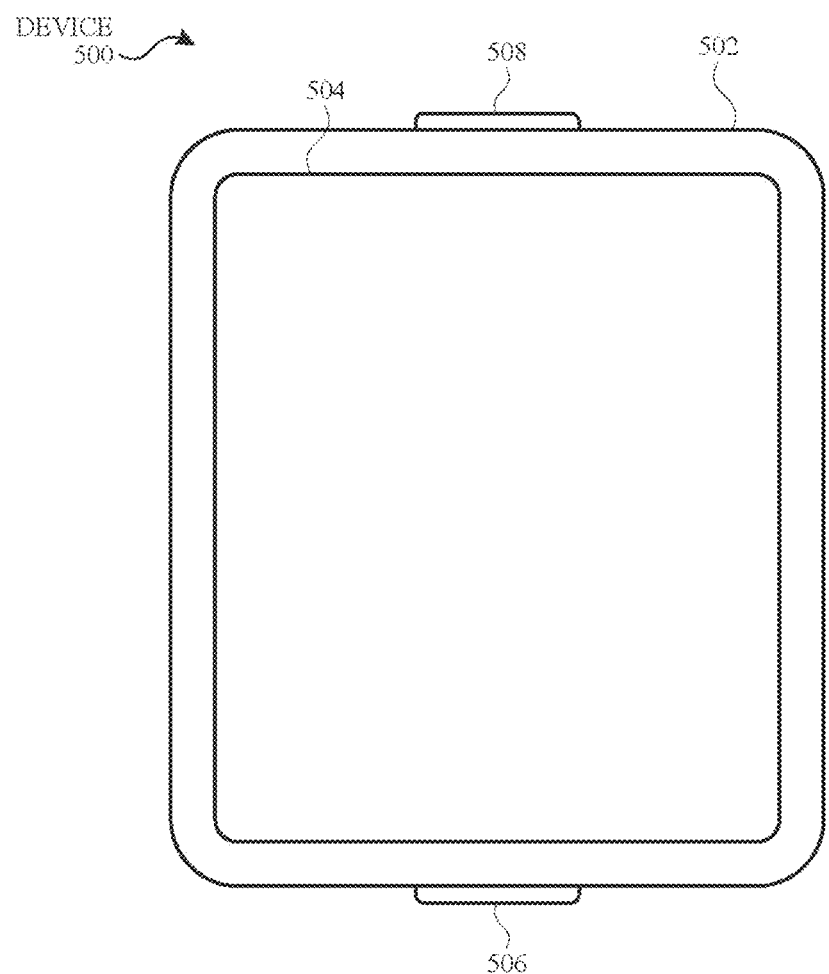
FIG. 5A illustrates a personal electronic device in accordance with some embodiments.
Figure 6A:
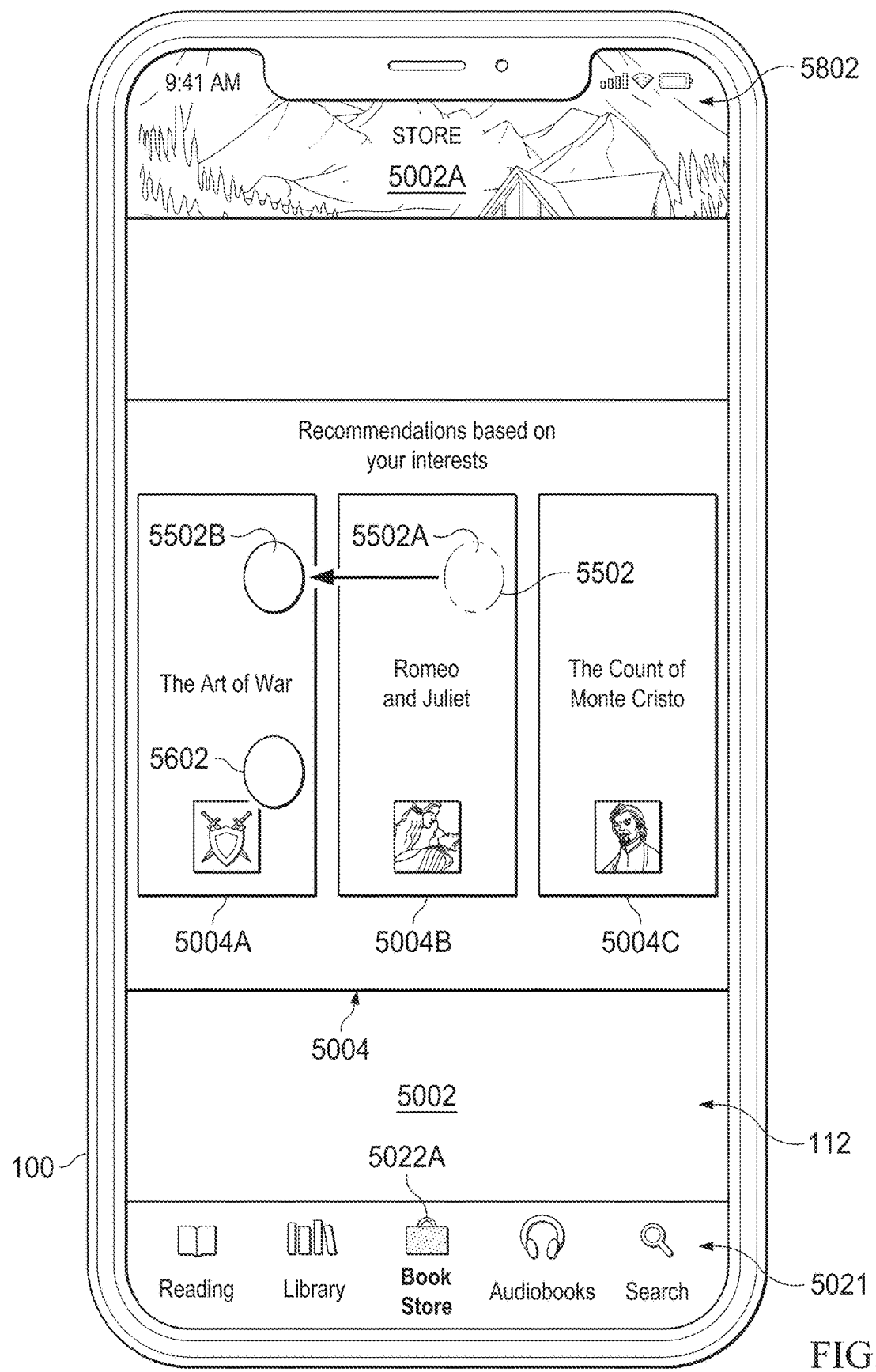
FIGS. 6A-6AG illustrate exemplary user interfaces for displaying content items in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
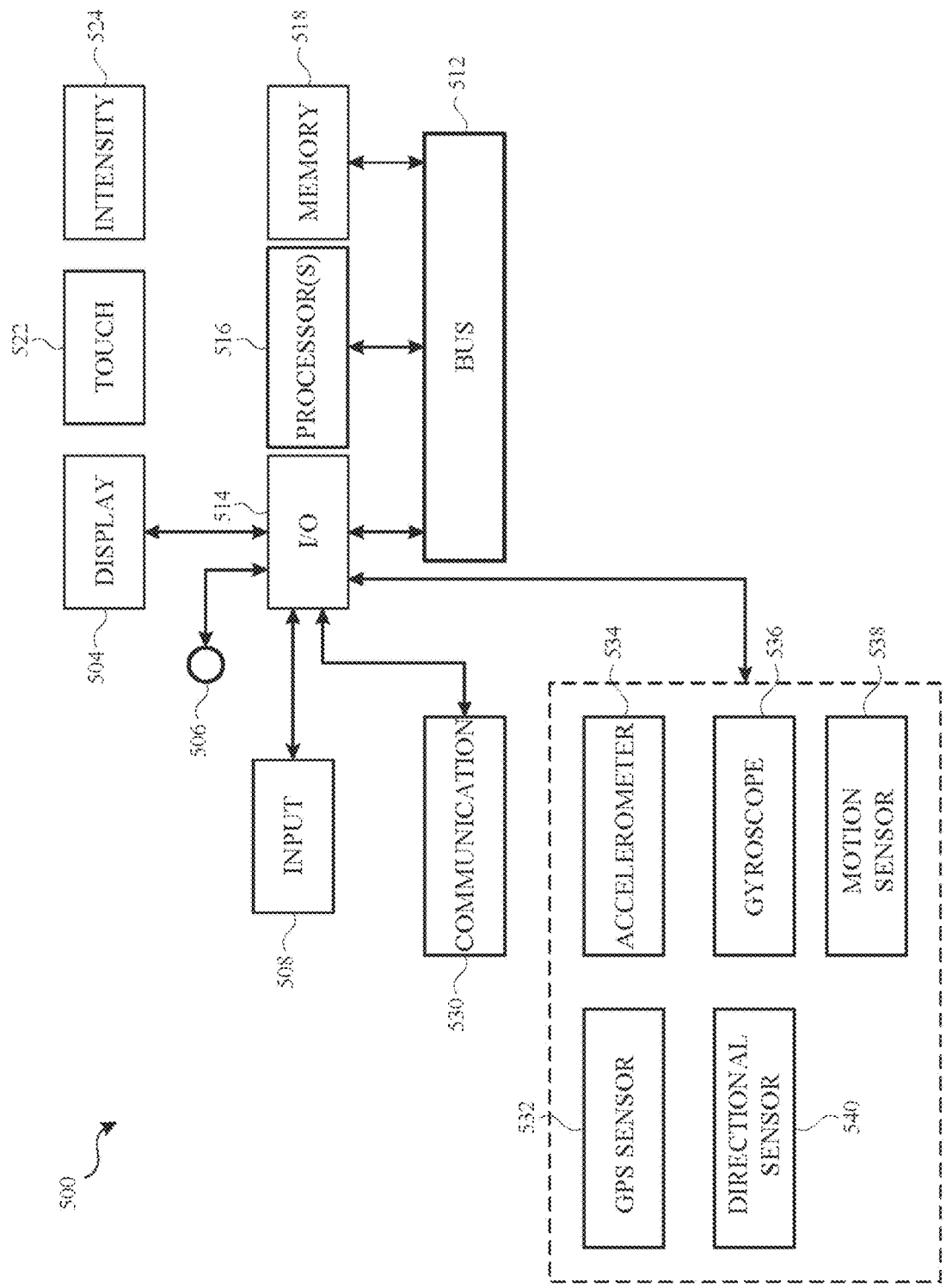
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7E). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or

500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
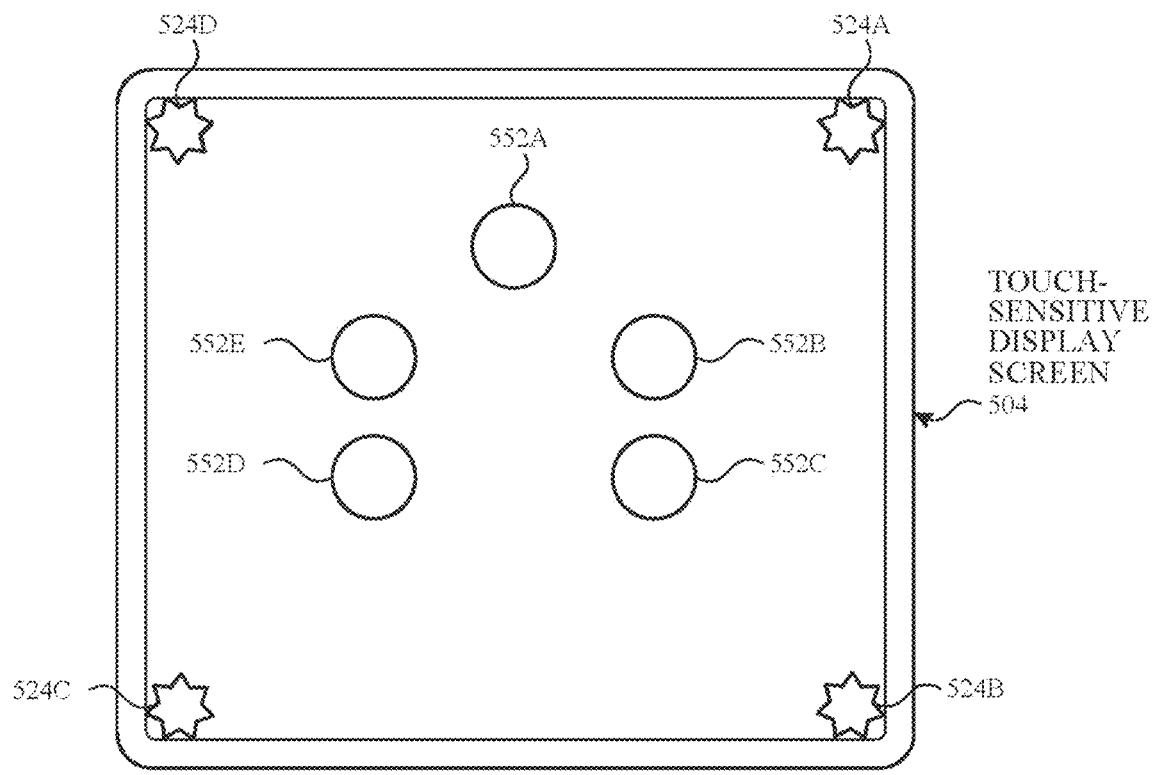
FIGS. 5C-5D illustrate exemplary components of a personal electronic device having a touch-sensitive display and intensity sensors in accordance with some embodiments.
Figure 5C:
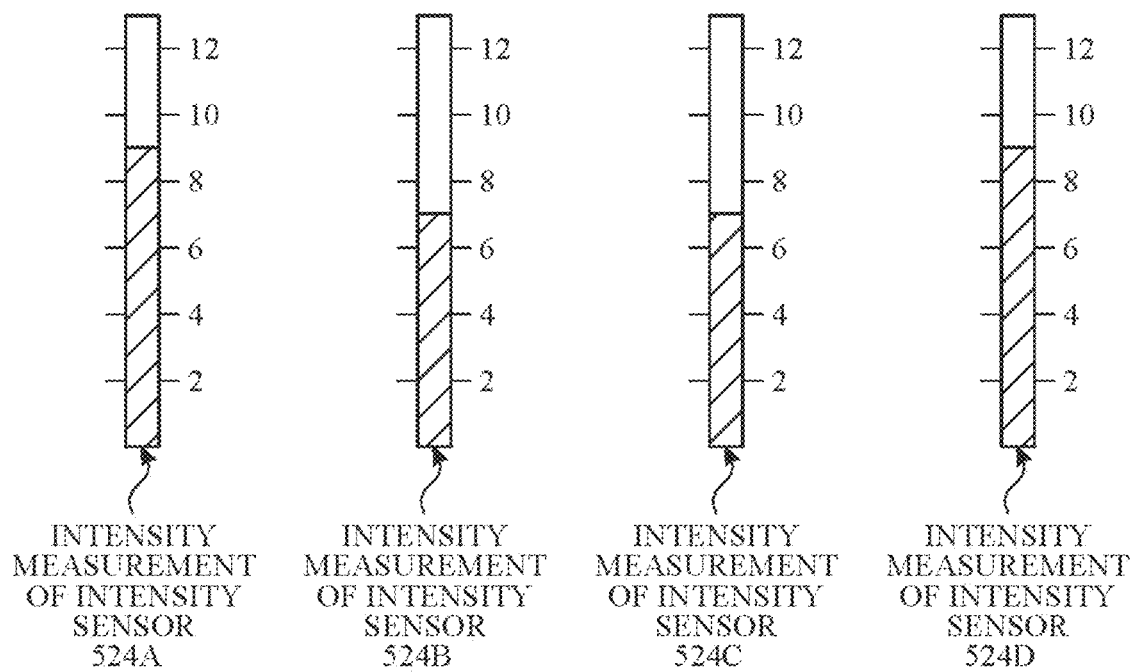
Figure 5D:
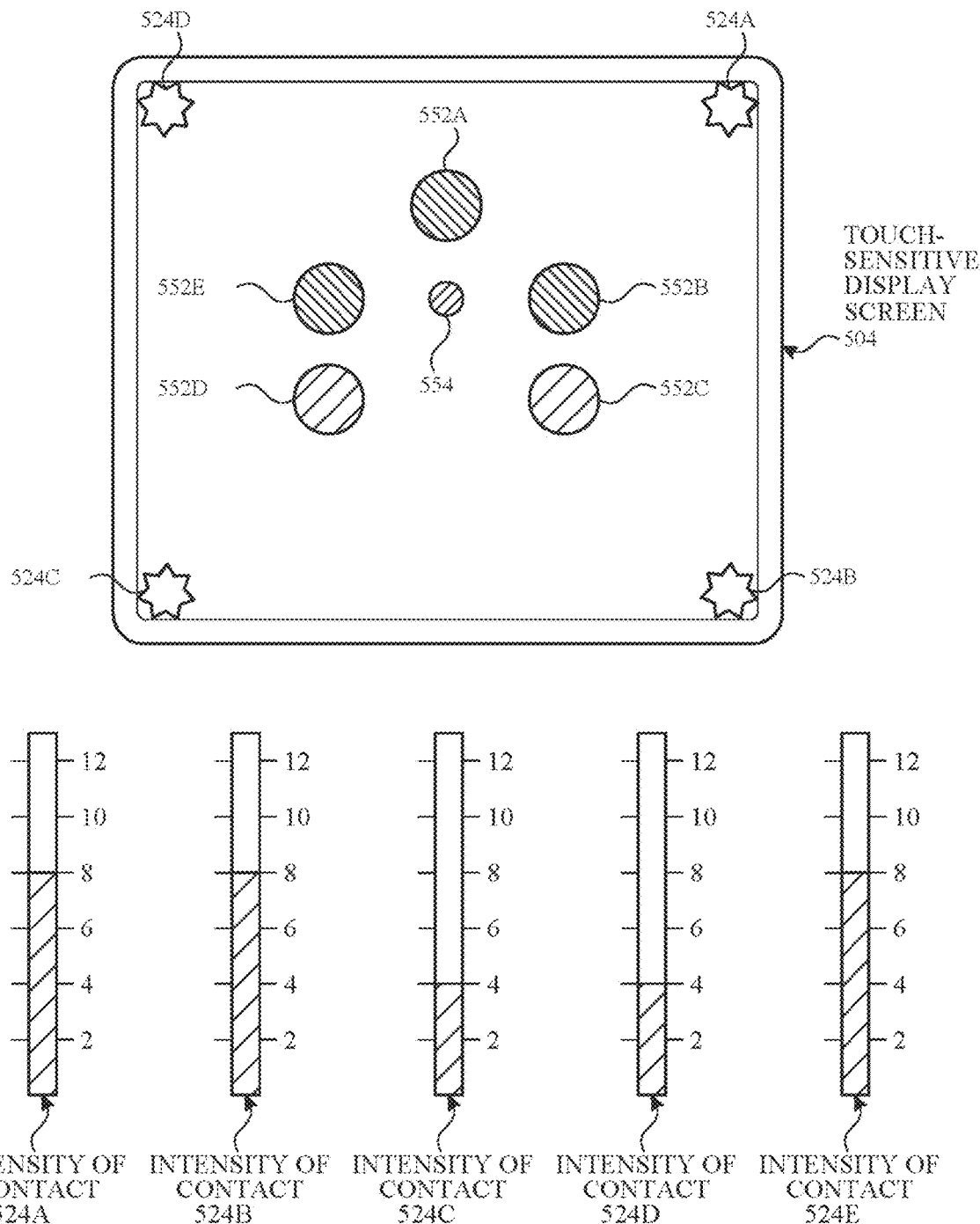

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
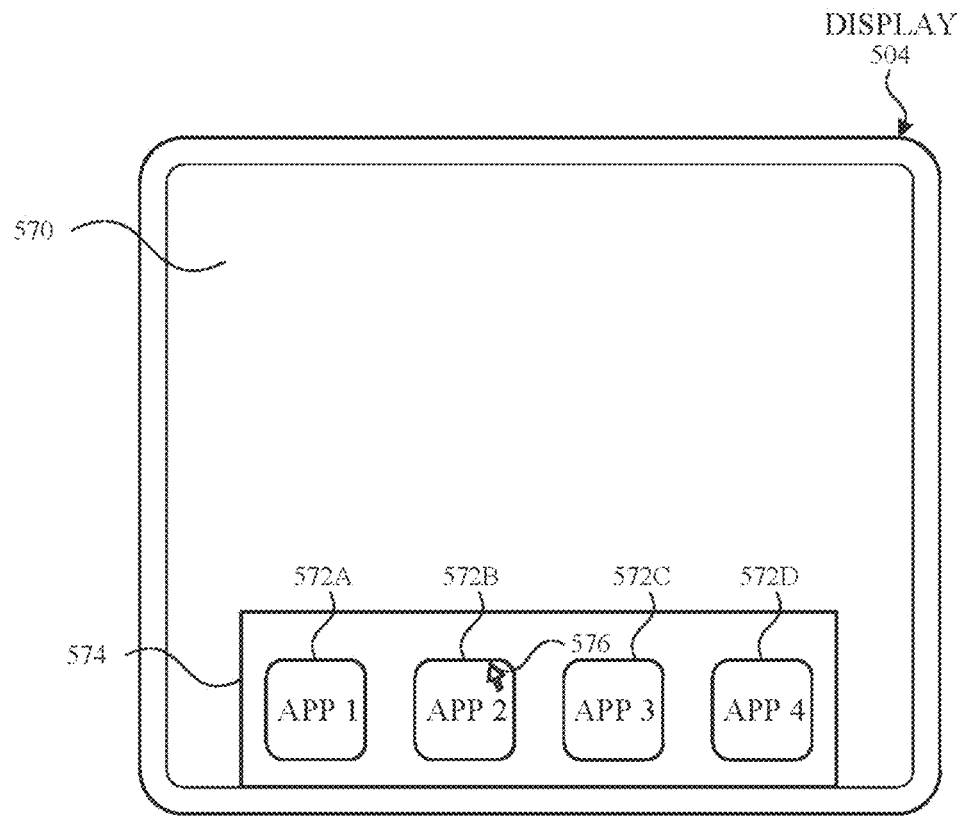
FIGS. 5E-5H illustrate exemplary components and user interfaces of a personal electronic device in accordance with some embodiments.
Figure 5E:
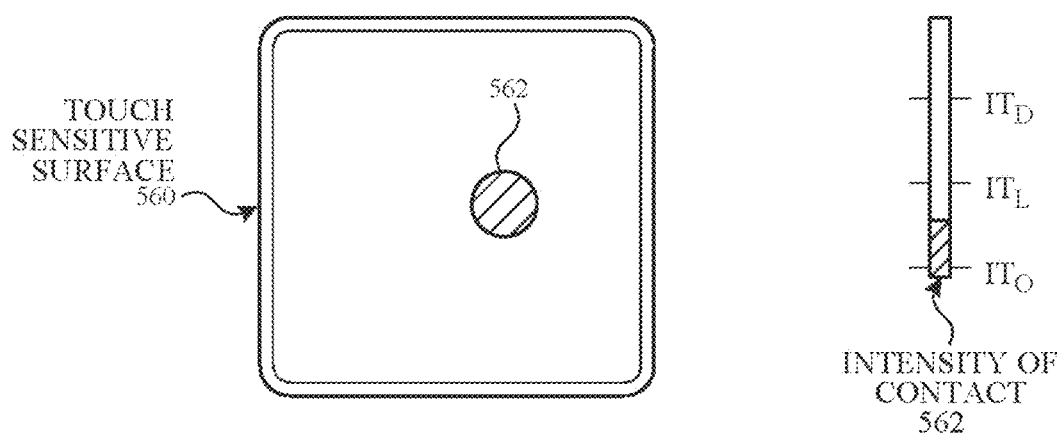
Figure 5F:
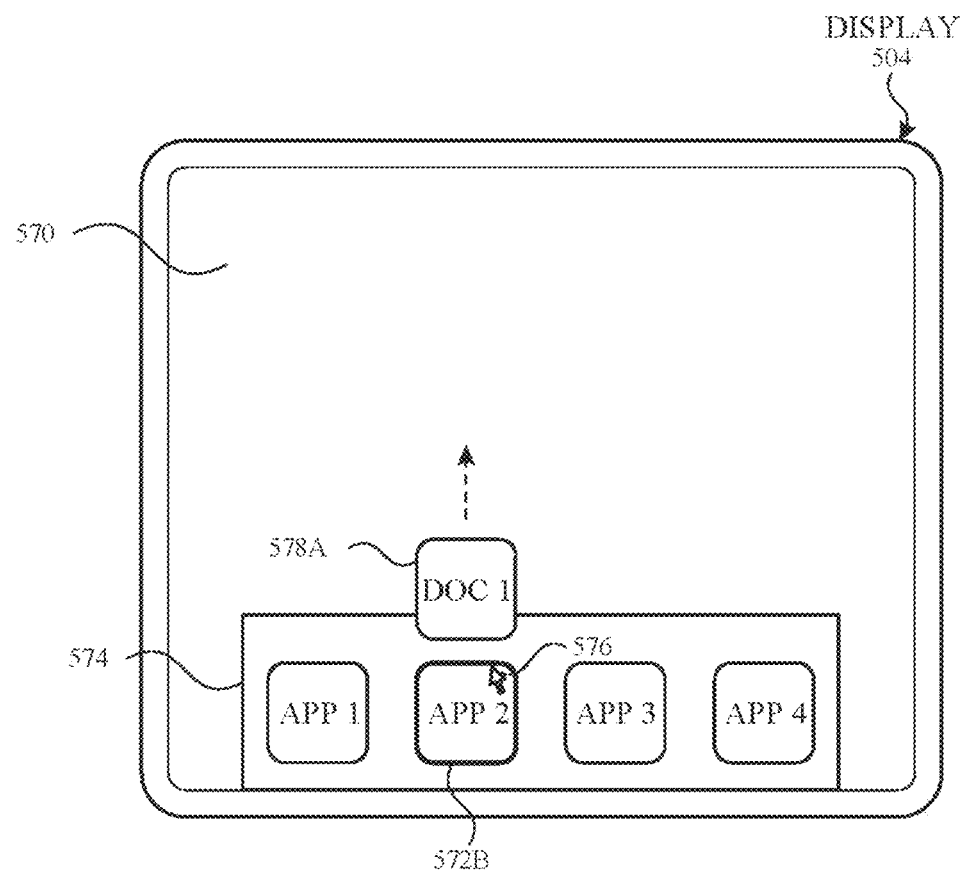
Figure 5F:
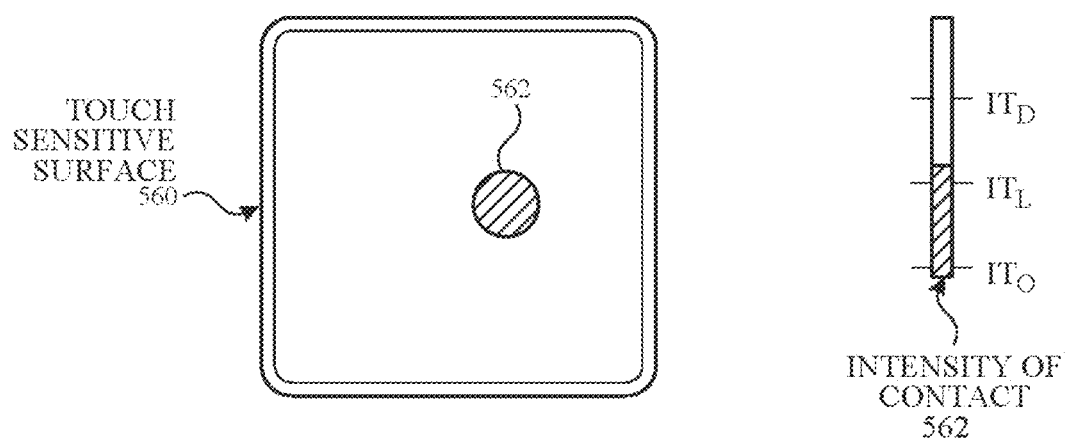
Figure 5G:
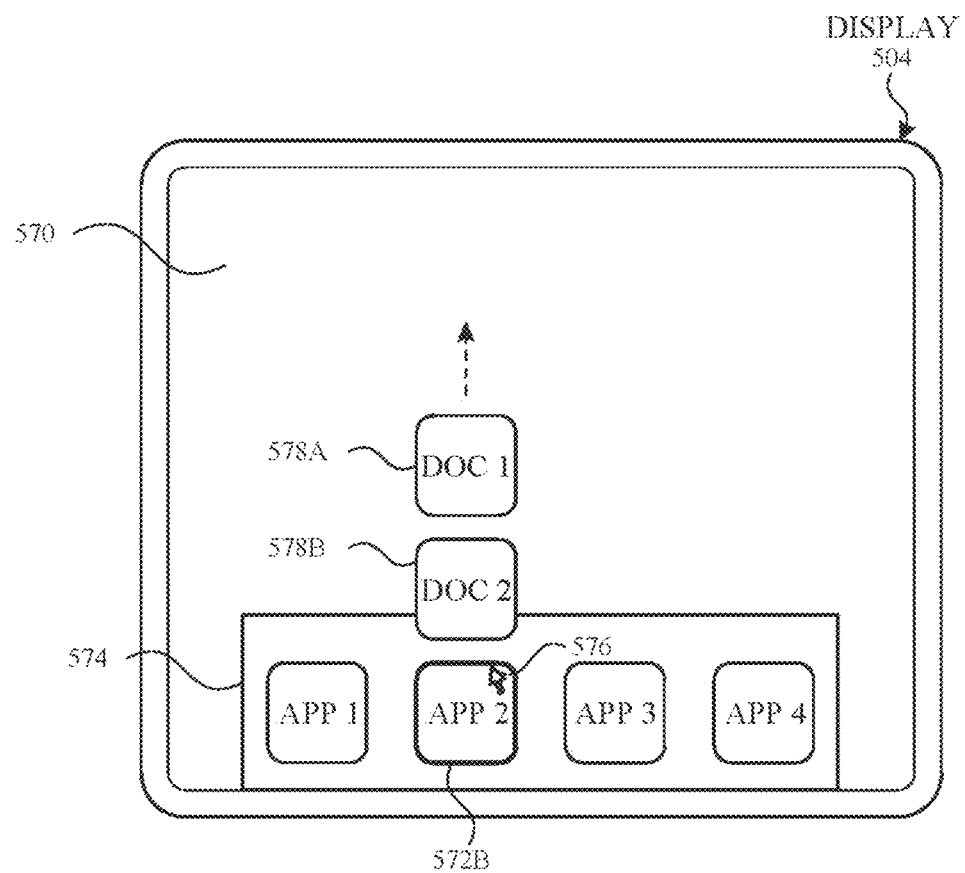
Figure 5G:
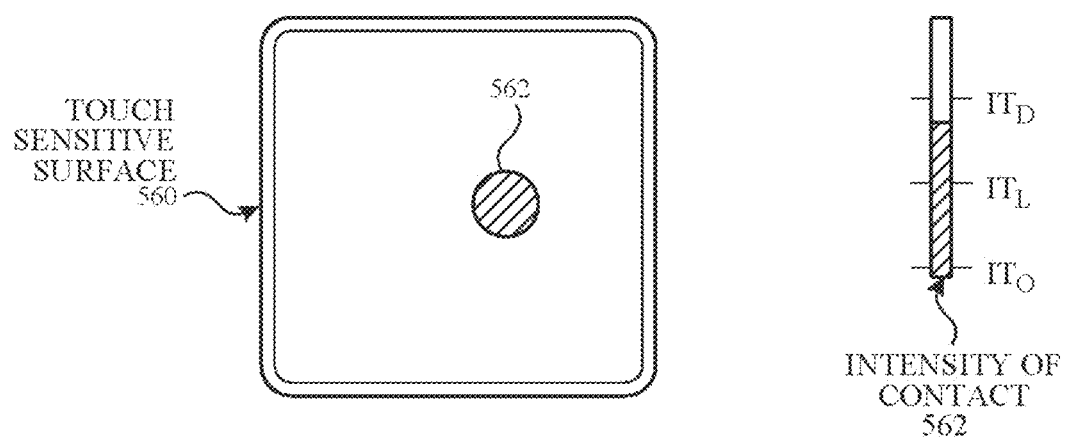
Figure 5H:
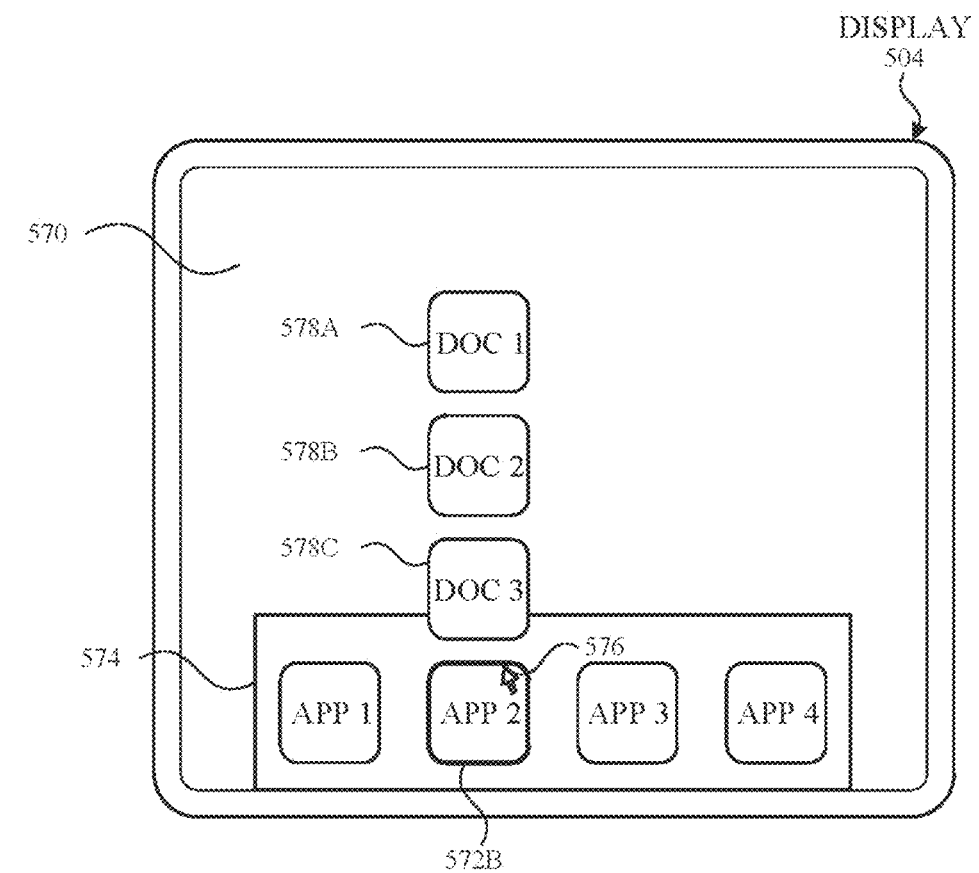
Figure 5H:
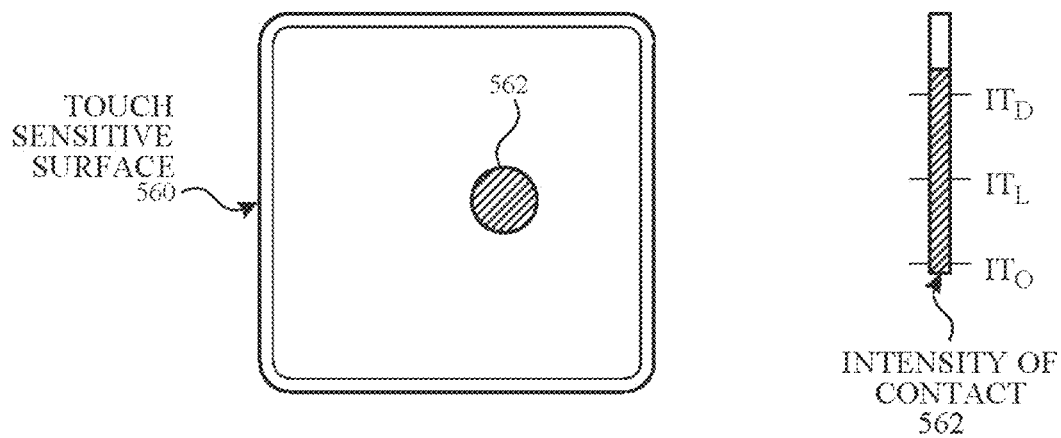

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6AG illustrate exemplary user interfaces for presenting content in accordance with some embodiments. The user interfaces in these figures are used to illustrate the processes described below, including the processes in FIGS. 7A-7E. Although some of the examples that follow will be given with reference to inputs on a touch-screen display (where the touch-sensitive surface and the display are combined) such as touch-sensitive display 112, in some embodiments, the device detects inputs on a touch-sensitive surface 451 that is separate from the display 450, as shown in FIG. 4B. In other embodiments, the processes described herein may be implemented with devices having physical user-interfaces, voice interfaces, or other suitable interfaces. For convenience of explanation, the embodiments described below will be discussed with reference to operations performed on a device with a touch-sensitive display system 112. In such embodiments, a focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces discussed below, along with a focus selector.

The user interfaces of FIGS. 6A-6AG allow a user to efficiently scroll through information about content items using device 100. More particularly, when a user is reviewing information about a particular product in a user interface, device 100 locks the user interface to reduce the likelihood that user gestures inadvertently cause device 100 to display content about other products. Device 100 may subsequently be unlocked to allow the user to browse between alternative products after the user has finished reviewing a particular product. In the illustrated embodiments of FIGS. 6A-6AG, the content items are products sold in an electronic store. However, the interfaces illustrated and described relative to FIGS. 6A-6AG may be used to browse any information regarding any content or subject matter.

FIG. 6A illustrates device 100 displaying a parent user interface 5002 of the electronic store. Parent user interface 5002 may be accessed, for example, by a user selection of a store affordance 5022A of a toolbar 5021 displayed on device 100. In the illustrated embodiment, parent user interface 5002 is an interface of an electronic store that allows a user to browse between different book titles. In the illustrated embodiment, a background image 5802 for the electronic store is displayed in a top region 5002A of parent user interface 5002.

In FIG. 6A, three content preview affordances 5004A-5004C are displayed in parent user interface 5002. As used herein, the term "content preview affordance" refers to a type of affordance that contains a preview (such as a book cover) of a content item (such as a book) sold in the electronic store. In the illustrated embodiment, content preview affordances 5004A-5004C include book covers of three different books (*The Art of War*, *Romeo and Juliet*, and *The Count of Monte Cristo*) recommended to the user based on the user's interests. For example, content preview affordance 5004A contains an image of a book cover for *The Art of War*. An interaction with any of content preview affordances 5004A-5004C causes device 100 to display content containing information about a corresponding book.

Figure 6B:
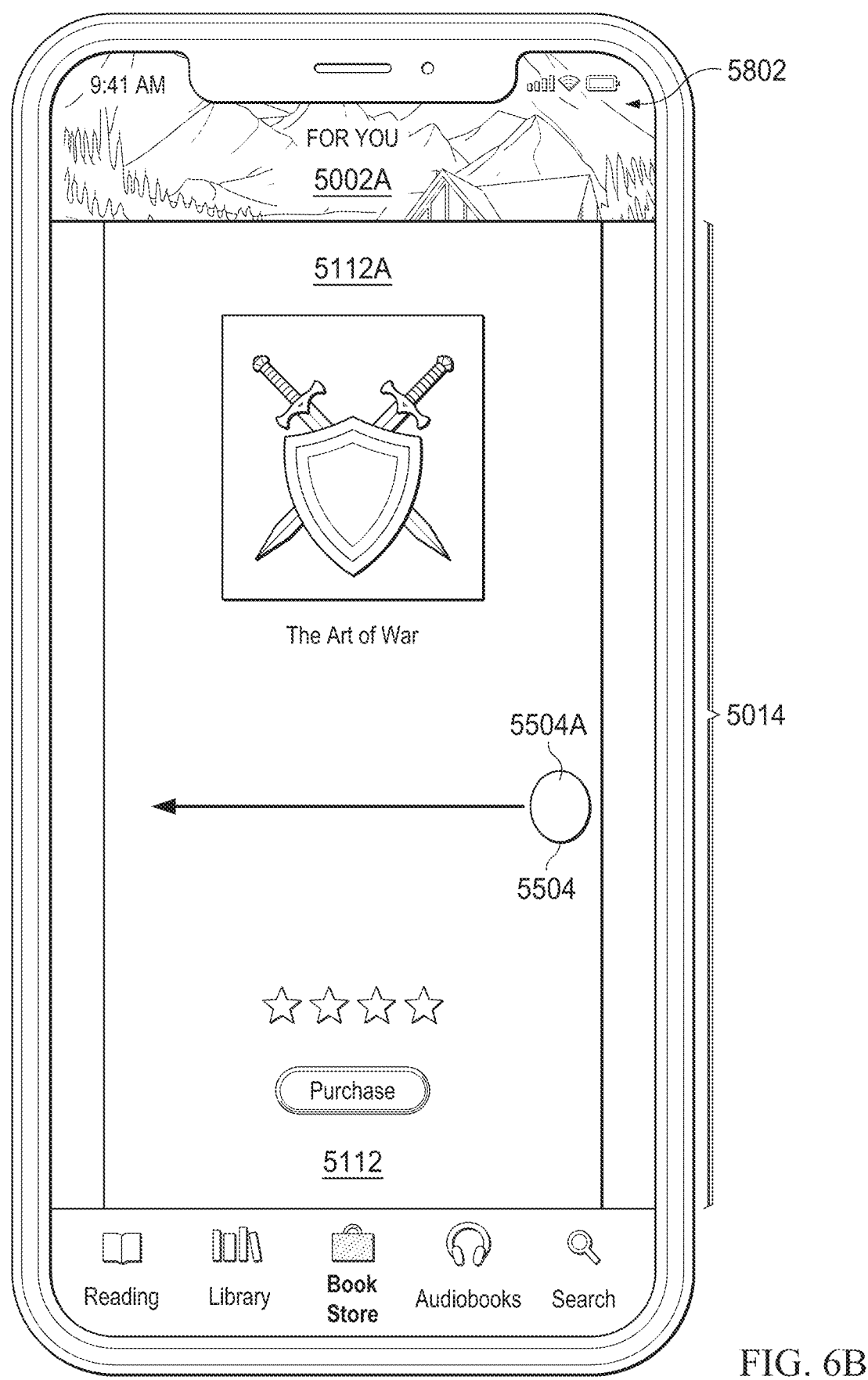

As illustrated in FIG. 6A, content preview affordances 5004A-5004C for *The Art of War*, *Romeo and Juliet*, and *The Count of Monte Cristo*, form a scrollable set of content preview affordances 5004. Device 100, in response to a detecting a left swipe on scrollable set of content preview affordances 5004 (illustrated by the movement of contact 5502 from position 5502A to position 5502B), scrolls through content preview affordances 5004A-5004C. In some embodiments, not all content preview affordances of scrollable set of content preview affordances 5004 are concurrently displayed in parent user interface 5002. In such embodiments, swiping scrollable set of content preview affordances 5004 will scroll through the displayed content preview affordances 5004A-5004C and cause device 100 to display additional content preview affordances that were not previously displayed in parent user interface 5002. Once the user has scrolled through the scrollable set of content preview affordances 5004 and identifies a book of interest, the user performs a tap gesture on a particular content preview affordance associated with the book of interest. FIGS. 6A-6B illustrate detecting a tap gesture (e.g., tap gesture with contact 5602, FIG. 6A) on a content preview affordance (e.g., content preview affordance 5004A for *The Art of War*) and in response to the tap gesture, displaying content that corresponds to the content preview affordance (e.g., a content 5112 for *The Art of War*, FIG. 6B).

FIGS. 6B-6K illustrate exemplary user interfaces for viewing additional content about a content item in a user interface accessible from parent user interface 5002 of FIG. 6A. FIGS. 6B-6K further illustrate scrolling between additional content about each of the content items associated with content preview affordances 5004A-5004C (e.g., *The*

Art of War, Romeo and Juliet, and The Count of Monte Cristo) described in FIG. 6A.

FIG. 6B illustrates displaying a first portion 5112A of content 5112 (The Art of War) in a content information user interface 5014 in response to detecting the tap gesture with contact 5602 in FIG. 6A. In the illustrated embodiment, content information user interface 5014 is a user interface of an electronic store that displays content containing information about content items sold through the electronic store, such as content 5112 that includes information regarding the book title The Art of War featured in content preview affordance 5004A illustrated in FIG. 6A. In the illustrated embodiment, content information user interface 5014 overlays a portion of parent user interface 5002 illustrated in FIG. 6A. In some embodiments, an indication of parent user interface 5002, such as content of parent user interface 5002 or text describing parent user interface 5002 is displayed in a region of touch-sensitive display 112 not covered by content information user interface 5014. FIG. 6B, for example, illustrates displaying background image 5802 of the electronic store in top region 5002A of parent user interface 5002, which is not covered by content information user interface 5014. In other embodiments, content information user interface 5014 may be a non-overlaid user interface that is displayed concurrently beside parent user interface 5002, a separate user interface in a stack of user interfaces that includes parent user interface 5002, or any other suitable user interface.

As illustrated in FIG. 6B, first portion 5112A of content 5112 contains an image of a book cover for The Art of War, a ratings indicator for The Art of War, and a purchase affordance the user interacts with to purchase The Art of War. In the illustrated embodiment, the text "FOR YOU" is displayed in a region of touch-sensitive display 112 above content information user interface 5014. In other embodiments, device 100 displays other suitable text that identifies a relationship between content displayed in content information user interface 5014 and the user, or otherwise identifies the content displayed in content information user interface 5014. As discussed, content 5112 illustrated in FIG. 6B is content associated with the content item featured in content preview affordance 5004A (book cover for The Art of War) illustrated in FIG. 6A. Additional content associated with other content preview affordances of scrollable set of preview affordances 5004 illustrated in FIG. 6A (e.g., content preview affordance 5004B for Romeo and Juliet and content preview affordance 5004C for The Count of Monte Cristo) form a scrollable set of content displayed in content information user interface 5014. In some embodiments, content of the scrollable set of content displayed in content information user interface 5014 of FIG. 6B and content preview affordances of scrollable set of content preview affordances 5004 displayed in parent user interface 5002 illustrated in FIG. 6A are displayed in the same order. In the illustrated embodiment of FIG. 6B, the user performs a swipe gesture on first portion 5112A of content 5112 to scroll the scrollable set of content in order to view content associated with other content preview affordances of scrollable set of preview affordances 5004 illustrated in FIG. 6A.

Figure 6C:
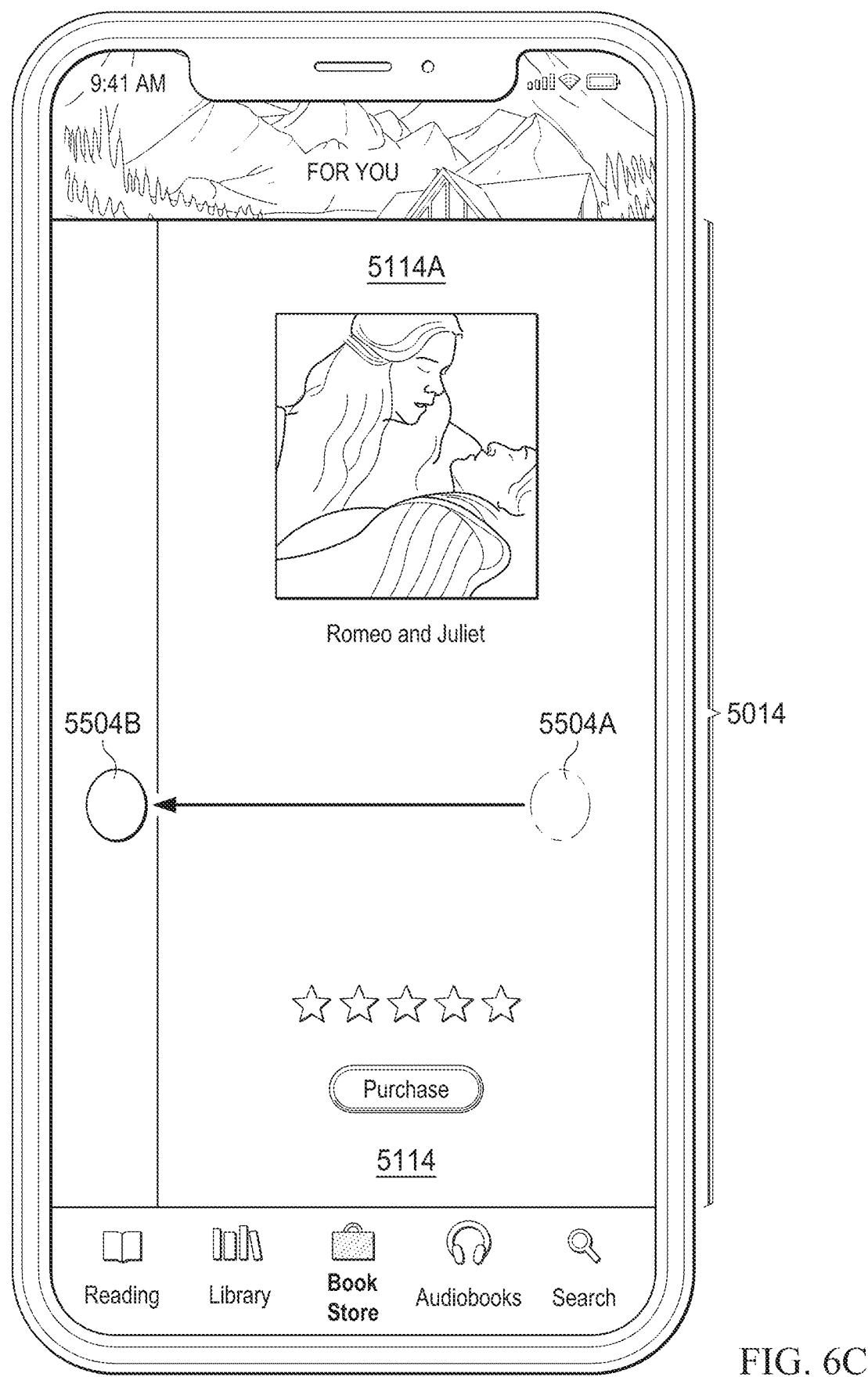

FIGS. 6B-6C illustrate detecting a swipe gesture with contact 5504 on first portion 5112A of content 5112 for The Art of War and movement of contact 5504 from position 5504A to position 5504B, and in response to the swipe gesture, partially displaying first portion 5114A of content 5114 for Romeo and Juliet in content information user interface 5014. As the user performs swipe gesture 5504 from position 5504A to position 5504B, first portion 5112A of content 5112 for The Art of War displayed in FIG. 6B is laterally shifted in a leftward direction off of content information user interface 5014 and first portion 5114A of content 5114 for Romeo and Juliet is laterally shifted leftward onto content information user interface 5014.

Figure 6D:
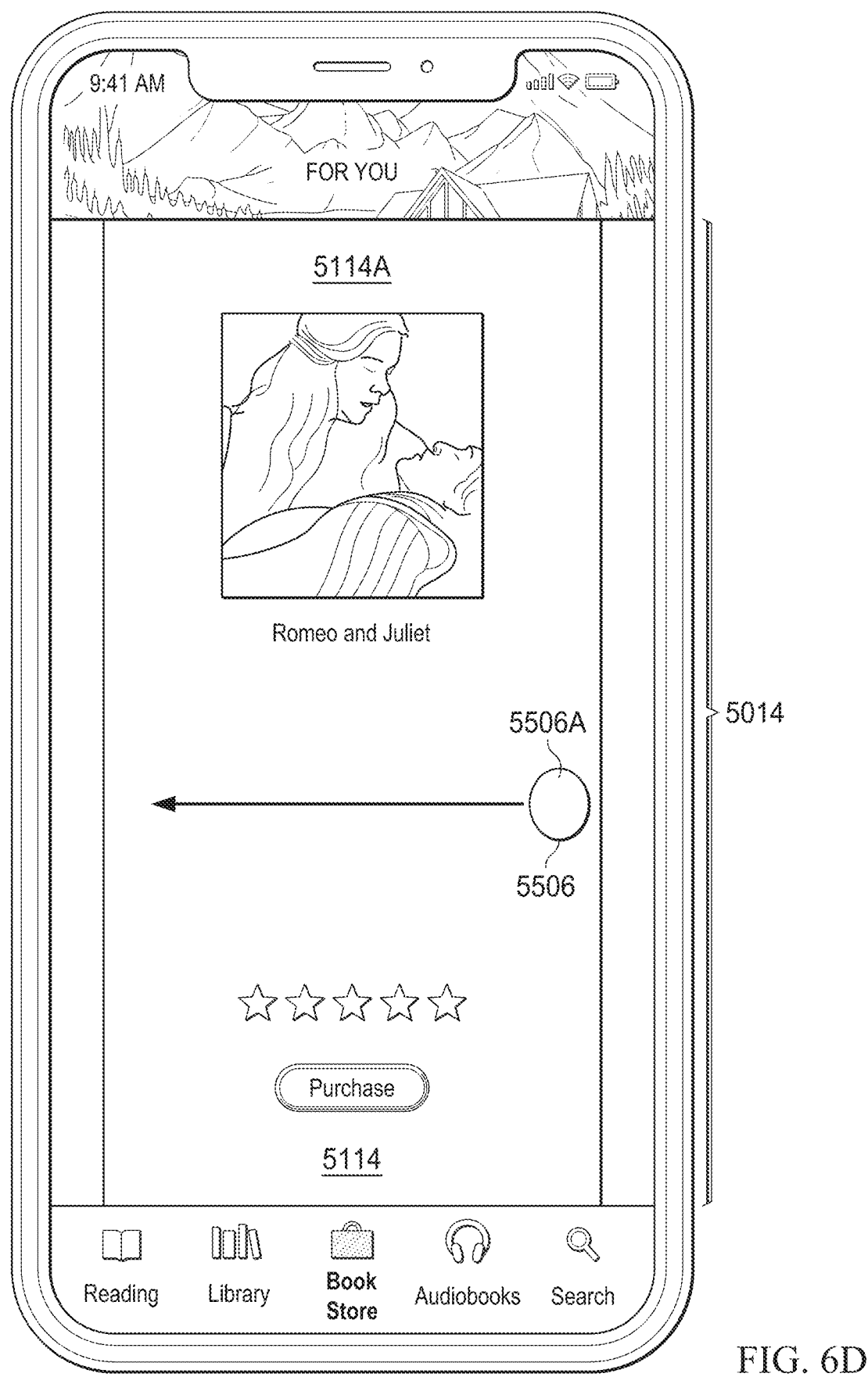

FIG. 6D illustrates displaying first portion 5114A of content 5114 for Romeo and Juliet after the user has completed the swipe gesture illustrated in FIGS. 6B and 6C. As illustrated in FIG. 6D, content 5114 is approximately aligned in the center of content information user interface 5014. In some embodiments, where a majority of a lateral portion of content is displayed in content information user interface 5014 after a swipe gesture, device 100 automatically shifts the content to approximately the center of content information user interface 5014. As shown in FIG. 6D, first portion 5114A of content 5114 contains an image of a book cover for Romeo and Juliet, a ratings indicator for Romeo and Juliet, and a purchase affordance the user interacts with to purchase Romeo and Juliet.

Figure 6E:
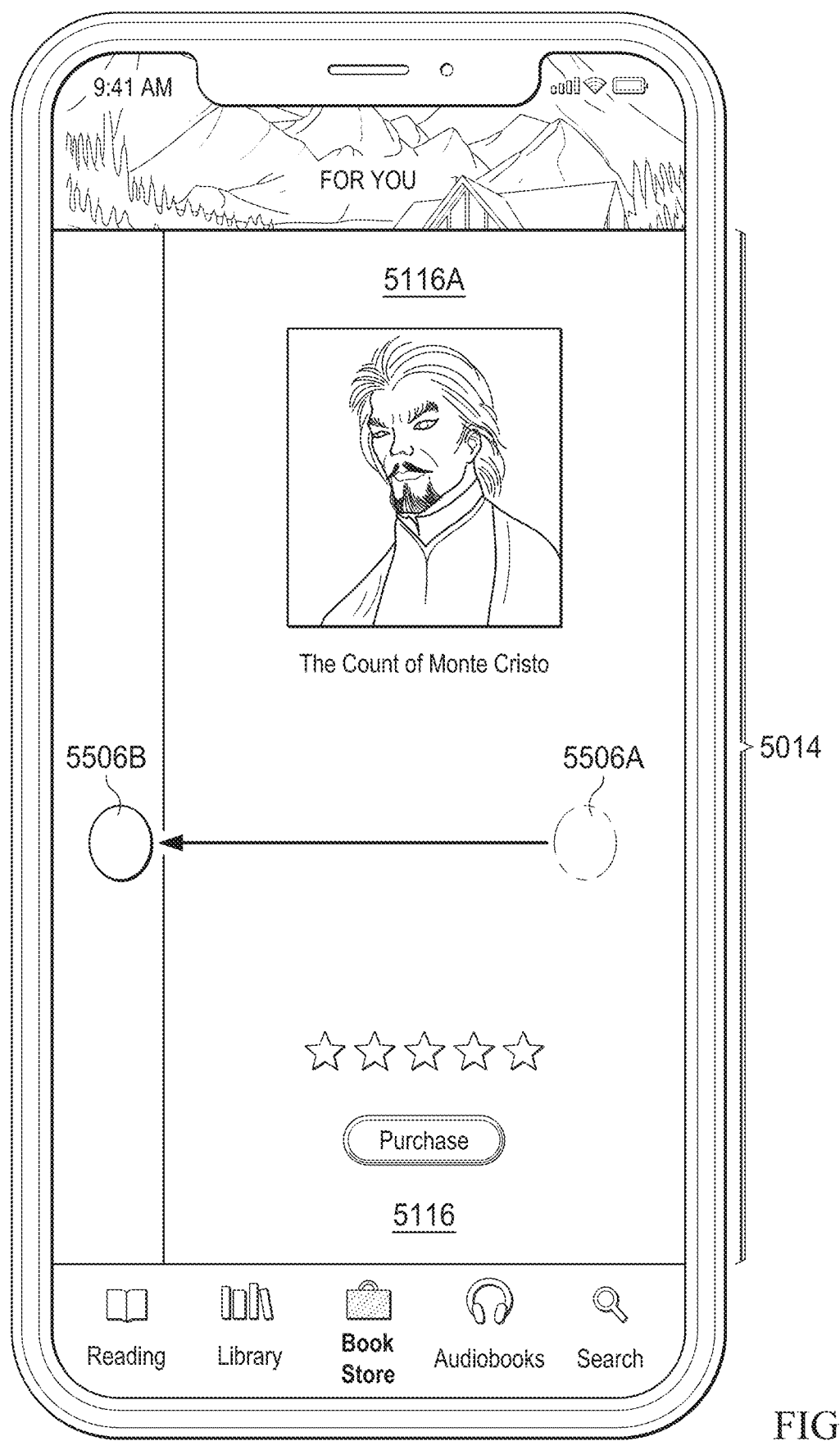

FIGS. 6D-6E illustrate detecting a swipe gesture with contact 5606 on first portion 5114A of content 5114 for Romeo and Juliet and movement of contact 5506 from position 5506A to position 5506B, and in response to the swipe gesture, displaying a first portion 5116A of a content 5116 for The Count of Monte Cristo in content information user interface 5014. Similar to FIG. 6C, as the user performs the swipe gesture from position 5506A towards position 5506B, content 5114 for Romeo and Juliet displayed in FIG. 6D is laterally shifted in a leftward direction off of content information user interface 5014 as first portion 5116A of content 5116 is laterally shifted in a leftward direction onto content information user interface 5014.

Figure 6F:
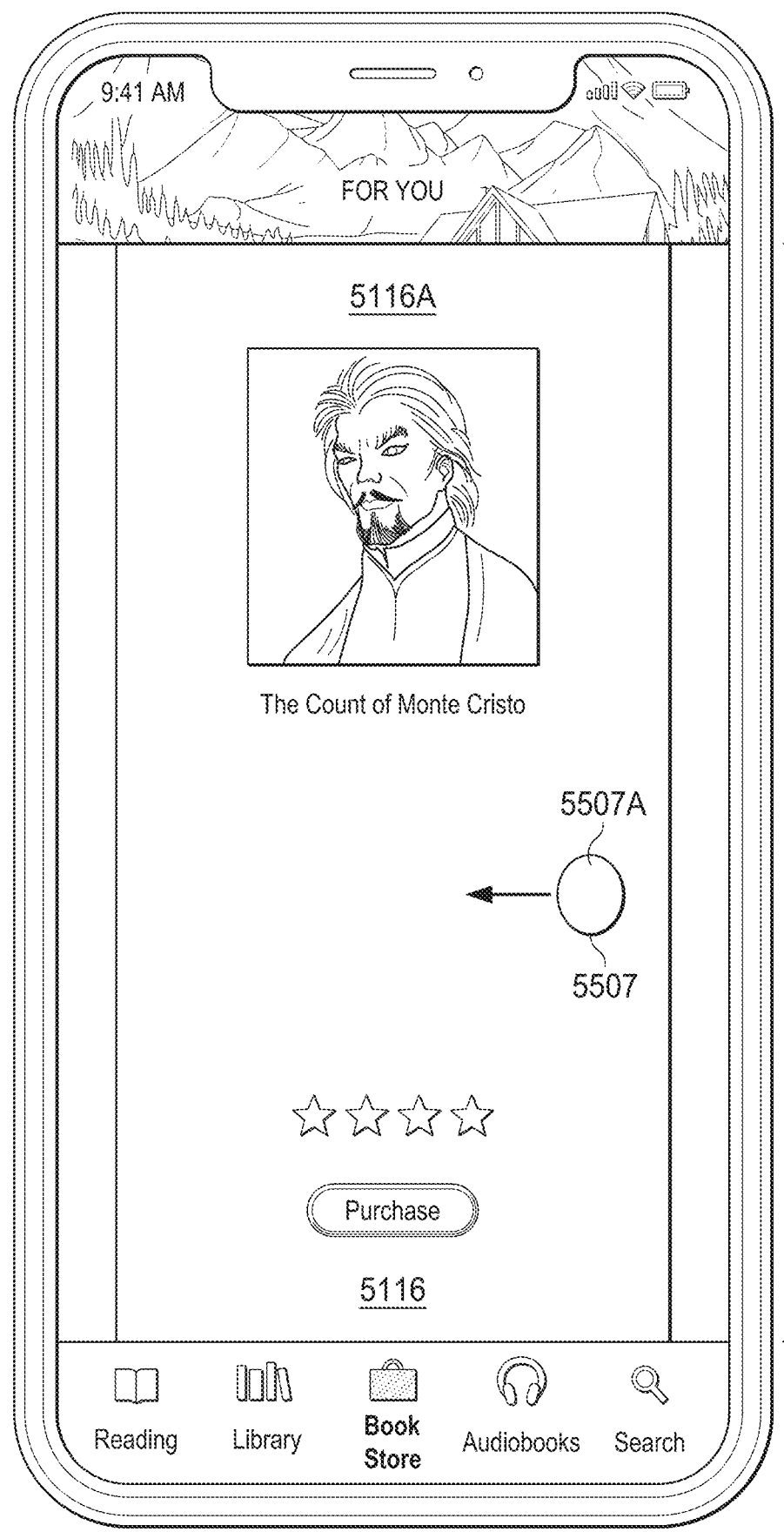

FIG. 6F illustrates displaying first portion 5116A of content 5116 for The Count of Monte Cristo approximately aligned in the center in content information user interface 5014 after the user has completed the swipe gesture illustrated in FIGS. 6D and 6E. As shown in FIG. 6F, first portion 5116A of content 5116 contains an image of a book cover for The Count of Monte Cristo, a ratings indicator for The Count of Monte Cristo, and a purchase affordance the user interacts with to purchase The Count of Monte Cristo.

Figure 6G:
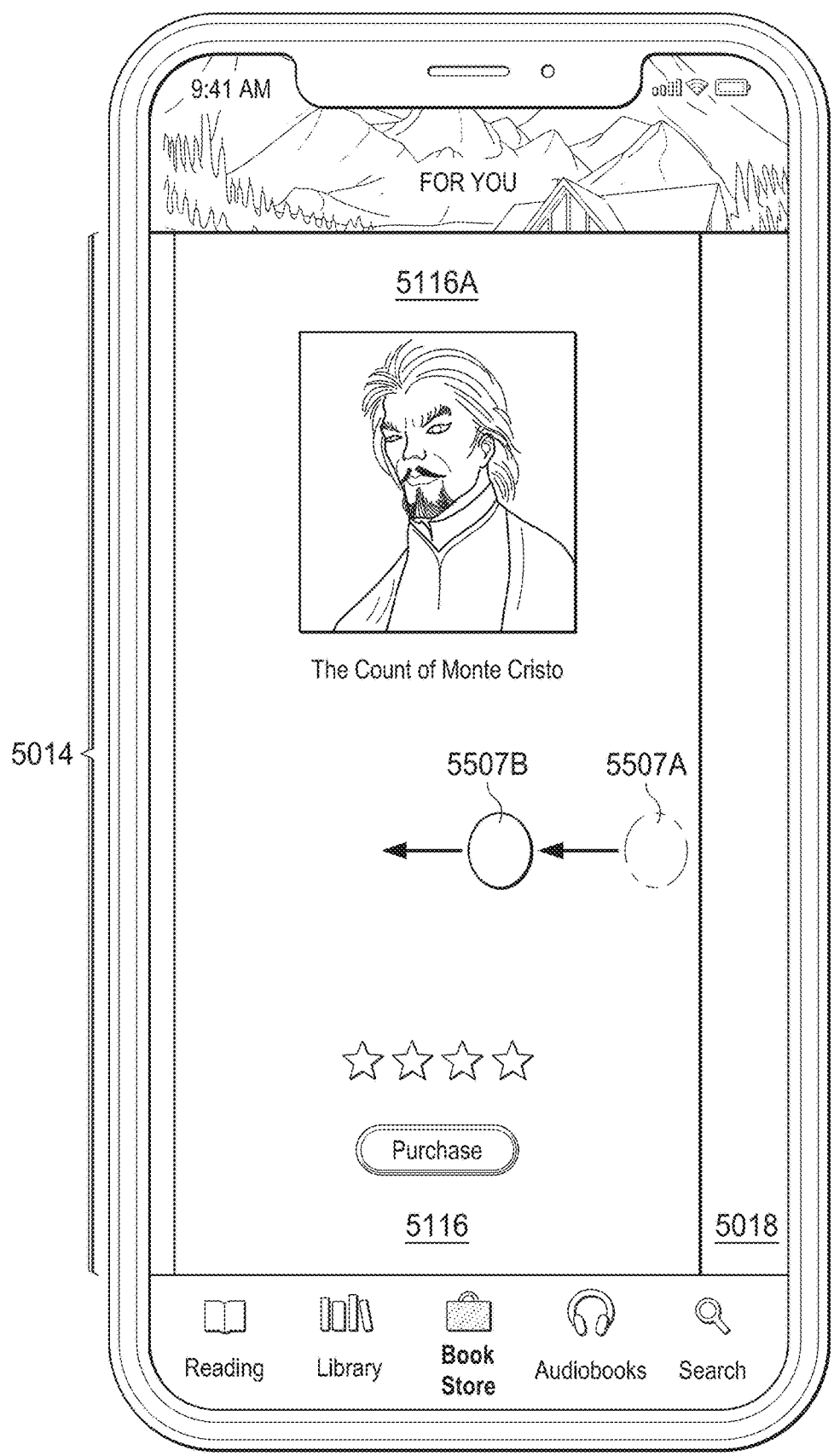

FIGS. 6F-6G illustrate detecting a swipe gesture with contact 5507 on first portion 5116A of content 5116 (The Count of Monte Cristo) and movement of contact 5507 from position 5507A to position 5507B, and in response to the swipe gesture, overlaying a portion of user interface 5018 on a portion of content information user interface 5014. In the illustrated embodiment, content 5116 is the last content included in the scrollable set of content (e.g., content 5112 for The Art of War, content 5114 for Romeo and Juliet, and content 5116 for The Count of Monte Cristo). Since content 5116 is the last content included in the scrollable set of content, a leftward swipe, such as the gesture illustrated in FIGS. 6F and 6G, does not cause device 100 to gradually shift first portion 5116A of content 5116 laterally in a leftward direction off of content information user interface 5014. However, a leftward swipe greater than a threshold amount of movement causes device 100 to gradually scroll user interface 5018 in a leftward direction over a portion of content information user interface 5014.

Figure 6H:
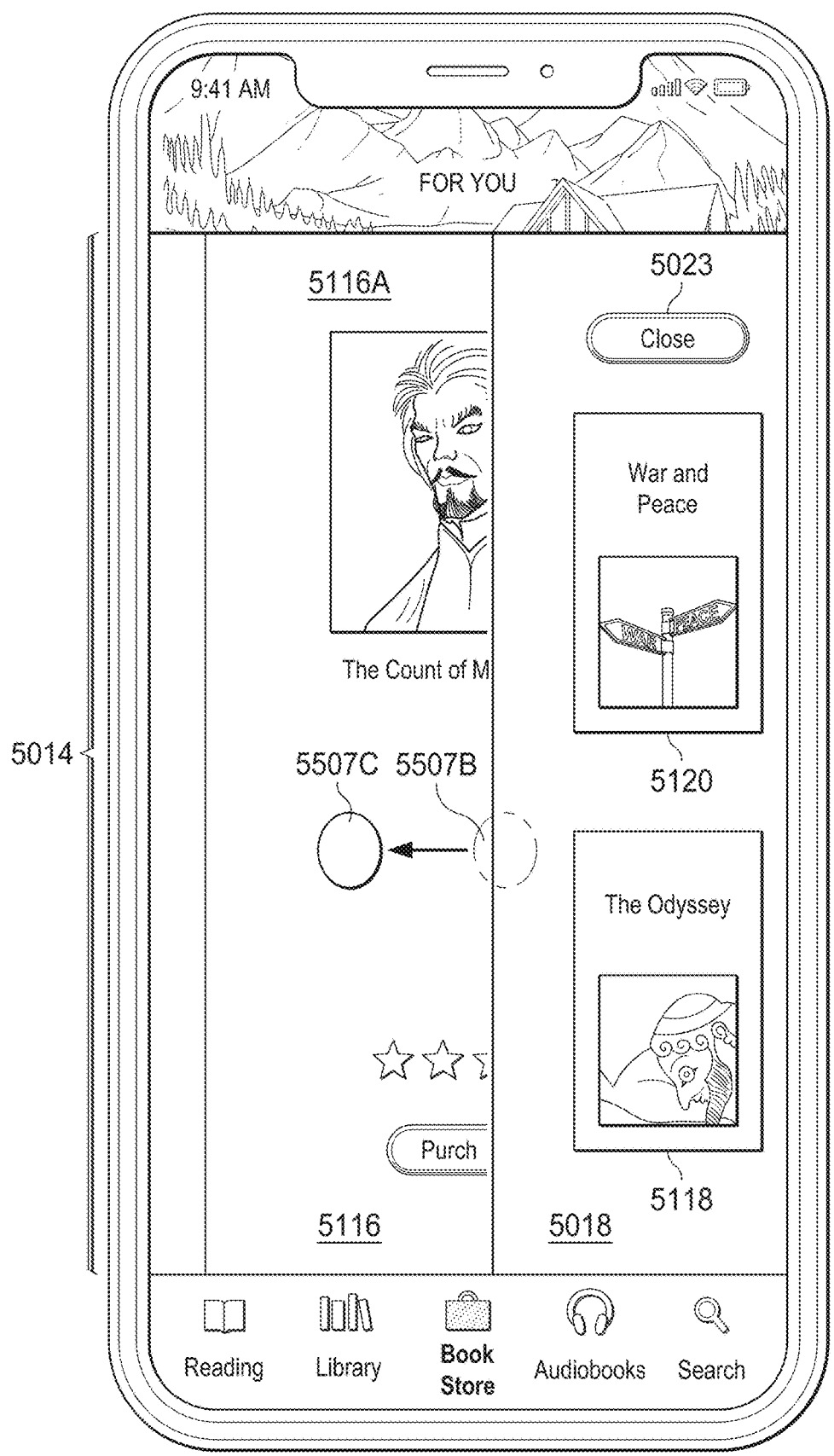

FIGS. 6G-6H illustrate detecting a continuation of the swipe gesture first shown in FIG. 6F and movement from position 5507B to position 5507C, and in response to the swipe gesture, displaying an additional portion of user interface 5018 overlaid on a portion of content information user interface 5014. As illustrated in FIG. 6H, user interface 5018 displays additional content preview affordances (e.g., a content preview affordance 5118 for *The Odyssey* and a content preview affordance 5120 for *War and Peace*) not included in scrollable set of content preview affordances 5004 of FIG. 6A. In one embodiment, content preview affordances 5118 and 5120 are associated with content of additional books recommended for the user. More particularly, content preview affordance 5120 contains an image of a book cover for *War and Peace* and is associated with content for *War and Peace*. Further, content preview affordance 5118 contains an image of a book cover for *The Odyssey* and is associated with content for *The Odyssey*. A user selection of either content preview affordance 5118 or content preview affordance 5120 causes device 100 to display content associated with the selected content preview affordance in content information user interface 5014.

Figure 6I:
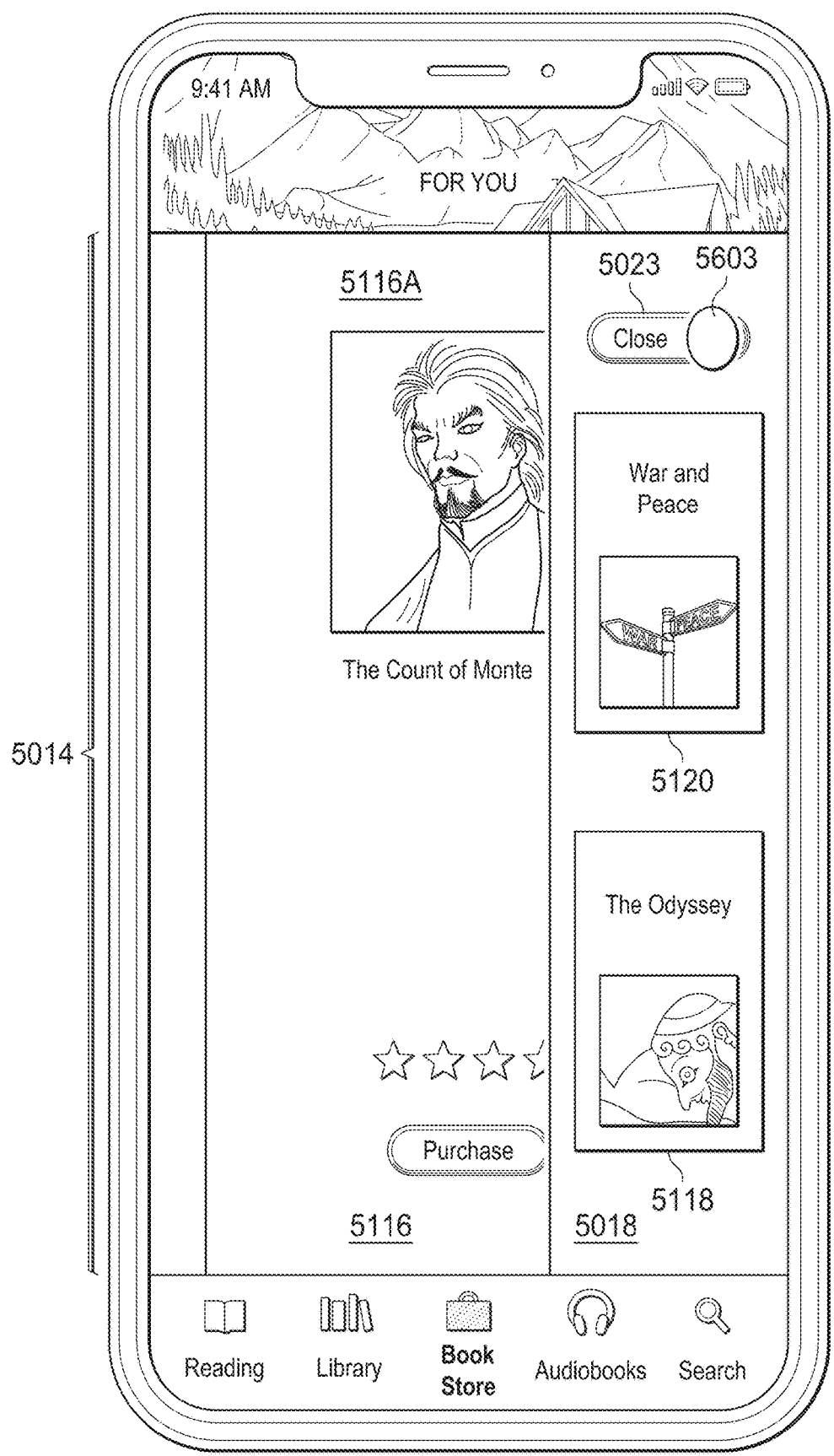
Figure 6J:
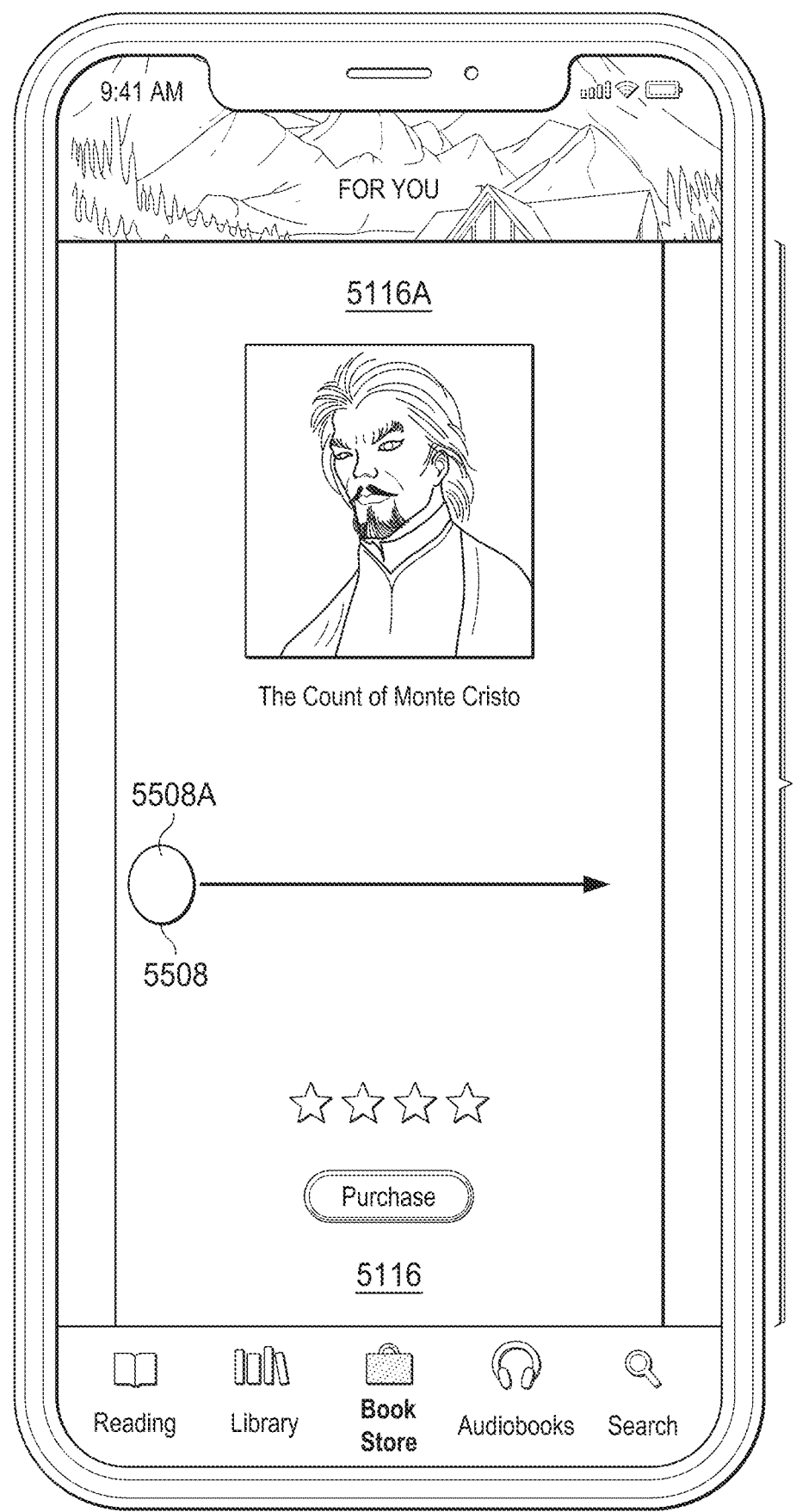
Figure 6K:
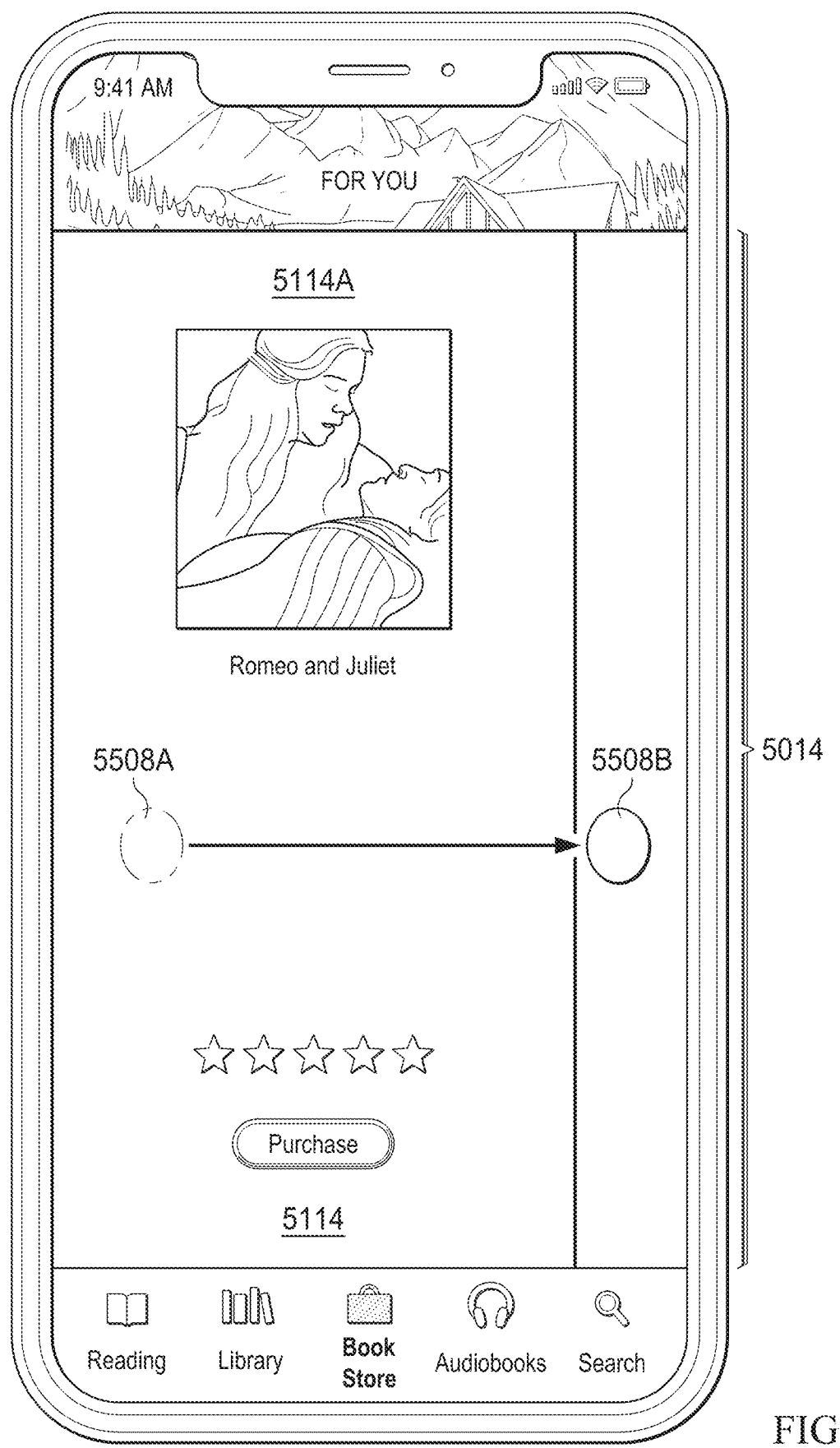

FIGS. 6I-6J illustrates detection of a tap gesture with contact 5603 on a close affordance 5023 to dismiss user interface 5018, and in response to the tap gesture, displaying first portion 5116A of content 5116 for *The Count of Monte Cristo* in content information user interface 5014 after the overlay of user interface 5018 ceases to be displayed (e.g., following an animated transition of user interface 5018 moving off display 112). FIGS. 6J-6K illustrate detecting of a swipe gesture with contact 5508 on first portion 5116A of content 5116 and movement of contact 5508 in a rightward direction from position 5508A to position 5508B, and in response to the swipe gesture, re-displaying first portion 5114A of content 5114 for *Romeo and Juliet* in content information user interface 5014. In the illustrated embodiment, a portion of content 5116 previously displayed in FIG. 6J is no longer displayed in content information user interface 5014 in response to the swipe gesture with contact 5508 in FIG. 6J from position 5508A-5508B.

FIGS. 6L-6O illustrate exemplary user interfaces for scrolling through content associated with one of the content preview affordances. FIGS. 6L-6O further illustrate locking the user interface to reduce the likelihood that user gestures inadvertently cause device 100 to scroll to content associated with a different content preview affordance.

Figure 6L:
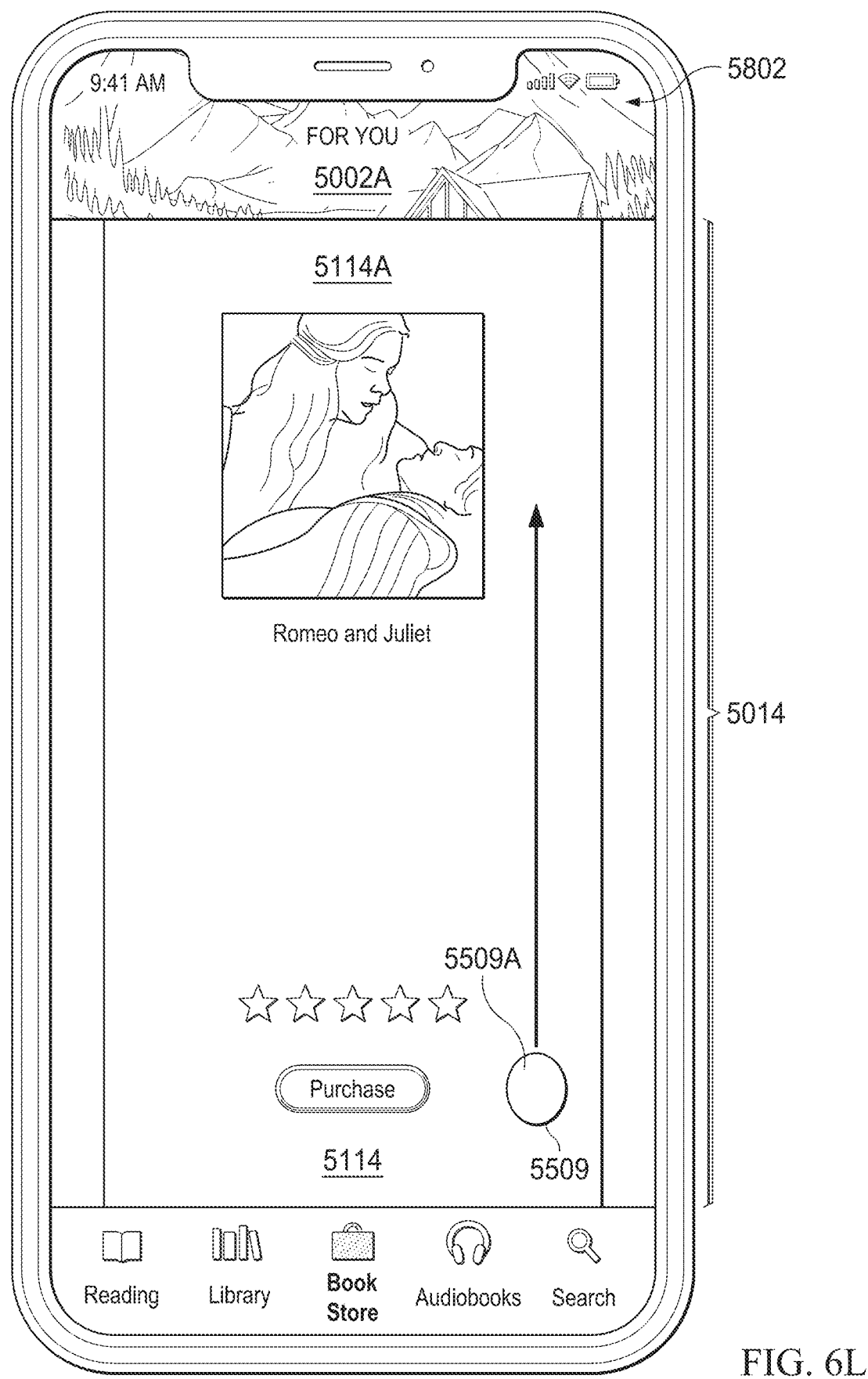
Figure 6M:
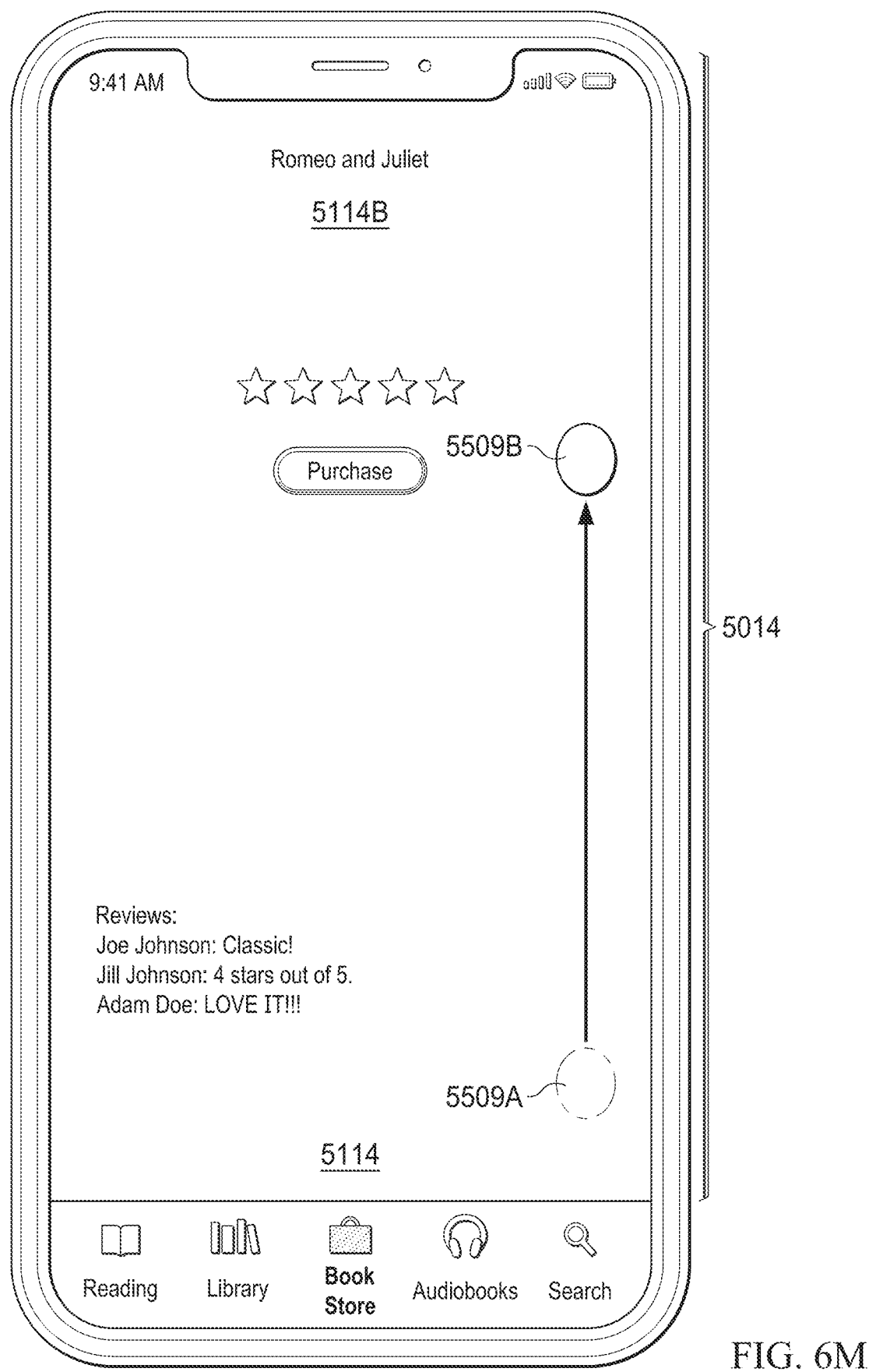

FIG. 6L illustrates displaying first portion 5114A of content 5114 for *Romeo and Juliet* in content information user interface 5014 after the user has completed the swipe gesture with contact 5508 illustrated in FIGS. 6J-6K from position 5508A to 5508B. FIGS. 6L-6M illustrate detecting a swipe gesture with contact 5509 on first portion 5114A of content 5114 and movement of contact 5509 in an upward direction from position 5509A to position 5509B, and in response to the swipe gesture, displaying a second portion 5114B of content 5114 in content information user interface 5014. In the illustrated embodiment, second portion 5114B of content 5114 contains reviews of *Romeo and Juliet*, which were not displayed in content information user interface 5014 before the user performed the upward swipe gesture illustrated in FIGS. 6L and 6M. Further, in some embodiments, dimensions of content information user interface 5014 gradually expands as more of second portion 5114B of content 5114 is displayed in content information user interface 5014. As illustrated in FIG. 6M, content information user interface 5014 has expanded to fill the region of touch-sensitive display 112. Moreover, content information user interface 5014 also overlays top region 5002A of parent user interface 5002 as illustrated in FIG. 6L, which contains background image 5802 of the electronic store.

Figure 6N:
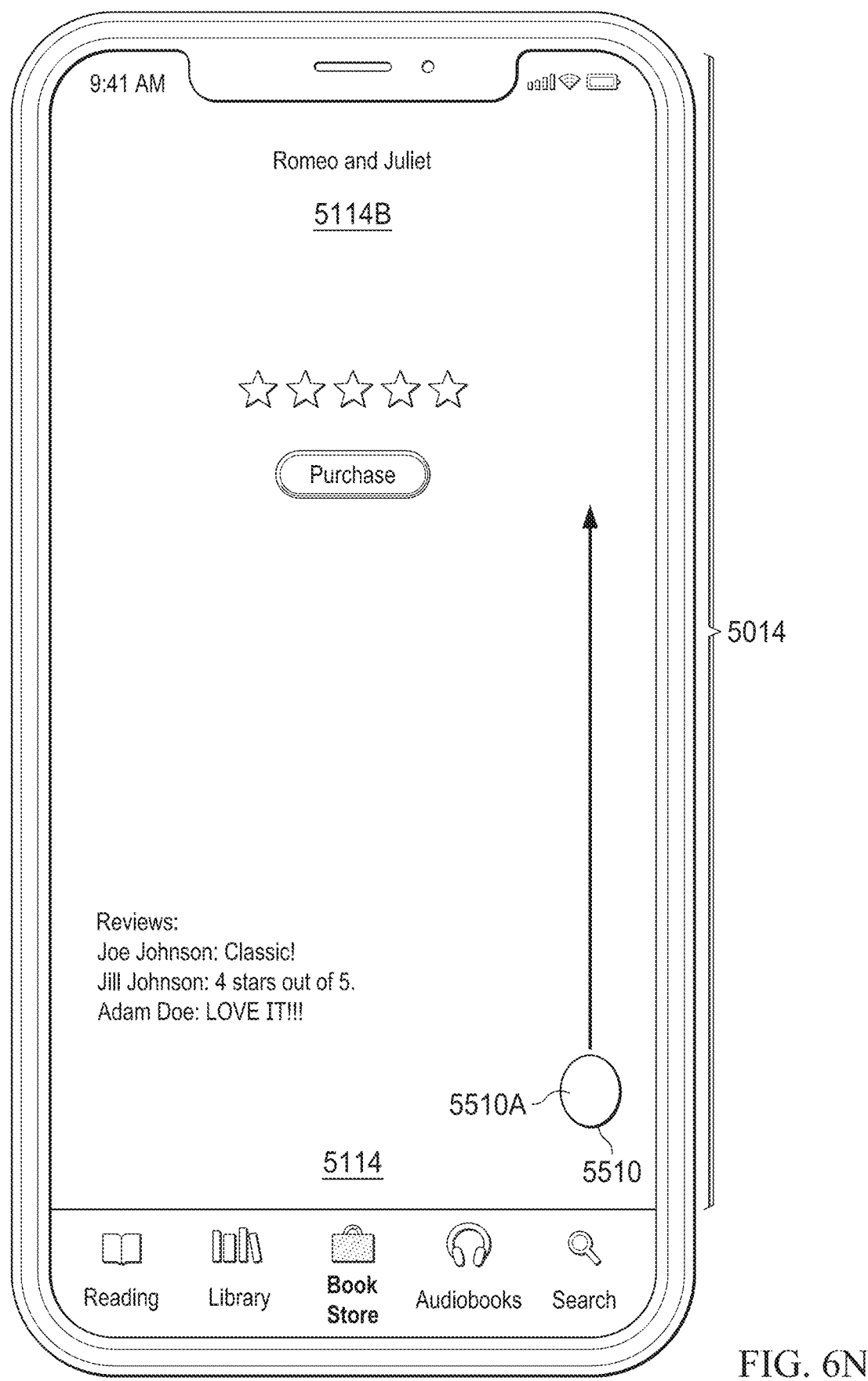
Figure 6O:
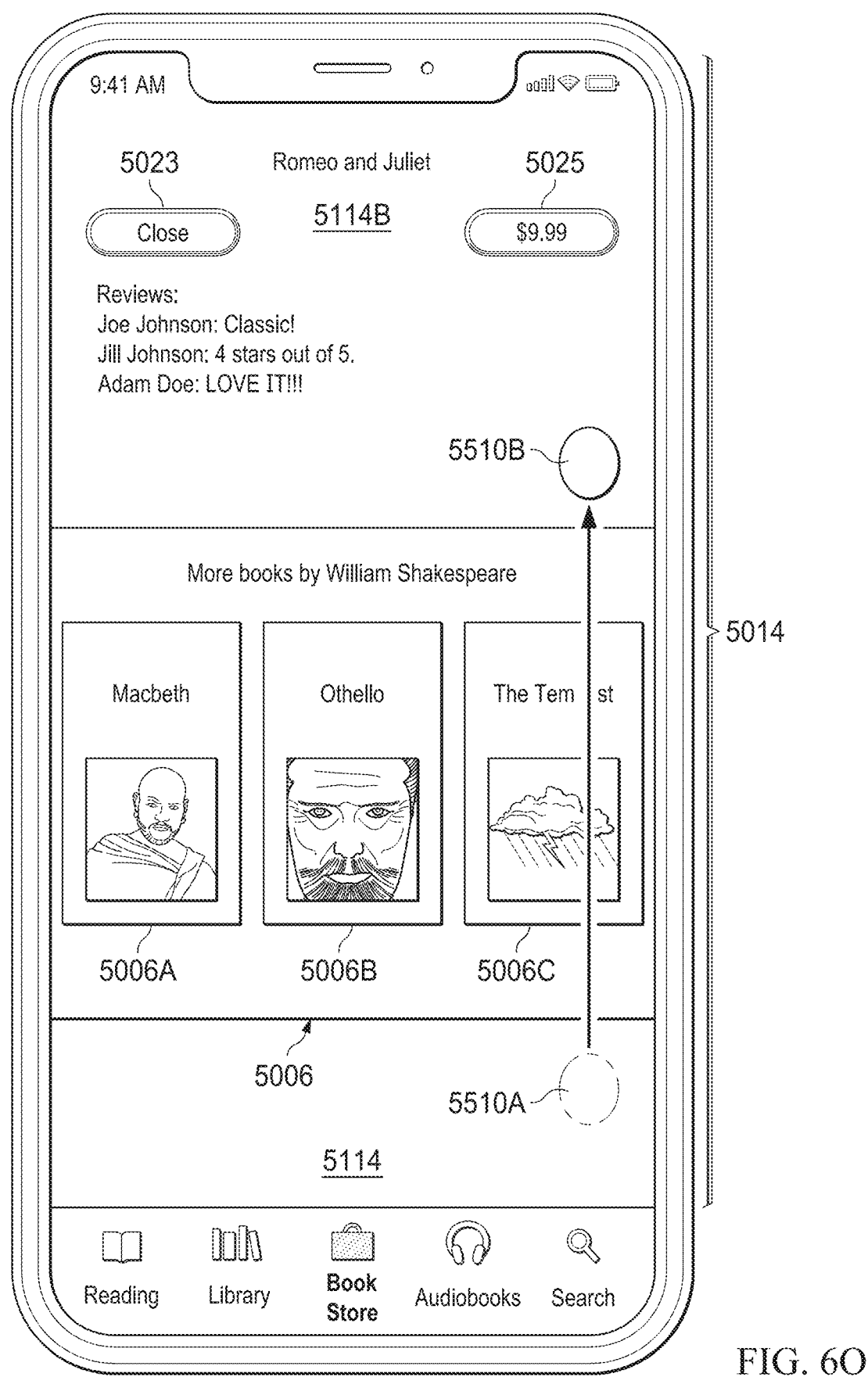

FIG. 6N illustrates displaying second portion 5114B of content 5114 for *Romeo and Juliet* in content information user interface 5014. Further, FIGS. 6N-6O illustrate detecting a swipe gesture with contact 5510 from position 5510A to position 5510B, and in response to the gesture, displaying more of second portion 5114B of content 5114 in content information user interface 5014.

As a user performs gestures such as the upward swipe gestures illustrated in FIGS. 6L-6O, device 100, in response to detecting such gestures, determines whether such gestures (individually or collectively), satisfy criteria for locking content information user interface 5014. In this example, such locking criteria is met if a predetermined portion of content 5114 for *Romeo and Juliet* has been displayed on touch-sensitive display 112. Such predetermined portion may be predefined to mean any portion of content 5114 beyond first portion 5114A, all of first portion 5114A being scrolled off of a region of touch-sensitive display 112, more than a predetermined percentage of content 5114 being displayed, a particular length of content 5114 vertically scrolled by a user relative to a region of touch-sensitive display 112, all of content 5114 being displayed, or any other suitable portion of content 5114 measured by any suitable methodology. In the embodiment illustrated in FIGS. 6L-6M, the swipe gesture with contact 5509 from position 5509A to position 5509B causes device 100 to upwardly scroll first portion 5114A of content 5114 by more than a predetermined amount to satisfy locking criteria for content information user interface 5014. In alternative embodiments, locking criteria may be based on the number of upward swipe gestures, the detected speed of one or more upward swipe gestures, the intensity of a contact beginning such upward swipe gestures, the interval between upward swipe gestures, the detected length of a swipe gesture, or any other suitable characteristic of one or more swipe gestures. For example, in one embodiment, consecutive upward swipes within a determined period of time locks content information user interface 5014. In still other embodiments, locking criteria may be based on other user interaction with device 100, including the measured intensity of a contact other than a swipe gesture or a particular gesture or combination of gestures. In one alternate embodiment, content information user interface 5014 may be locked initially until unlocking criteria is met, as described in 6X and 6Y. In one embodiment, detecting that locking criteria are met may cause device 100 to implement graduated locking of content information user interface 5014 as described below. In such embodiment, for example, as the user scrolls through more of content 5114, content information user interface 5014 becomes more locked as described below.

Figure 6P:
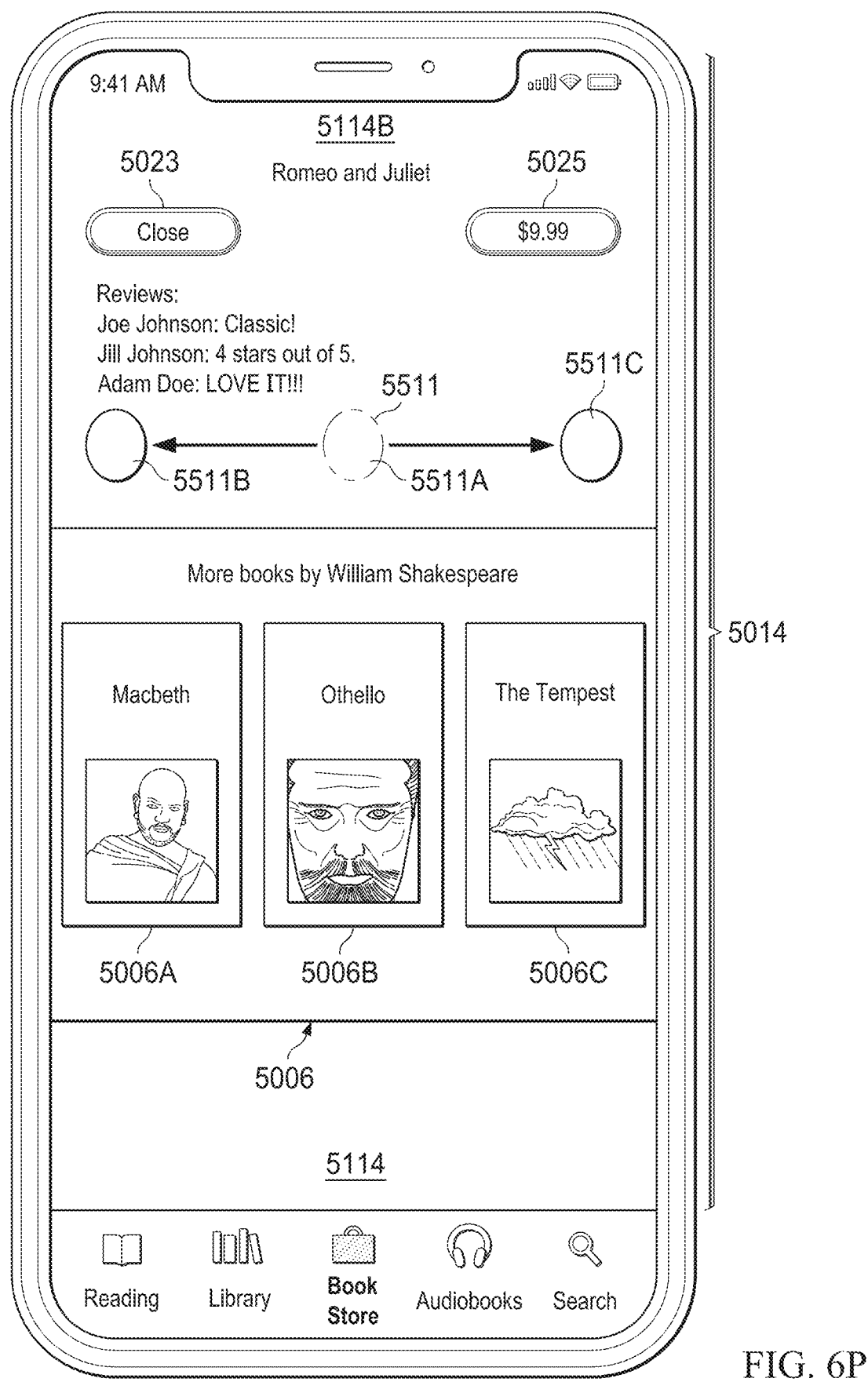

As illustrated relative to FIGS. 6B-6K, when content information user interface 5014 is unlocked, leftward and rightward swipe gestures over a threshold amount of movement cause device 100 to scroll between content for the different content items associated with the scrollable set of content preview affordances 5004 as illustrated in FIG. 6A. For example, as shown in FIGS. 6D and 6E, first portion 5114A of content 5114 for *Romeo and Juliet* is scrolled off of content information user interface 5014 and first portion 5116A of content 5116 for *The Count of Monte Cristo* is scrolled onto content information user interface 5014. When content information user interface 5014 is locked, leftward and rightward swipe gestures do not cause device 100 to scroll between content for the different content items associated with the scrollable set of content preview affordances 5004 as shown in FIG. 6A. As illustrated in FIG. 6P, detecting alternative swipe gestures with contact 5511 from position 5511A in a first direction to position 5511B or from position 5511A in an opposite direction to position 5511C does not cause device 100 to display additional content of the scrollable set of content, such as content 5112 for *The Art* of War or content 5116 for *The Count of Monte Cristo* in content information user interface 5014. Instead, content 5114 remains displayed in content information user interface 5014.

In some embodiments, content information user interface 5014 may utilize graduated locking. In graduated locking, the more a user scrolls through content for a content item the more locked content information user interface 5014 becomes. For example, before the user begins scrolling through content on content information user interface 5014, any user gesture vectored at an angle of more than 15 degrees (or other suitable threshold) from the vertical axis of touch-sensitive display 112 may cause content information user interface to scroll to content associated with a different content item. Once the user has begun scrolling through content on content information user interface 5014, any user gesture vectored at an angle of more than 45 degrees (or other suitable threshold) from the vertical axis of touch-sensitive display 112 may cause content information user interface to scroll to content associated with a different content item. Once the user has scrolled through content such that the initial portion of the content displayed on content information user interface 5014 is no longer visible, only user gestures vectored at an angle of more than 75 degrees (or other suitable threshold) from the vertical axis of touch-sensitive display 112 may cause content information user interface to scroll to content associated with a different content item. Once the user has scrolled through content on content information user interface 5014 such that all of the content has been displayed on content information user interface 5014, no user gesture will cause content information user interface to scroll to content associated with a different content item.

As illustrated in FIG. 6O, close affordance 5023 and a purchase affordance 5025 are displayed in a top region of content information user interface 5014. Close affordance 5023 and purchase affordance 5025 were not displayed in content information user interface 5014 prior to detection of the swipe gesture with contact 5510 from position 5510A to 5510B. Further, a content affordance 5006A containing a book cover for *Macbeth*, a content affordance 5006B containing a book cover for *Othello*, and a content affordance 5006C containing a book cover for *The Tempest* are also displayed in content information user interface 5014. Each of content affordances 5006A-5006C is associated with content items similar to the content item associated with content 5114. As illustrated in FIG. 6O, each of content affordances 5006A-5006C contain information about other books written by William Shakespeare. Content affordance 5006A is associated with content containing information about a book entitled *Macbeth*, content affordance 5006B is associated with content containing information about a book entitled *Othello*, and content affordance 5006C is associated with content containing information about a book entitled *The Tempest*. Content affordances 5006A-5006C form a scrollable set of content affordances 5006. In some embodiments, device 100, upon detection of inputs including left swipe gestures and right swipe gestures over scrollable set of content affordances 5006, scrolls affordances of scrollable set of content affordances 5006 in a respective leftward direction or rightward direction.

Although the upward swipe gesture from position 5509A to 5509B illustrated in FIGS. 6L-6M caused device 100 to lock content information user interface 5014, gestures performed by the user may still cause device 100 to display additional portions of content 5114, or to display additional affordances within content 5114. For example, detection of additional upward swipe gestures while the content information user interface 5014 is locked causes device 100 to display more of second portion 5014B of content 5114 for *Romeo and Juliet* in FIG. 6O. Further, detection of leftward or rightward swipes over scrollable set of content affordances 5006 cause device 100 to scroll scrollable set of content affordances 5006 in a leftward direction or a rightward direction, respectively. Thus, although once content information user interface 5014 is locked, left and right swipes do not cause device 100 to scroll content 5114 off of content information user interface 5014, the user may still perform a variety of gestures to view additional portions of content 5114, to scroll through scrollable set of content affordances 5006, and to engage in other types of interactions with content 5114.

Figure 6Q:
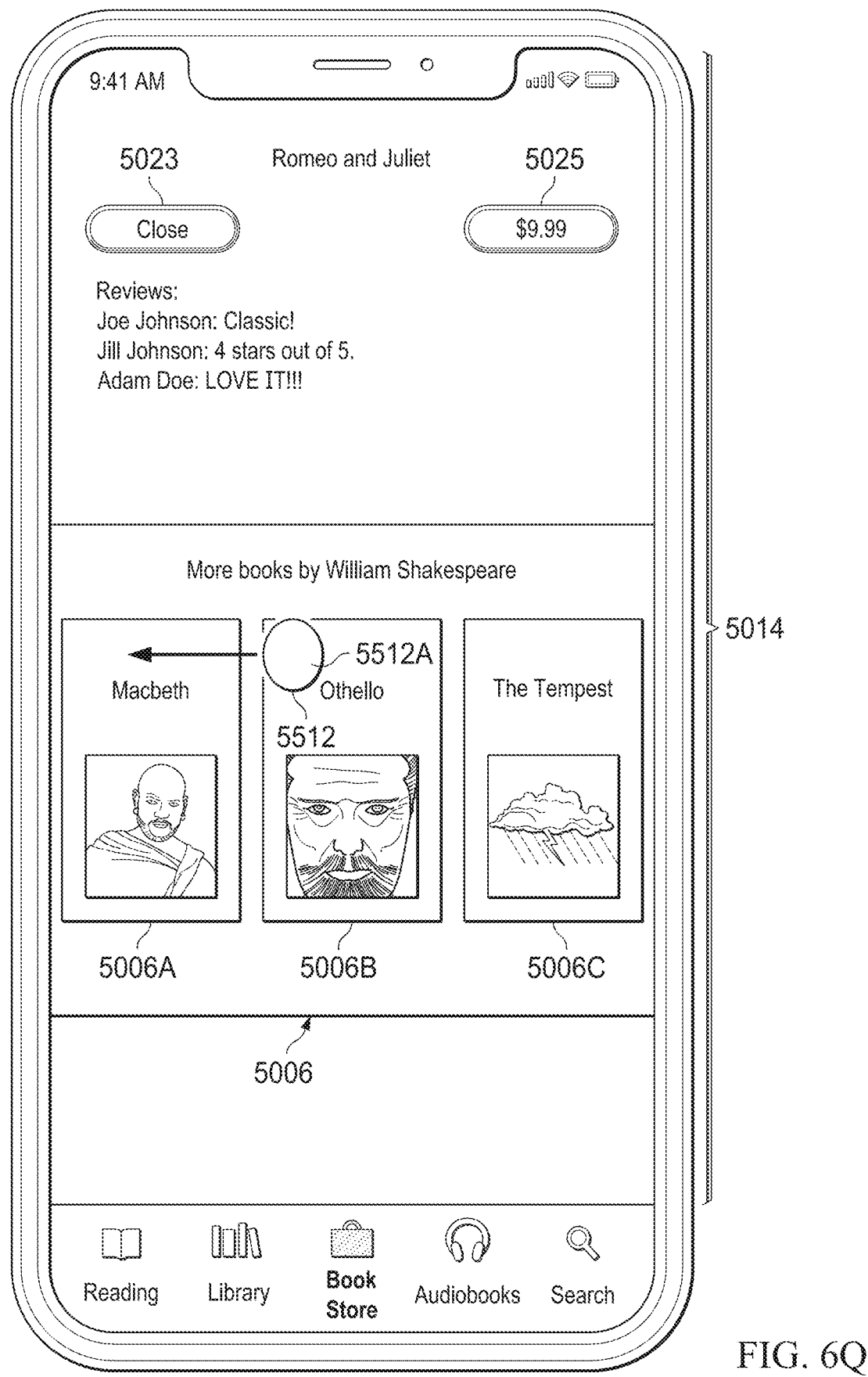
Figure 6R:
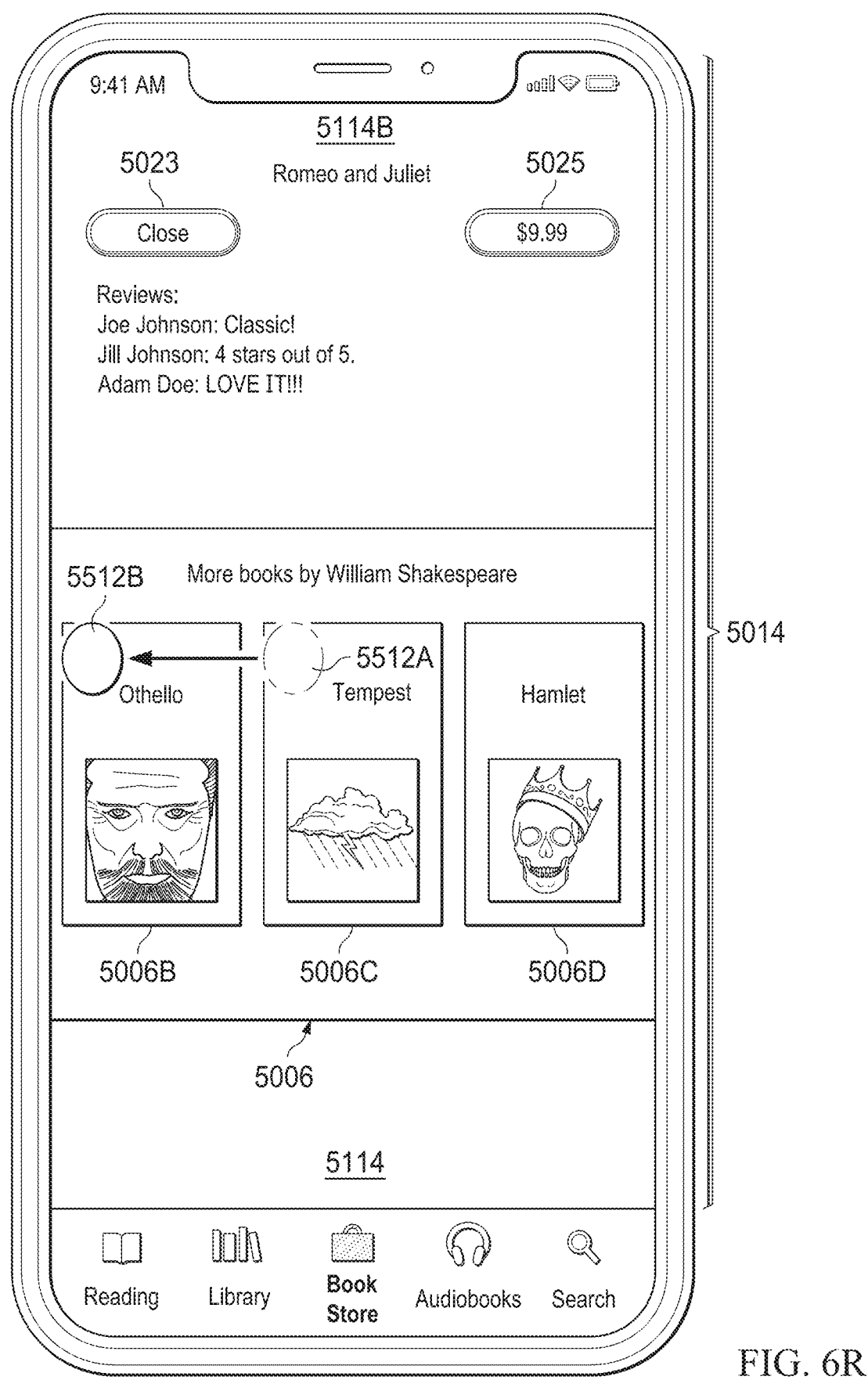

FIGS. 6Q-6R illustrate detecting a swipe gesture with contact 5512 on scrollable set of content affordances 5006 (e.g., content affordance 5006A for *Macbeth*, content affordance 5006B for *Othello*, and content affordance 5006C for *The Tempest*) from position 5512A to position 5512B, and in response to the gesture, scrolling scrollable set of content affordances 5006 to display a content affordance 5006D (*Hamlet*) of scrollable set of content affordances 5006. More particularly, device 100 scrolls scrollable set of content affordances 5006 leftward to display content affordance 5006D for *Hamlet*, which was not displayed in content information user interface 5014 before the swipe gesture from position 5512A to 5512B.

In one embodiment not illustrated herein, content affordance 5006D for *Hamlet* of FIG. 6R is the last content affordance included in the scrollable set of content affordances 5006. In such embodiment, in response to detecting additional leftward swipe gestures, device 100 overlays an additional user interface similar to user interface 5018 of FIGS. 6G-6I on a portion of content information user interface 5014. In such a manner, user interface 5018 obscures part of second portion 5114B of content 5114 for *Romeo and Juliet*. In such embodiment, additional content associated with content 5114, such as additional content affordances associated with other books written by William Shakespeare are displayed in the additional user interface.

Figure 6S:
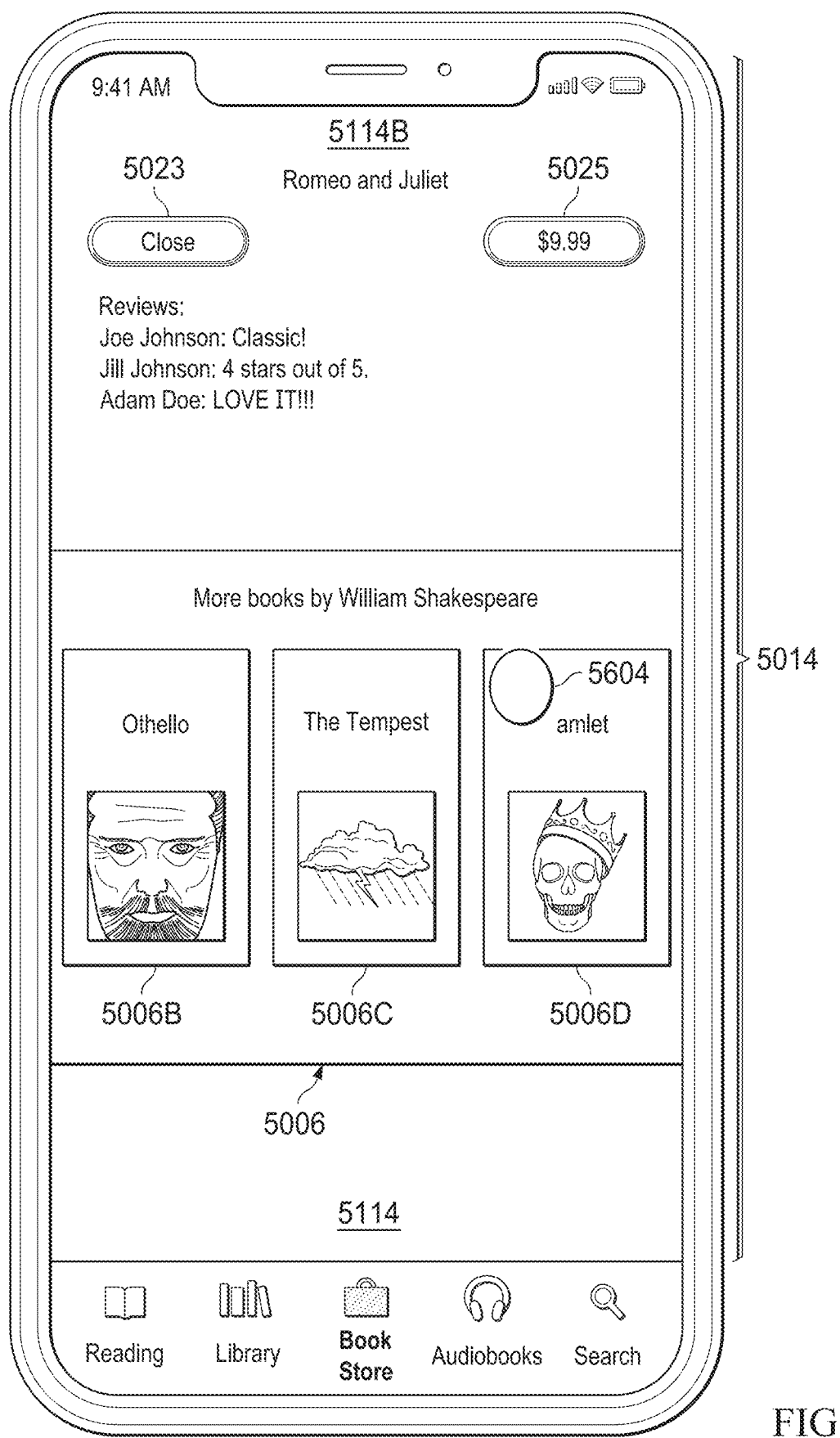
Figure 6T:
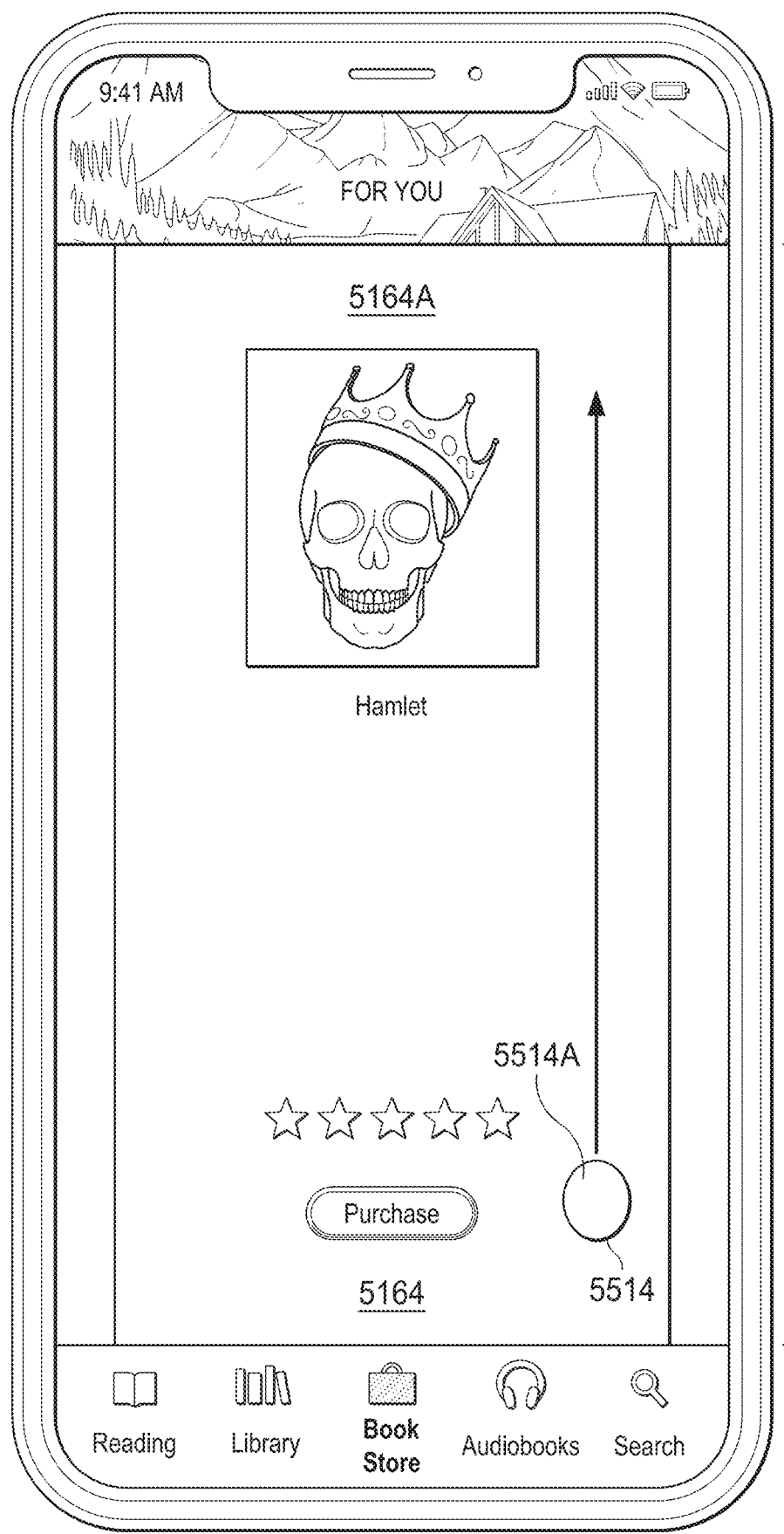
Figure 6U:
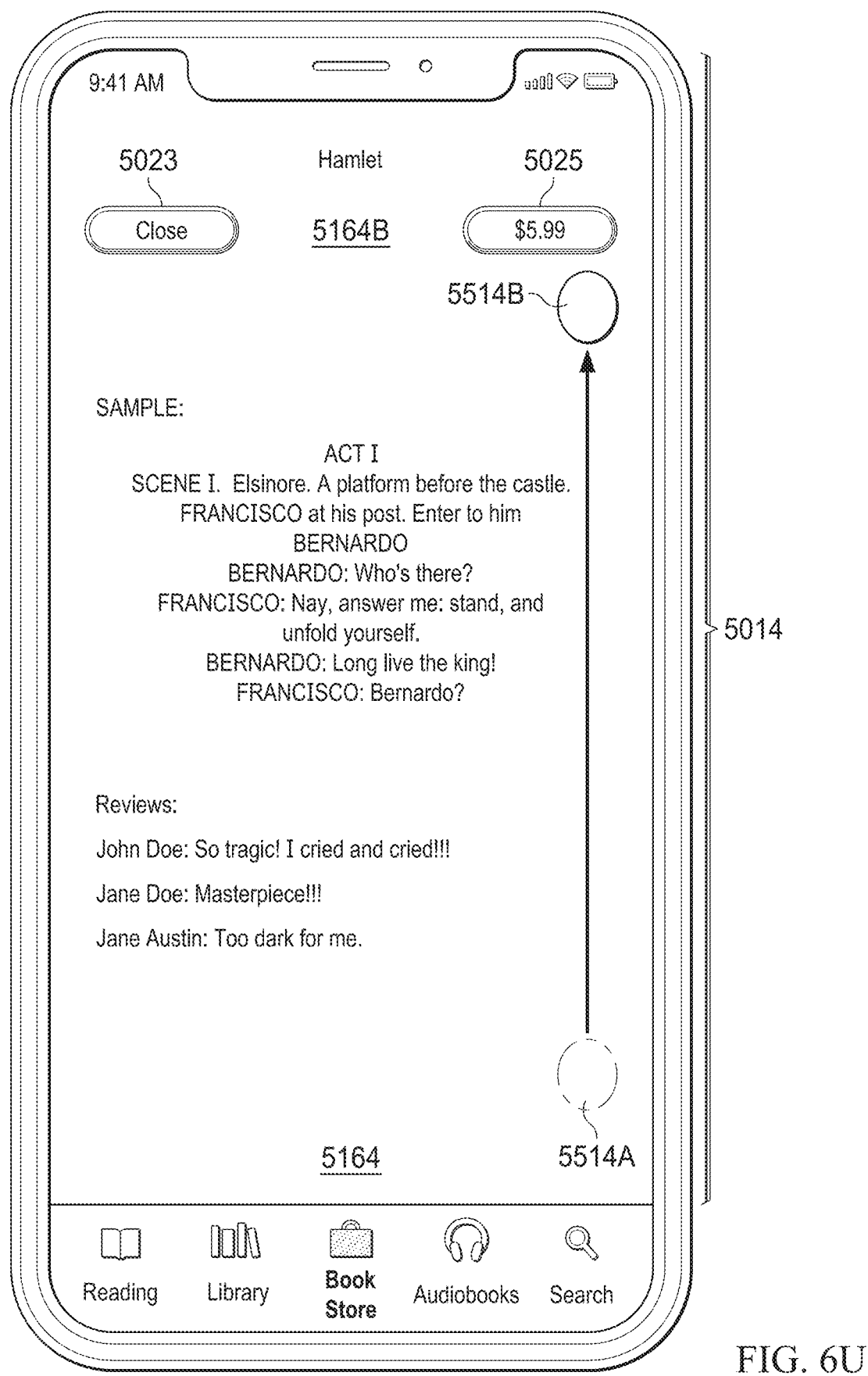
Figure 6V:
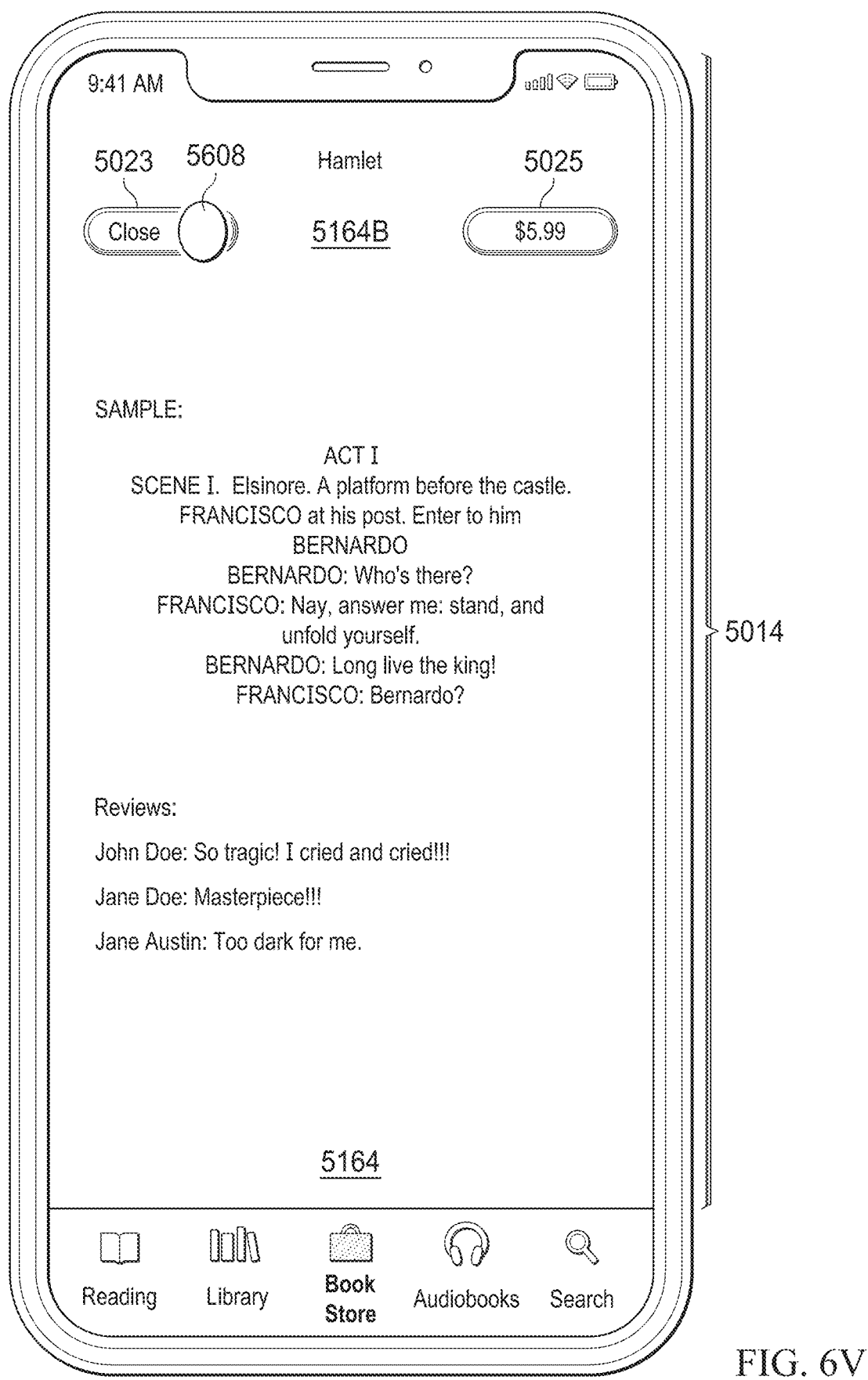

FIGS. 6S-6T illustrate detecting a tap gesture with contact 5604 over content affordance 5006D for *Hamlet*, and in response to the tap gesture, displaying a first portion 5164A of a content 5164 for *Hamlet* in content information user interface 5014. FIGS. 6T-6V illustrate exemplary user interfaces for scrolling from first portion 5164A to second portion 5165B of content 5164. Although content information user interface 5014 was previously locked, performing the tap gesture over a content affordance (e.g., content affordance 5006D for *Hamlet* and illustrated in FIG. 6S) displayed in second portion 5014B of content 5114 for *Romeo and Juliet* unlocks content information user interface 5014.

FIGS. 6T-6U illustrate detecting a swipe gesture with contact 5514 on first portion 5164A of content 5164 for *Hamlet* and movement of contact from position 5514A to position 5514B, and in response to the gesture, displaying a second portion 5164B of content 5164 in content information user interface 5014. Second portion 5164B of content 5164 contains a sample of *Hamlet*, reviews of *Hamlet*, close affordance 5023, and purchase affordance 5025. In the illustrated embodiment of FIG. 6U, device 100 relocks content information user interface 5014 upon a determination that the upward swipe gesture from position 5514A to position 5514B caused device 100 to scroll all of first portion 5164A of content 5164 off content information user interface 5014. Once content information user interface 5014 is locked, subsequent leftward and rightward swipe gestures while content information user interface 5014 remains locked do not cause device 100 to scroll content 5164 off of content information user interface 5014.

Figure 6W:
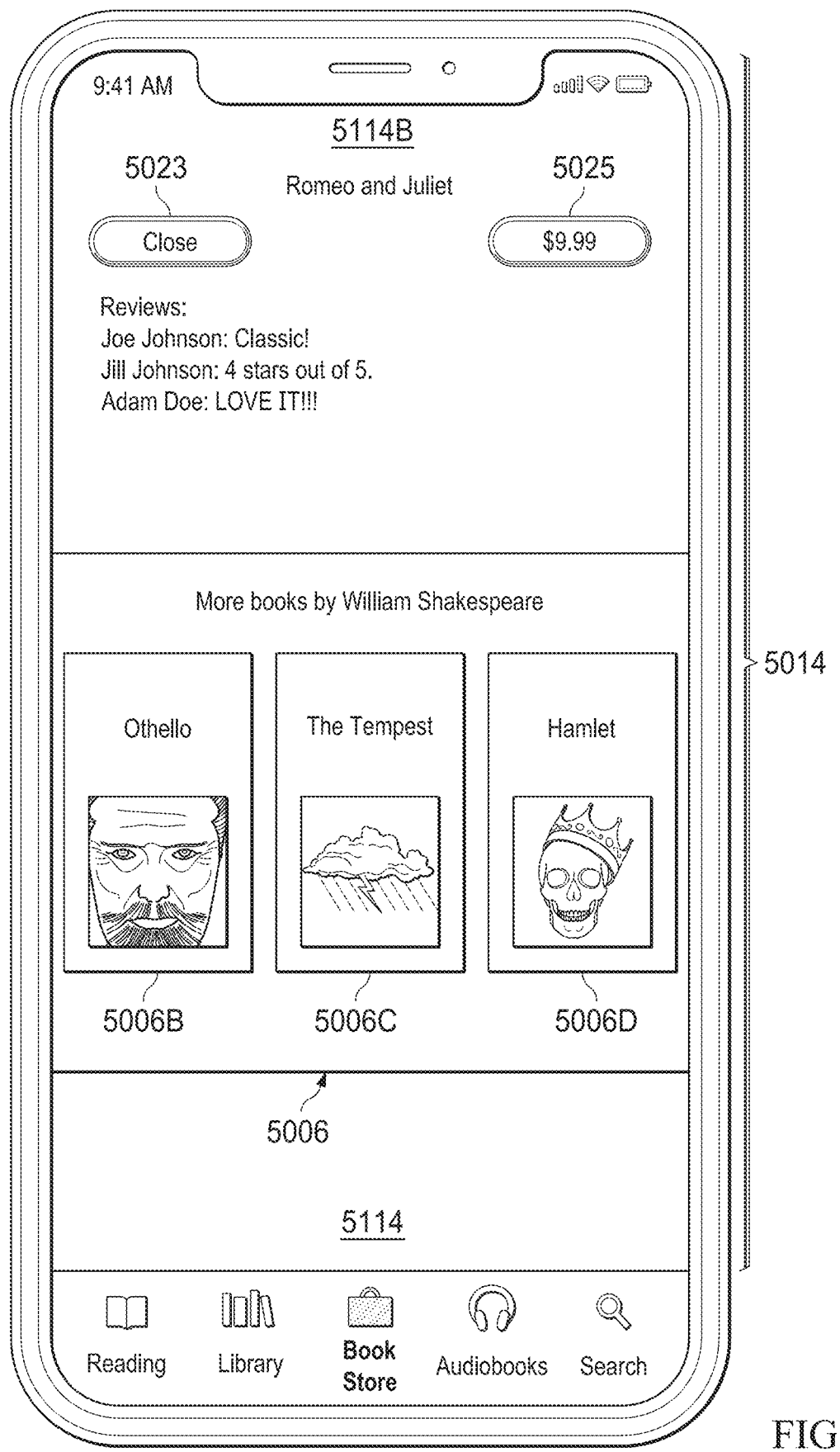

FIGS. 6V-6W illustrate a tap gesture with contact 5608 on close affordance 5023 in content information user interface 5014, and in response to the tap gesture, re-displaying second portion 5114B of content 5114 for *Romeo and Juliet* in content information user interface 5014. In some embodiments, criteria for locking content information user interface 5014 is satisfied if a second portion of content, such as second portion 5114B of content 5114 for *Romeo and Juliet* is displayed on content information user interface 5014, regardless of the gesture that was performed to cause device 100 to display second portion 5114B of content 5114. In the illustrated embodiment, device 100 determines that criteria for locking content information user interface 5014 is satisfied and locks content information user interface 5014.

Figure 6X:
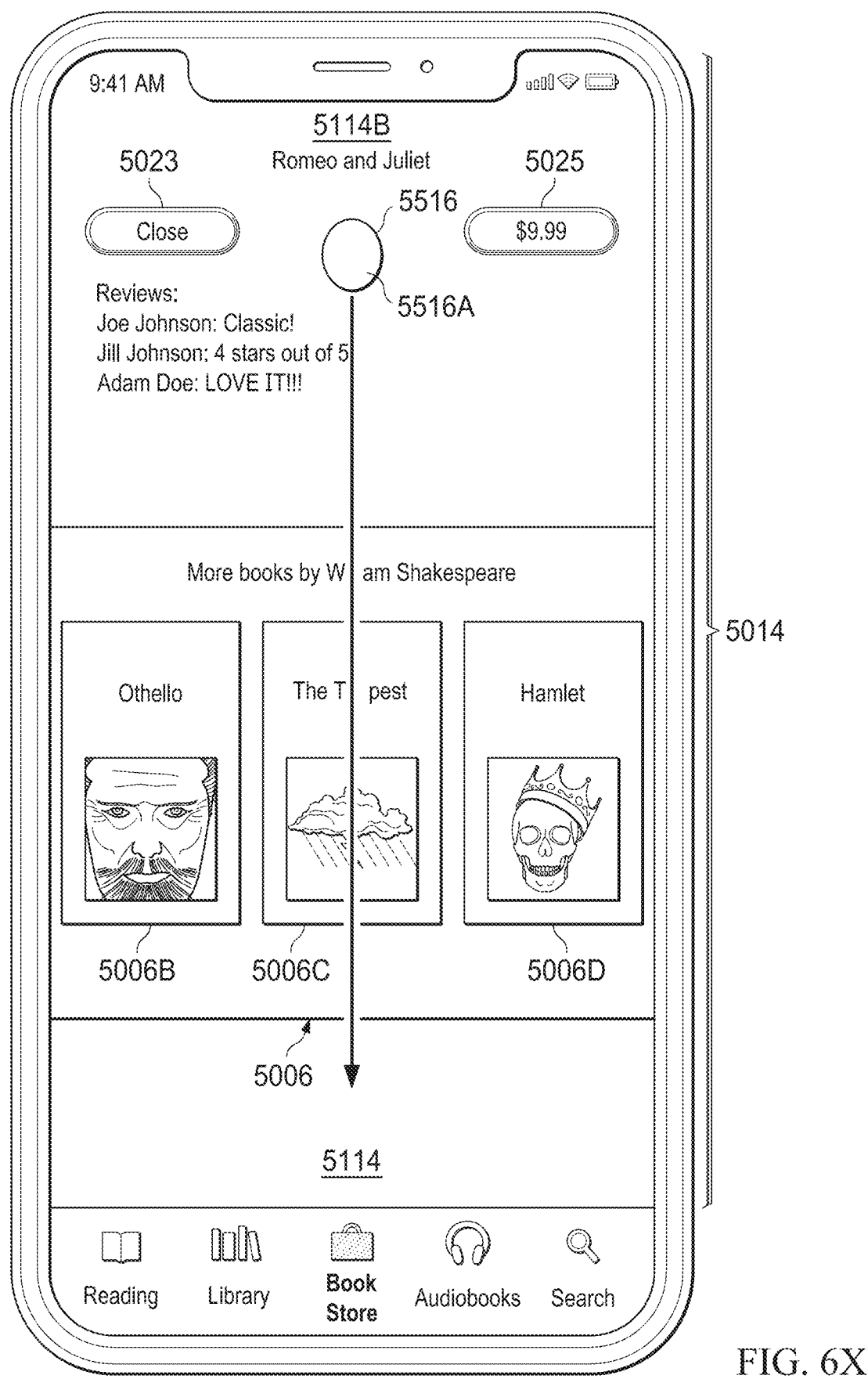
Figure 6Y:
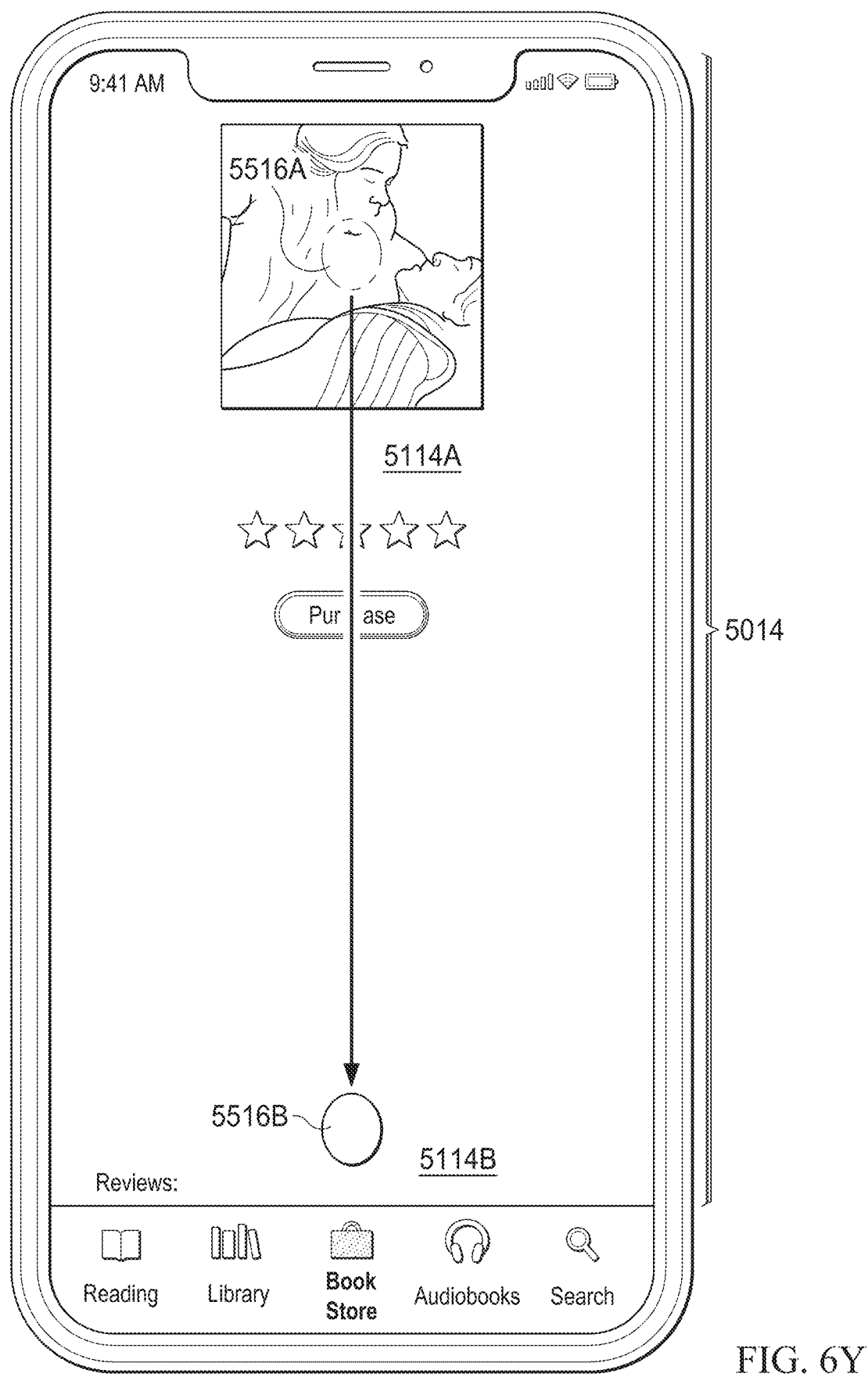

FIGS. 6X and 6Y illustrate exemplary user interfaces for unlocking content information user interface 5014. Moreover, FIGS. 6X-6Y illustrate detecting a swipe gesture with contact 5516 on a second portion 5114B of content 5114 for *Romeo and Juliet* and movement of contact 5516 from position 5516A to position 5516B, and in response to the gesture, concurrently displaying some of first portion 5114A and some of second portion 5114B of content 5114 in content information user interface 5014.

As a user performs gestures such as the downward swipe gestures illustrated in FIGS. 6X and 6Y, device 100, in response to detecting such gestures, determines whether such gestures (individually or collectively) satisfy criteria for unlocking content information user interface 5014. In one embodiment, such unlocking criteria is met if part of first portion 5114A of content 5114 for *Romeo and Juliet* is displayed in content information user interface 5014. Such predetermined portion may be predefined to mean any part of first portion 5014A, all of second portion 5114B of content 5114 being scrolled off of a region of touch-sensitive display, more than a predetermined percentage of first portion 5114A being displayed, a particular length of content 5114 vertically scrolled by a user relative to a region of touch-sensitive display 112, or any other suitable portion of content 5114 measured by any suitable methodology. In the illustrated embodiment, content 5114 is scrolled by more than the predetermined amount in a downward direction, which satisfies criteria for unlocking content information user interface 5014. In an alternative embodiment, the unlocking criteria may be satisfied by determining that a user has scrolled all the way to the top of content 5114. In other embodiments, unlocking criteria may be based on the number of downward swipe gestures, the detected speed of one or more downward swipe gestures, the intensity of a contact beginning such downward swipe gestures, the interval between downward swipe gestures, the detected length of a swipe gesture, or any other suitable characteristic of one or more swipe gestures. For example, in one embodiment, consecutive downward swipes within a determined period of time unlocks content information user interface 5014. In still other embodiments, unlocking criteria may be based on other user interaction with device 100, including the measured intensity of a contact other than a swipe gesture or a particular gesture or combination of gestures. In some embodiments, criteria for unlocking content information user interface 5014 is also satisfied if device 100 detects a tap gesture on a close affordance displayed in content information user interface 5014. In further embodiments, criteria for unlocking content information user interface 5014 is also satisfied if device 100 detects a tap gesture on a region of touch-sensitive display that is not covered by content information user interface 5014.

Figure 6Z:
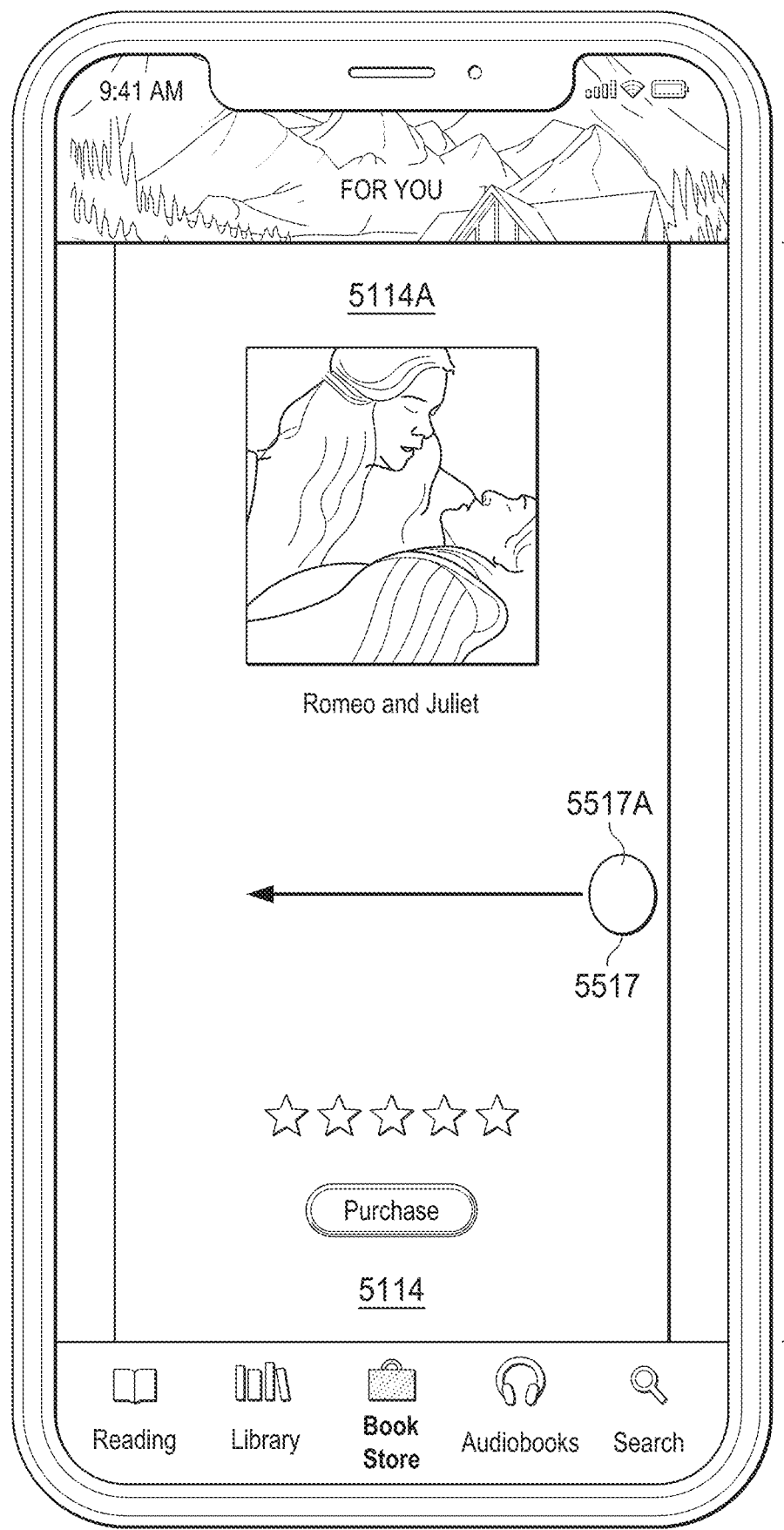
Figure 6A:
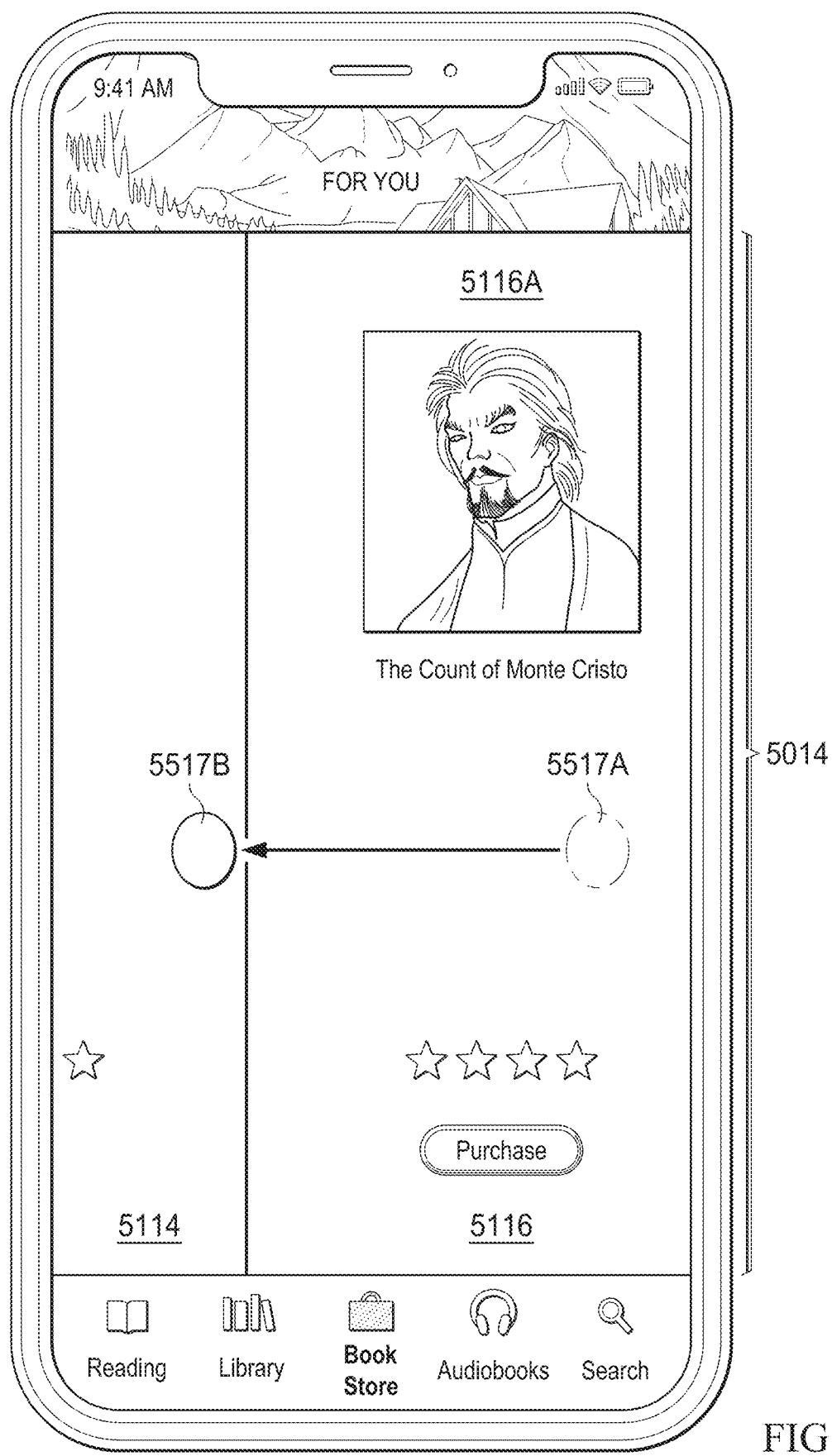
Figure 6A:
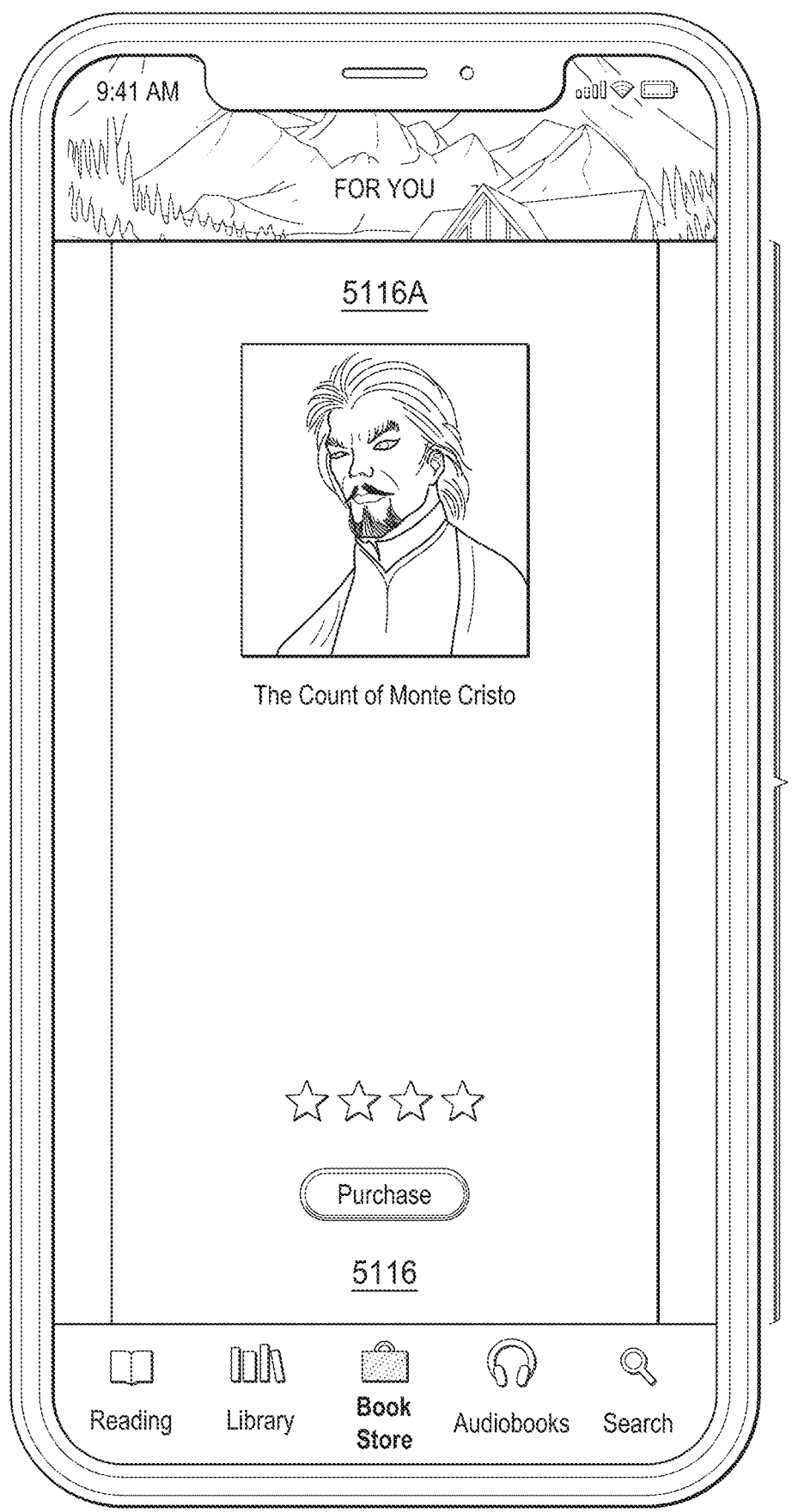
Figure 6A:
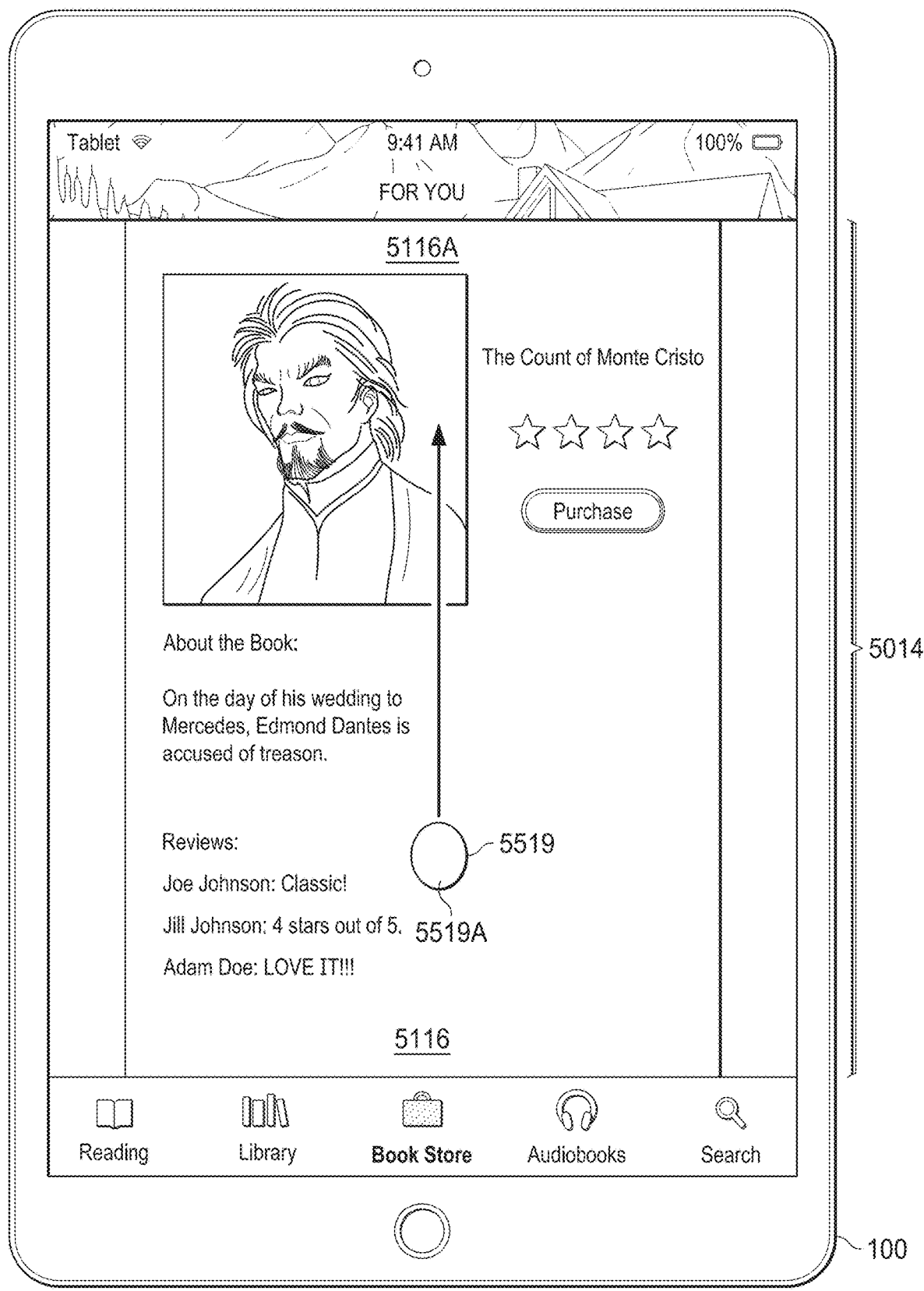
Figure 6A:
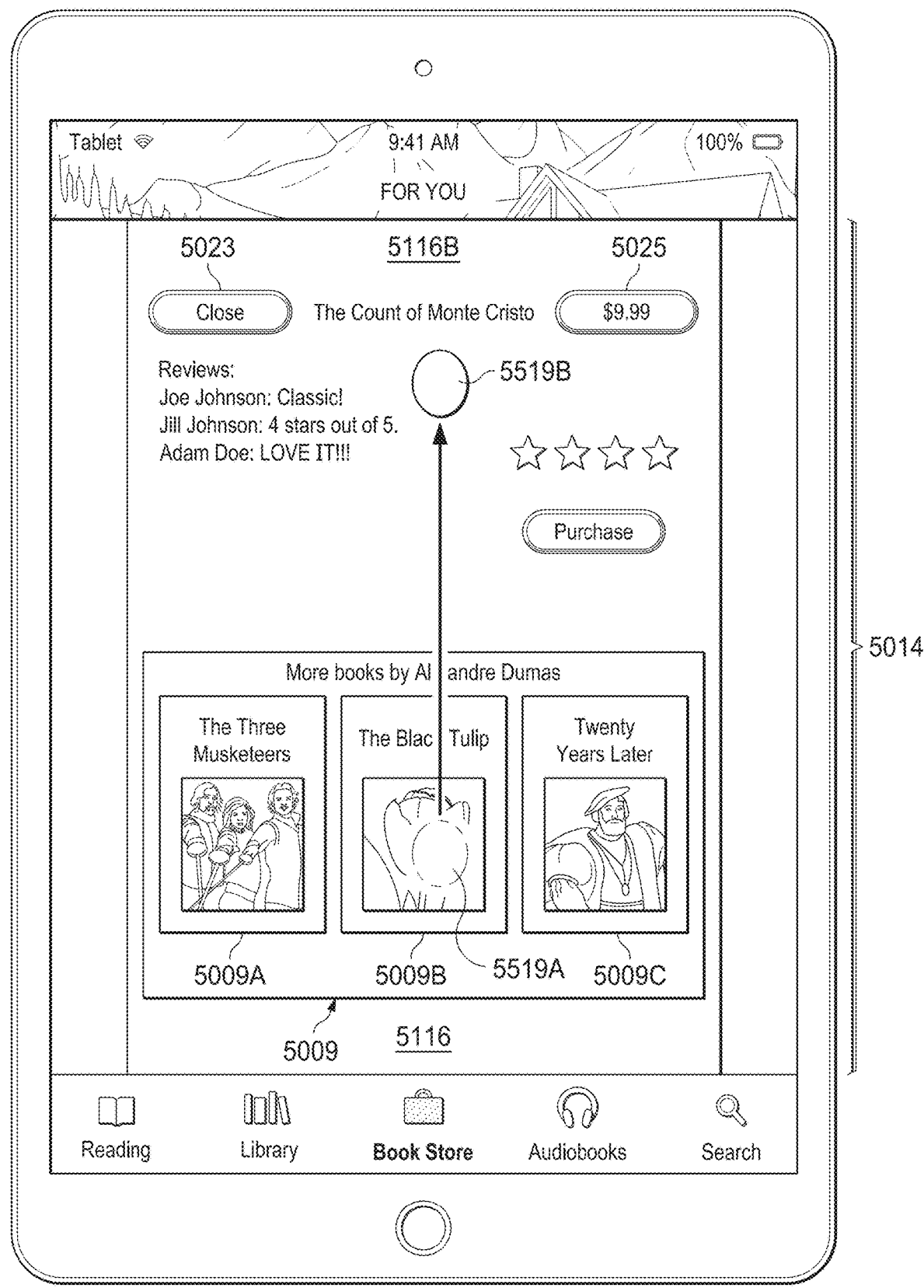
Figure 6A:
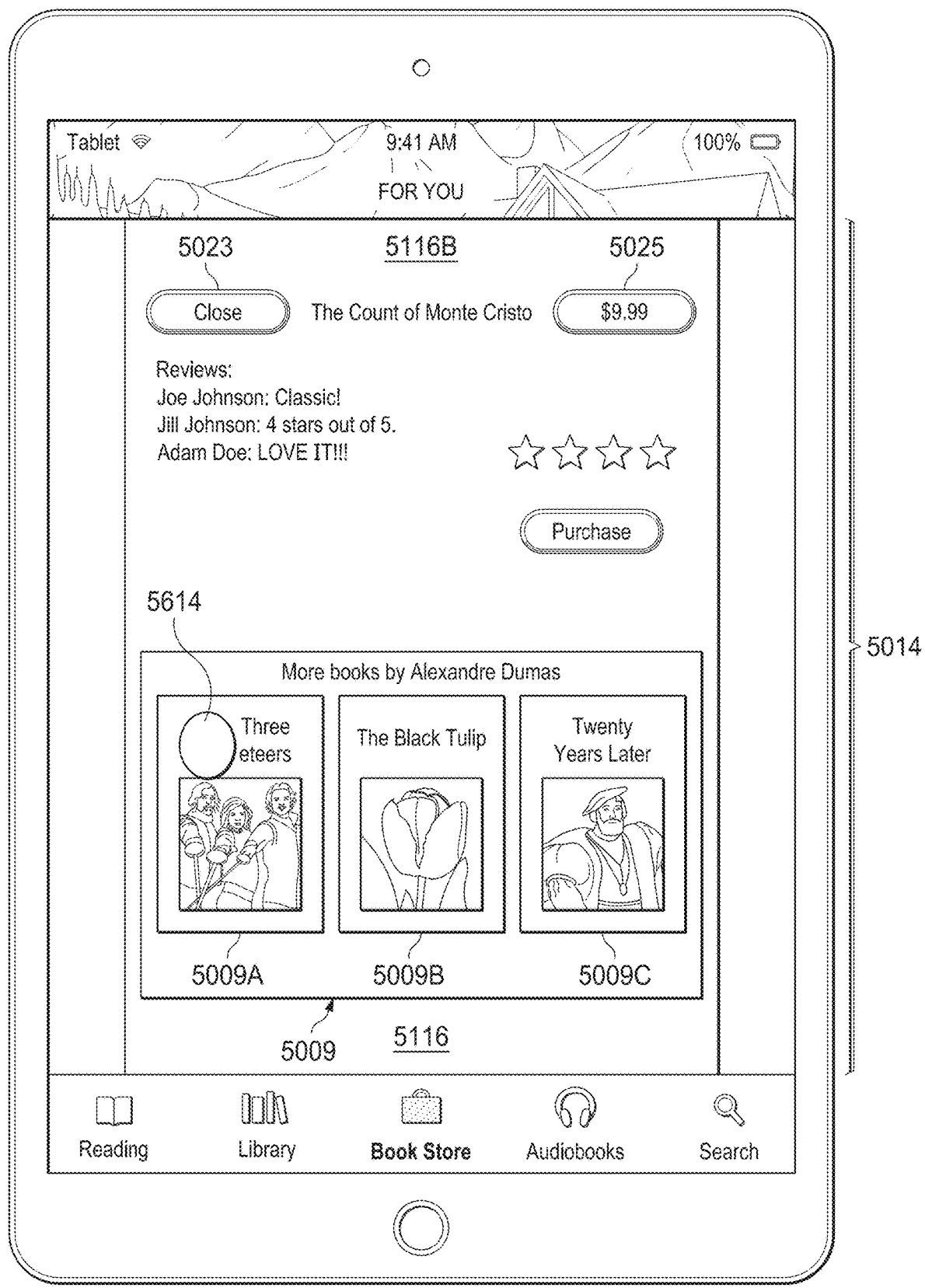
Figure 6A:
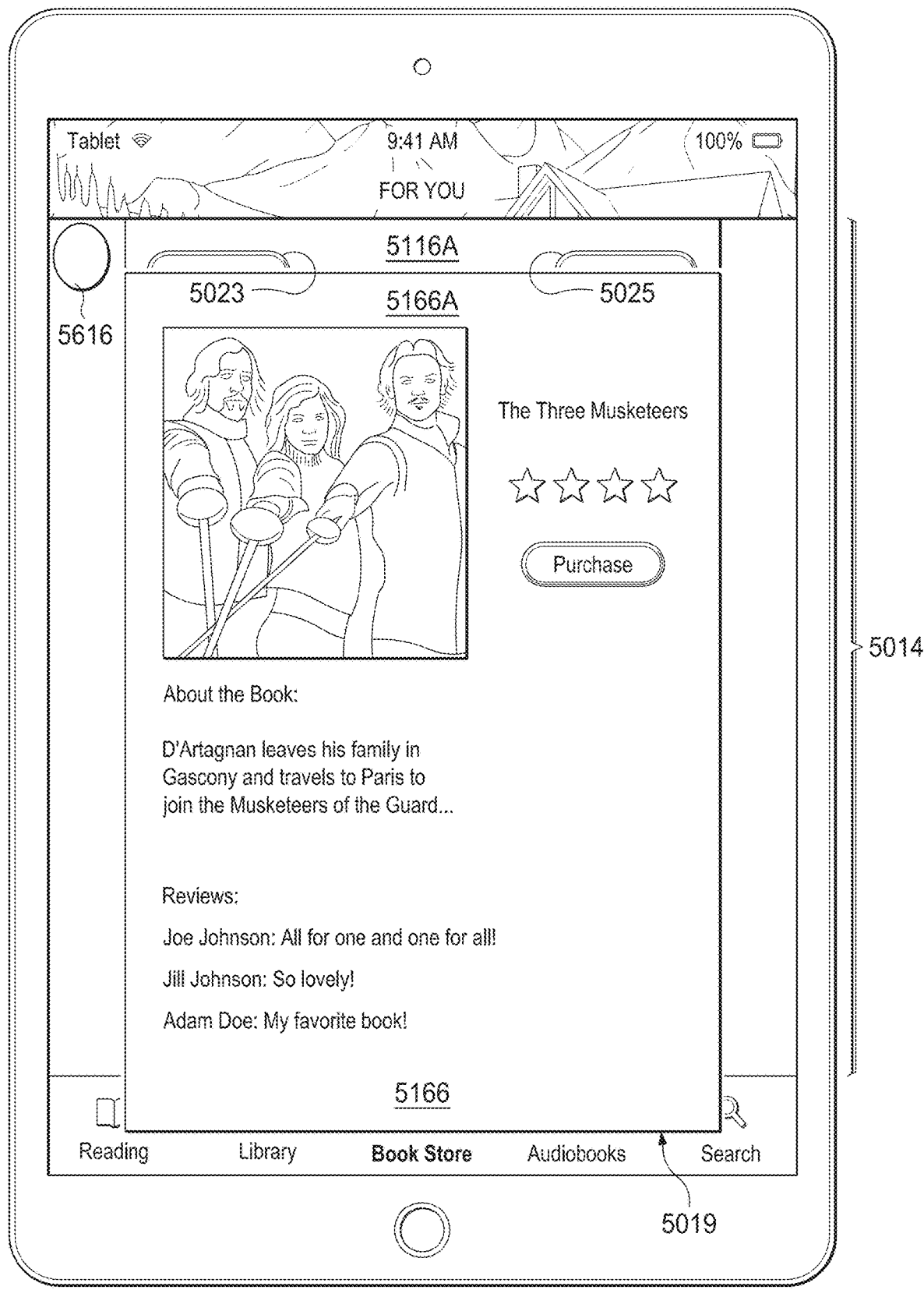
Figure 6A:
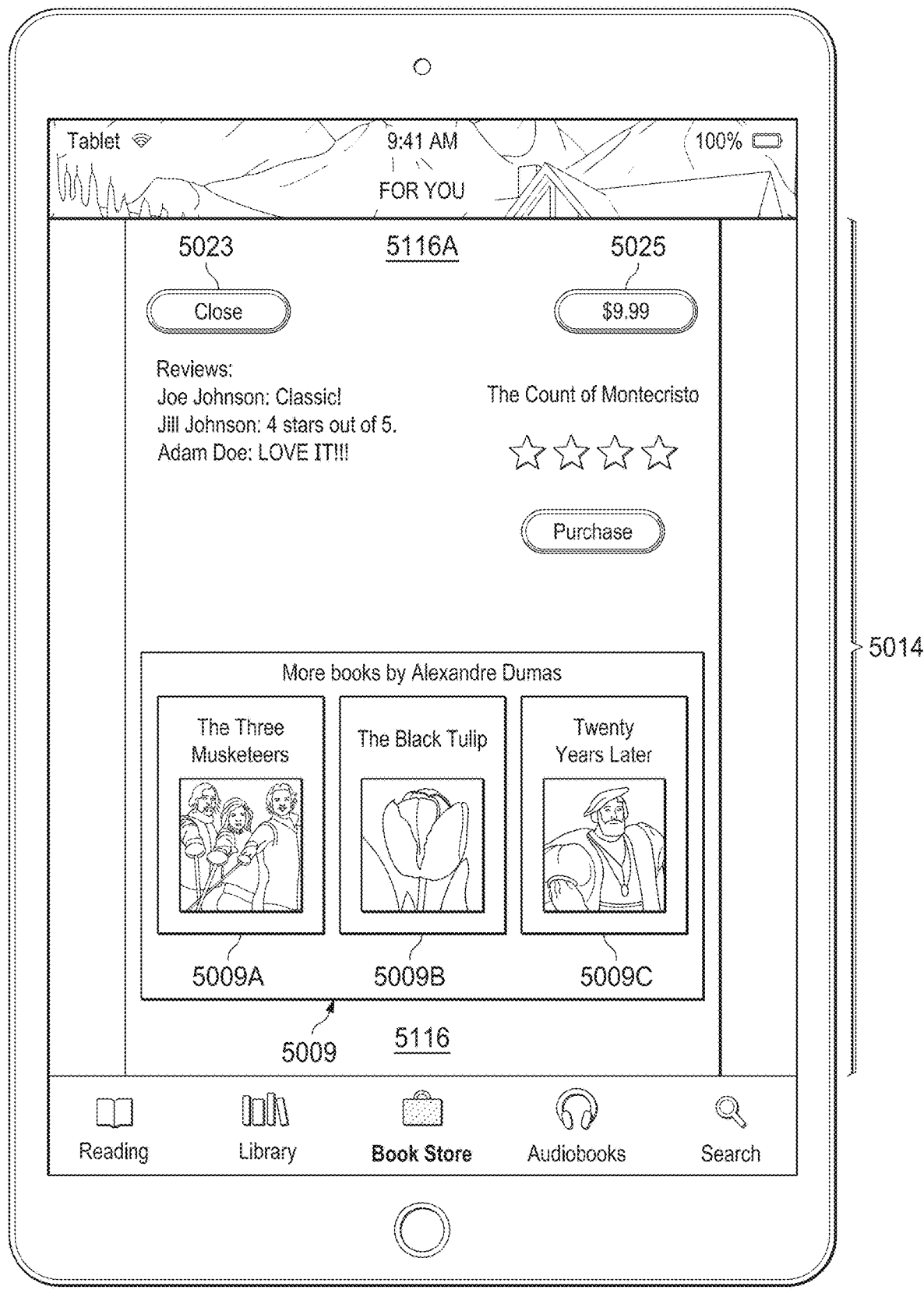
Figure 7A:
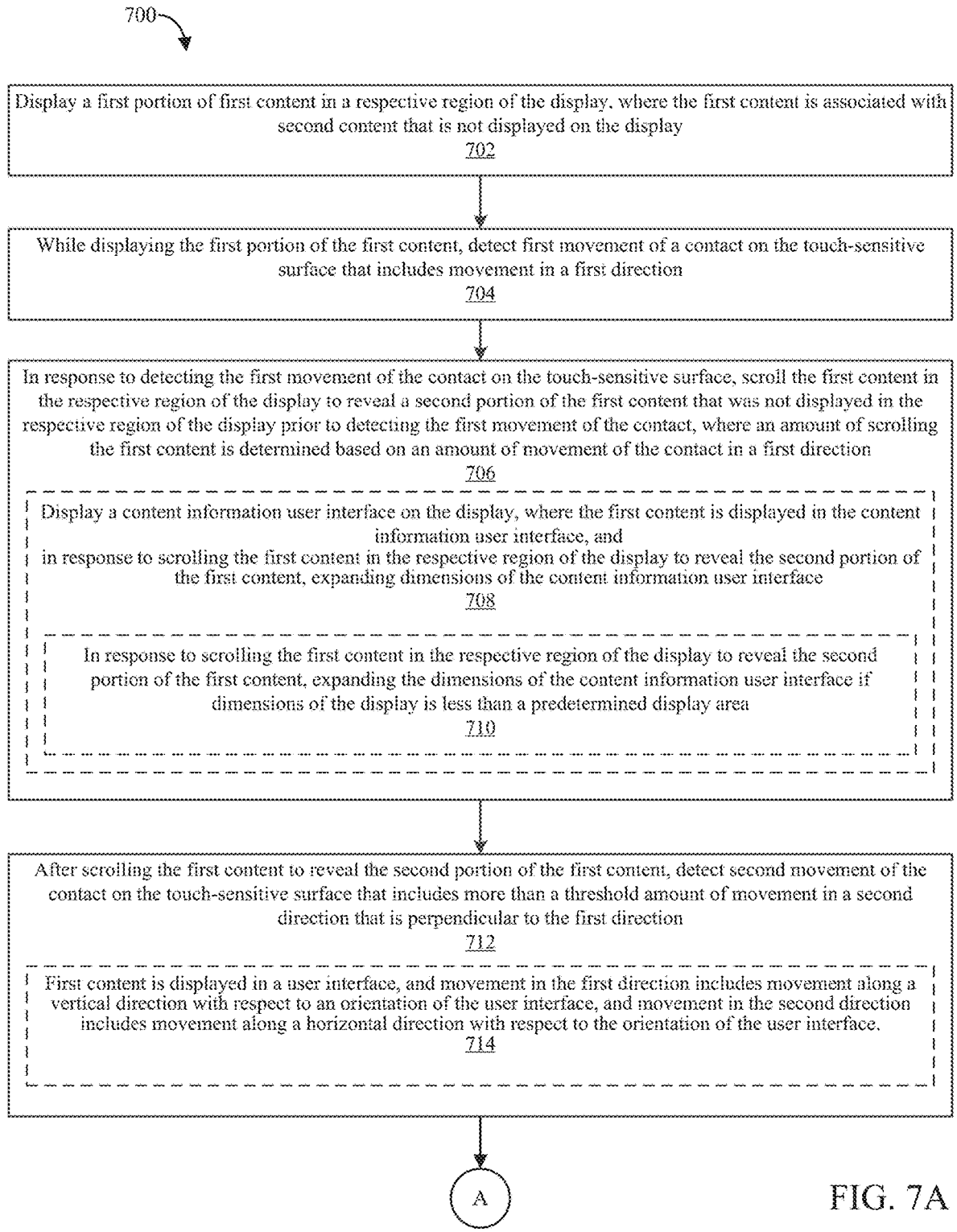
Figure 7B:
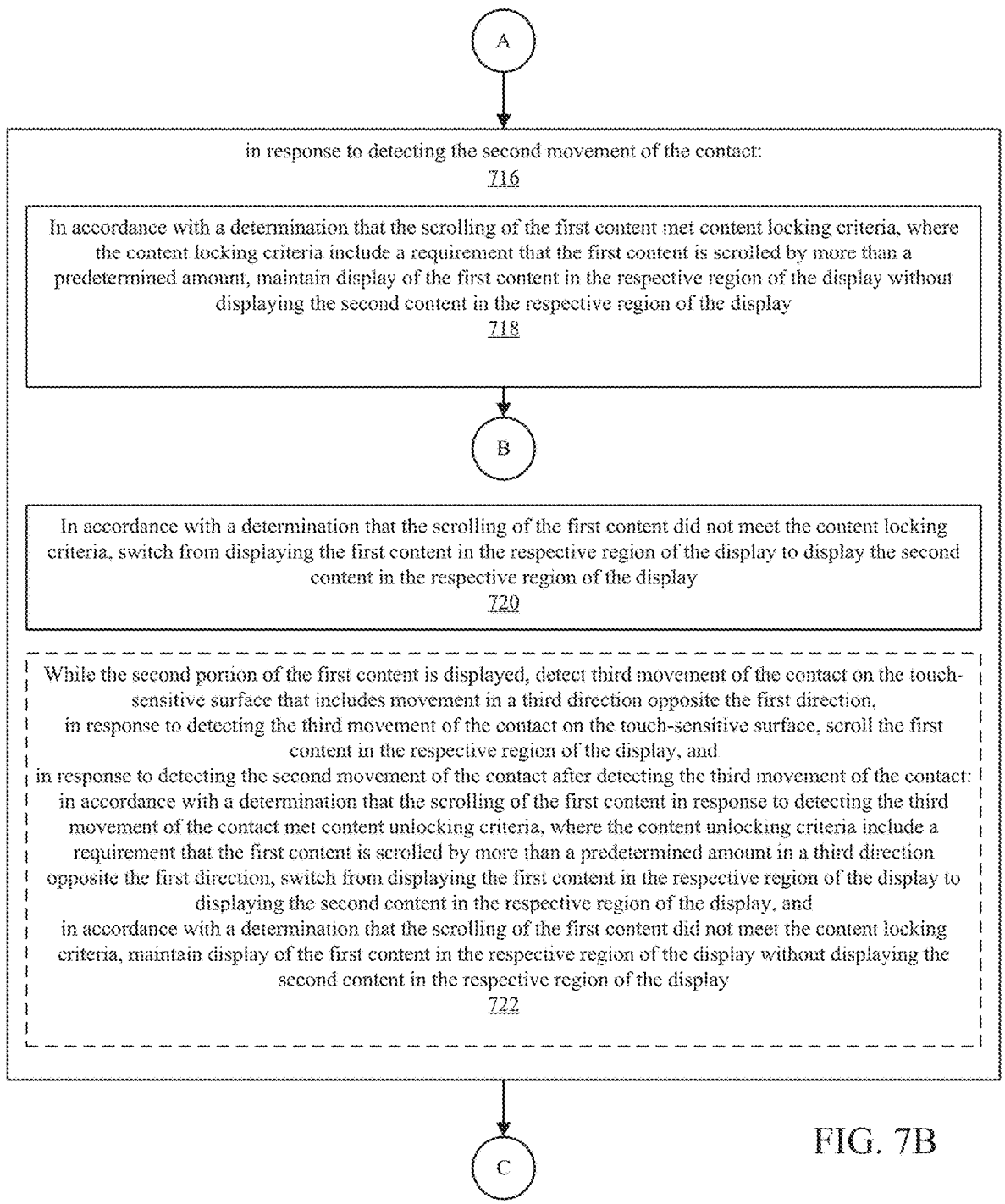

In the embodiment illustrated in FIGS. 6X and 6Y, after determining that criteria for unlocking content information user interface 5014 is satisfied, device 100 unlocks content information user interface 5014. As previously discussed, when content information user interface 5014 is unlocked, leftward and rightward swipe gestures on a threshold amount of movement cause device 100 to scroll between content associated with different content items. FIGS. 6Z-6AB illustrate exemplary user interfaces for scrolling through content of the scrollable set of content (such as content 5112 for *The Art of War*, content 5114 for *Romeo and Juliet*, and content 5116 for *The Count of Monte Cristo*) displayed in content information user interface 5014 after content information user interface 5014 is unlocked.

FIG. 6Z illustrates first portion 5114A of content 5114 for *Romeo and Juliet* in content information user interface 5014 after content information user interface 5014 is unlocked and a user has swiped to the top of content 5114 to view first portion 5114A. FIGS. 6Z-6AA illustrate detecting a swipe gesture with contact 5517 on a first portion 5114A of content 5114 and movement of contact 5517 from position 5517A to position 5517B, and in response to the gesture, displaying a first portion 5116A of content 5116 for *The Count of Monti Cristo*. As content information user interface 5014 is unlocked, the swipe gesture illustrated in FIGS. 6Z-6AA causes device 100 to shift a portion of content 5116 into content information user interface 5014 in response to detecting the swipe gesture. FIG. 6AB illustrates displaying first portion 5116A of content 5116 approximately aligned in the center of content information user interface 5014 after the user has completed the swipe gesture illustrated in FIGS. 6Z and 6AA.

FIGS. 6AC-6AG illustrate the display of and user interaction with content information user interface 5014 on device 100, where device 100 is a tablet or other device with a touch-sensitive display 112 having expanded dimensions. FIG. 6AC illustrates displaying a first portion 5116A of content 5116 for *The Count of Monte Cristo* in content information user interface 5014. In the illustrated embodiment, first portion 5116A of content 5116 contains all of the information illustrated in FIG. 6F. However, the first portion 5116A of content 5116 displayed in FIG. 6AC also contains additional information about *The Count of Monte Cristo* not displayed in FIG. 6F due to the expanded dimensions of touch-sensitive display 112.

FIGS. 6AC-6AD illustrate detecting a swipe gesture with contact 5519 on first portion 5116A of content 5116 for *The Count of Monte Cristo* and movement of contact 5519 from position 5519A to position 5519B, and in response to the swipe gesture, displaying second portion 5116B of content 5116. The swipe gesture illustrated in FIGS. 6AC and 6AD is similar to the swipe gestures from position 5509A to 5509B and from position 5510A to 5510B illustrated in FIGS. 6L-6O. However, because of the already expanded dimensions of touch-sensitive display 112 in FIG. 6AC-6AD, performing the swipe gesture from position 5519A to 5519B does not cause device 100 to increase the dimensions of content information user interface 5014. In some embodiments, the determination of whether to increase the dimensions of content information user interface 5014 is made in response to the display size of touch-sensitive display 112 being greater than a predetermined threshold. Further, in some embodiments, the locking criteria described relative to FIGS. 6L-6O includes a prerequisite that content information interface 5014 is locked only if the dimensions of touch-sensitive display 112 of device 100 are smaller than a predetermined size. In the illustrated embodiments of FIGS. 6AC-6AD, the dimensions of the touch-sensitive display 112 of device 100 is greater than such predetermined size. Performance of the swipe gesture from position 5519A to position 5519B illustrated in FIGS. 6AC-6AD does not cause device 100 to lock content information user interface 5014. In the illustrated embodiment, a leftward swipe gesture (not shown) or a rightward swipe gesture (not shown) including more than a threshold amount of movement would cause device 100 to partially or completely scroll content 5116 off content information user interface 5014.

In the illustrated embodiment of FIG. 6AD, second portion 5116B of content 5116 for *The Count of Monte Cristo* includes close affordance 5023, purchase affordance 5025, reviews of *The Count of Monte Cristo*, and a second scrollable set of content affordances 5009 in content information user interface 5014. Second scrollable set of content affordances 5009 includes a content affordance 5009A (*The Three Musketeers*), a content affordance 5009B (*The Black Tulip*), a content affordance 5009C (*Twenty Years Later*), and other content affordances not illustrated in FIG. 6AD. Further, each content affordance of second scrollable set of content affordances 5009 is associated with content about a book written by Alexandre Dumas. As illustrated, content affordance 5009A is associated with content about *The Three Musketeers*, content affordance 5009B is associated with content about *The Black Tulip*, and content affordance 5009C is associated with content about *Twenty Years Later*.

FIGS. 6AE-6AF illustrates detection of a tap gesture with contact 5614 on content affordance 5009A for *The Three Musketeers*, and in response to the tap gesture, displaying a first portion 5166A of a content 5166 for *The Three Musketeers* in user interface 5019. User interface 5019 is overlaid on a portion of content information user interface 5014 in response to detecting the tap gesture with contact 5614 in FIG. 6AE. In the illustrated embodiment, content 5166 contains information about *The Three Musketeers*. Further, first portion 5166A of content 5166 includes an image of a book cover, a ratings indicator, reviews, and additional information about *The Three Musketeers*.

FIGS. 6AF-6AG illustrate detecting a tap gesture with contact 5616 on a portion of content information user interface 5014 not overlaid by user interface 5019, and in response to the tap gesture, displaying content information user interface 5014. More particularly, device 100, in response to detecting the tap gesture with contact 5616, removes the overlay of user interface 5019 from touch-sensitive display 112. In other embodiments, device 100, in response to detecting a tap gesture over a region of parent user interface 5002 (not shown) not covered by either user interface 5019 or content information user interface 5014, also removes the overlay of user interface 5019.

FIG. 6AG illustrates displaying content information user interface 5014. As illustrated, content information user interface 5014 includes a close affordance 5023. A tap gesture with contact over close affordance 5023 causes device 100 to remove the overlay of content information user interface 5014 and display parent user interface 5002 of FIG. 6A. In other embodiments, a tap gesture with contact over an area not covered by content information user interface 5014 also causes device 100 to remove the overlay of content information user interface 5014 and display parent user interface 5002 as illustrated in FIG. 6A. In one embodiment, when parent user interface 5002 of FIG. 6A is displayed, content preview affordance 5004C for *The Count of Monte Cristo* is displayed at the beginning of the scrollable set of content preview affordances 5004 of FIG. 6A to indicate that the user most recently viewed content associated with content preview affordance 5004C.

FIGS. 7A-7E are flow diagrams illustrating various embodiments of a method 700 for scrolling through information about content items using an electronic device. More particularly, FIGS. 7A-7E are flow diagrams illustrating a method for presenting content containing information about content items, using, for example, the user interfaces of FIGS. 6A-6AG. As described in reference to FIGS. 6A-6AG, method 700 can be utilized to navigate through content containing information about content items such as products displayed in an electronic store. Method 700 is performed at an electronic device (e.g., device 100, 300, 500 illustrated in FIGS. 1, 3A, and 5A, respectively) with a display and a touch-sensitive surface. In one of such embodiments, the display is a touch screen display and the touch-sensitive surface is on or integrated with the display. In some embodiments, the display is separate from the touch-sensitive surface. In other embodiments, the processes described herein may be implemented with devices having physical user-interfaces, voice interfaces, or other suitable interfaces. Some operations in method 700 are, optionally, combined and/or the order of some operations is, optionally, changed.

As described below, method 700 provides an intuitive way for presenting content containing information about content items of an electronic store. The method reduces the cognitive burden on a user when the user is navigating through content about different items displayed in the electronic store, thereby creating a more efficient human-machine interface. For battery-operated computing devices, enabling a user to navigate through different content faster and more efficiently conserves power and increases the time between battery charges.

The device displays (702) a first portion of first content in a respective region of the display, where the first content is associated with second content that is not displayed on the display. In some embodiments, the respective region is a region on display 112 that displays content information user interface 5014 illustrated in FIG. 6B. In other embodiments, the respective region is a region on display 112 that displays a portion of content information user interface 5014 illustrated in FIG. 6B, such as the center portion of content information user interface 5014. FIG. 6B, for example, displays first portion 5112A of content 5112 for *The Art of War* in content information user interface 5014. However, FIG. 6B does not display any portion of content 5114 for *Romeo and Juliet* in content information user interface 5014.

The device, while displaying the first portion of the first content, detects (704) a first movement of a contact on the touch-sensitive surface that includes movement in a first direction. In some embodiments, the first movement of a contact includes a swipe gesture in an upward direction. In that regard, FIGS. 6L-6O, 6T-6U, and 6AC-6AD show examples of upward swipes.

The device, in response to detecting the first movement of the contact on the touch-sensitive surface, scrolls (706) the first content in the respective region of the display to reveal a second portion of the first content that was not displayed in the respective region of the display prior to detecting the first movement of the contact. FIGS. 6M-6O, 6U, and 6AD, for example, show scrolling to display second portion 5114B of content 5114 for *Romeo and Juliet*, second portion 5164B of content 5164 for *Hamlet*, and second portion 5116B of content 5116 for *The Count of Monte Cristo*, respectively. The amount of scrolling of the first content is determined based on an amount of movement of the contact in a first direction. FIG. 6M, for example, shows scrolling content 5114 for *Romeo and Juliet* by approximately the same amount as the amount of movement of the swipe gesture from position 5509A to 5509B. Similarly, FIG. 6O, for example, shows scrolling content 5114 by approximately the same amount as the amount of movement of the swipe gesture from position 5510A to position 5510B.

In some embodiments, the device displays (708) a content information user interface on the display, where the first content is displayed in the content information user interface. FIG. 6B, for example, illustrates displaying content 5112 for *The Art of War* in content information user interface 5014.

In some embodiments, the device, in response to scrolling the first content in the respective region of the display to reveal the second portion of the first content, expands (708) dimensions of the content information user interface. FIGS. 6L-6M and 6T-6U, for example, show expanding dimensions of content information user interface 5014 in response to scrolling content 5114 for *Romeo and Juliet* and content 5164 for *Hamlet* to display second portion 5114B of content 5114 and second portion 5164B of content 5164, respectively. Similarly, scrolling of content 5112 for *The Art of War* while content 5112 is displayed in content information user interface 5014 illustrated in FIG. 6B (to display a second portion of content 5112) would also gradually expand dimensions of content information user interface 5014. Expanding the dimensions of content information user interface 5014 allows additional content to be concurrently displayed in content information user interface 5014, thereby reducing the number of extraneous inputs caused by the user having to perform gestures to view the content, enhancing the operability of the device, and making the user-device interface more efficient. The cognitive burden on a user when the user is navigating through content displayed in an expanded content information user interface 5014 is also reduced, thereby creating a more efficient human-machine interface. For battery-operated computing devices, enabling a user to navigate through content faster and more efficiently conserves power and increases the time between battery charges.

In some embodiments, the device, in response to scrolling the first content in the respective region of the display to reveal the second portion of the first content, expands (710) the dimensions of the content information user interface if dimensions of display 112 is less than a predetermined display area. In the embodiment illustrated in FIGS. 6L-6M, dimensions of display 112 is less than the predetermined display area. FIGS. 6L-6M, for example, show dimensions of content information user interface 5014 expanding as swipe gesture with contact 5509 is performed from 5509A to 5509B. Further, dimensions of content information user interface 5014 of FIG. 6M is approximately identical to the dimensions of display 112. Expanding the dimensions of content information user interface 5014 if the dimensions of display 112 is less than a predetermined display area allows additional content to be concurrently displayed on the display of smaller electronic devices, thereby reducing the number of extraneous inputs caused by the user having to perform gestures to view the content. The foregoing also enhances the operability of the device and makes the user-device interface more efficient. The cognitive burden on a user when the user is navigating through content displayed in an expanded content information user interface 5014 is also reduced, thereby creating a more efficient human-machine interface. For battery-operated computing devices, enabling a user to navigate through content faster and more efficiently conserves power and increases the time between battery charges.

The device, after scrolling the first content to reveal the second portion of the first content, detects (712) the second movement of the contact on the touch-sensitive surface that includes more than a threshold amount of movement in a second direction that is perpendicular to the first direction. In one or more embodiments, movement in the second direction is movement in a leftward or rightward direction. In that regard, FIG. 6P, for example, illustrates detecting gestures in leftward and rightward directions while second portion 5114B of content 5114 for *Romeo and Juliet* is displayed in content information user interface 5014.

In some embodiments, first content is displayed in a user interface, and movement in the first direction includes movement along a vertical direction with respect to an orientation of the user interface. Movement in the second direction includes movement along a horizontal direction with respect to the orientation of the user interface (714). FIG. 6O, for example, illustrates movement in the vertical orientation of content information user interface 5014. FIG. 6P illustrates movement in the horizontal orientation of content information user interface 5014. Defining directions of movements based on an orientation of a user interface allows the user to perform consistent movements to scroll through content displayed in the user interface, lock the user interface, or unlock the user interface regardless of the orientation of device 100, thereby making the user-device interface more efficient. Allowing the user to perform the same set of gestures regardless of the orientation of device 100 also reduces the cognitive burden on the user when the user is navigating through content regardless of the orientation of device 100, thereby creating a more efficient human-machine interface. For battery-operated computing devices, enabling a user to navigate through content faster and more efficiently conserves power and increases the time between battery charges.

The device, in response to detecting the second movement of contact (716), and in accordance with a determination that the scrolling of the first content met content locking criteria, maintains (718) display of the first content in the respective region of the display without displaying the second content in the respective region of the display, where the content locking criteria includes a requirement that the first content is scrolled by more than a predetermined amount, maintain display of the first content in the respective region of the display without displaying the second content in the respective region of the display. FIG. 6K-6O illustrate scrolling content 5114 for *Romeo and Juliet* by more than the predetermined amount. FIG. 6P, for example, illustrates detection of gestures in leftward and rightward directions. Further, the device, in response to detecting gestures in the leftward and right directions, and in accordance with a determination that content 5114 has moved by more than the predetermined amount, maintains display of content 5114 in content information user interface 5014 of content information user interface 5014 without displaying other content in content information user interface 5014. The device, in response to detecting the second movement of the contact (716), and in accordance with a determination that the scrolling of the first content did not meet the content locking criteria, switches (720) from displaying the first content in the respective region of the display to display the second content in the respective region of the display. FIGS. 6A-6K, for example, show scrolling through different content (e.g., content 5112 of FIG. 6B for *The Art of War*, content 5114 of FIGS. 6C-6D for *Romeo and Juliet*, and content 5116 of FIGS. 6E-6G for *The Count of Monte Cristo*) of the scrollable set of content while content information user interface is not locked.

In some embodiments, while the second portion of the first content is displayed, the device detects (722) third movement of the contact on the touch-sensitive surface that includes movement in a third direction opposite the first direction. In some embodiments, the third movement is a movement in a downward direction. FIG. 6Y, for example, shows the gesture with movement of contact in a downward direction from position 5516A to position 5516B.

In some embodiments, the device, in response to detecting the third movement of the contact on the touch-sensitive surface, scrolls (722) the first content in the respective region of the display. FIG. 6Y, for example, shows scrolling content 5114 for *Romeo and Juliet* in a downward direction in response to detecting the swipe gesture with contact 5516 illustrated in FIG. 6X from position 5516A to position 5516B.

In some embodiments, in response to detecting the second movement of the contact after detecting the third movement of the contact (722), and in accordance with a determination that the scrolling of the first content in response to detecting the third movement of the contact met content unlocking criteria, switch (722) from displaying the first content in the respective region of the display to displaying the second content in the respective region of the display. The content unlocking criteria include a requirement that the first content is scrolled by more than a predetermined amount in a third direction opposite the first direction. In some embodiments, the third movement is a downward swipe gesture similar to the swipe gesture shown in FIGS. 6X and 6Y with contact 5516 from position 5516A to position 5516B. The downward gesture is performed while content information user interface 5014 is locked to unlock content information user interface 5014. Further, the second gesture is a gesture similar to the gestures illustrated in FIGS. 6Z-6AB and is performed after content information user interface 5014 is unlocked. In that regard, FIGS. 6Z-6AB show scrolling through different content of the scrollable set of content after determining that the criteria for unlocking content information user interface 5014 have been met.

In some embodiments, in response to detecting the second movement of the contact after detecting the third movement of the contact (722), and in accordance with a determination that the scrolling of the first content did not meet the content locking criteria, the device maintains (722) the display of the first content in the respective region of the display without displaying the second content in the respective region of the display. In some embodiments, the third movement is a downward swipe gesture that does not include a threshold movement to satisfy a criterion of the criteria to unlock content information user interface 5014. In such embodiments, content information user interface 5014 remains locked and subsequent swipes in the second direction does not cause device to display other content in content information user interface 5014. Allowing the user to perform certain gestures to unlock content information user interface 5014 also allows the user to view other content not displayed in content information user interface 5014 while content information user interface 5014 is locked, thereby making the user-device interface more efficient. Further, designating a gesture performed in a first direction as a gesture to lock content information user interface 5014 and designating another gesture performed in a third direction that is substantially opposite of the first direction as a gesture to unlock content information user interface 5014 allows the user to perform simple gestures that are easy to remember, thereby reducing the cognitive burden on the user, and creating a more efficient human-machine interface. Further, allowing the user to perform simple gestures to unlock content information user interface 5014 reduces the number of extraneous inputs required by more complicated gestures to unlock content information user interface 5014, thereby enhancing the operability of the device and making the user-device interface more efficient. For battery-operated computing devices, enabling a user to unlock content information user interface 5014 to display other content faster and more efficiently conserves power and increases the time between battery charges.

In some embodiments, the second portion of the first content includes a scrollable set of content affordances, and a first content affordance of the scrollable set of content affordances is displayed in a second respective region of the display (724). FIG. 6O, for example, shows scrollable set of content affordances 5006 in second portion 5114B of content 5114 for *Romeo and Juliet*. As depicted, scrollable set of content affordances 5006 is formed from content affordance 5006A for *Macbeth*, content affordance 5006B for *Othello*, and content affordance 5006C for *The Tempest*. In some embodiments, a second portion 5112B of content 5112 for *The Art of War* illustrated in FIG. 6B also includes a scrollable set of content affordances similar to scrollable set of content affordances 5006.

In some embodiments, in response to detecting a second movement of the contact, and in accordance with a determination that the scrollable set of content affordances is selected, the device scrolls (724) the scrollable set of content affordances. FIGS. 6Q and 6R, for example, show scrolling scrollable set of content affordances 5006 in response to detecting the swipe gesture with movement of contact 5512 on scrollable set of content affordances 5006 from position 5512A to position 5512B. In some embodiments, scrolling the scrollable set of content affordances replaces the displayed first content affordance in the second respective region of the display with the displayed second content affordance of the scrollable set of content affordances in the second respective region of the display (724). The second content affordance was not displayed in the second respective region prior to detecting the second movement of the contact. FIGS. 6Q and 6R, for example, show scrolling content affordance 5006A off of content information user interface 5014 and scrolling content affordance 5006D into content information user interface 5014 in response to detecting the swipe gesture with movement of contact 5512 on scrollable set of content affordances 5006 from position 5512A to position 5512B. In other embodiments, where only content affordance 5006A is initially displayed, or where the positions of content affordance 5006B and content affordance 5006D in scrollable set of content affordances 5006 are switched, performance of the swipe gesture shown in FIGS. 6Q and 6R would cause the device to replace the display of content affordance 5006A with second content affordance 5006B. Displaying a scrollable set of content affordances allows the user to quickly scroll through content affordances associated with additional content that user may be interested in viewing, thereby creating a more efficient-human-machine interface. Allowing the user to quickly scroll through content affordances associated with additional content that the user may be interested in without having to access another user interface also reduces the cognitive burden on the user to manually search for content. The foregoing also reduces the number of extraneous inputs required for the user to manually search for content. The foregoing also reduces a need for the user to contact a third party to obtain suggestions on similar content, thereby freeing up communications systems, reducing bandwidth on networks, and preserving energy. For battery-operated computing devices, providing the user with suggested content and allowing the user to navigate through the suggested content faster and more efficiently conserves power and increases the time between battery charges.

In some embodiments, the device detects (726) a selection of the second content affordance. FIG. 6S, for example, shows a tap gesture with contact 5604 over content affordance 5006D for *Hamlet* to select content affordance 5006D. A similar gesture with a contact over second content affordance 5006B for *Othello* illustrated in FIG. 6S would select second content affordance 5006B.

In some embodiments, the device, in response to detecting the selection of the second content affordance, displays (726) a portion of content associated with the second content affordance in the respective region affordance. FIG. 6T, for example, shows displaying first portion 5164A of content 5164 for *Hamlet* in response to detecting the tap gesture with contact 5604 over content affordance 5006D illustrated in FIG. 6S. In the depicted embodiment, content 5114 for *Romeo and Juliet* illustrated in FIG. 6S and content 5164 illustrated in FIG. 6T were both written by William Shakespeare. Allowing the user to perform simple gestures to quickly scroll through different content increases the user's efficiency and improves the human-machine interface. Allowing the user to select a content affordance and displaying the corresponding content enables the user to quickly and efficiently navigate through different content without having to navigate to extraneous user interfaces, thereby reducing the cognitive burden on the user and improving human-machine interface. For battery-operated computing devices, allowing the user to navigate through different content faster and more efficiently conserves power and increases the time between battery charges.

In some embodiments, the device, in response to detecting the selection of the second content affordance, obtains (728) content associated with the second content affordance, overlays (728) a content user interface on top of a portion of the first content, and displays (728) a portion of content associated with the second content affordance in the content user interface. FIG. 6AE, for example, shows displaying second portion 5116B of content 5116 for *The Count of Monte Cristo* in content information user interface 5014. Further, second portion 5116B of content 5116 contains a content affordance 5009A for *The Three Musketeers*. FIG. 6AE also shows detecting a tap gesture with contact 5614 over content affordance 5009A to select content affordance 5009A. FIG. 6AF illustrates overlaying a portion of content 5116 with user interface 5019 and displaying first portion 5166A of content 5166 for *The Three Musketeers* in user interface 5019. In one or more embodiments, content 5112 for *The Art of War* illustrated in FIG. 6B also contains a second content affordance (not shown). Moreover, selection of the second content affordance would cause device to overlay user interface 5019 over a portion of content 5112. Displaying content associated with the selected content affordance in another user interface allows the user to easily navigate between different user interfaces to view different content, thereby reducing the cognitive burden on the user and improving human-machine interface. Displaying content affordances associated with related content that the user may be interested in also reduces the cognitive burden on the user to manually search for content. The foregoing also reduces the number of extraneous inputs required for the user to manually search for content. The foregoing also reduces a need for the user to contact a third party to obtain suggestions on similar content, thereby freeing up communications systems, reducing bandwidth on networks, and preserving energy. For battery-operated computing devices, allowing the user to navigate through different content faster and more efficiently conserves power and increases the time between battery charges.

In some embodiments, the device, after scrolling the first content to reveal the second portion of the first content, and in response to detecting the second movement of the contact after the determination that the scrolling of the first content met the content locking criteria, overlays (730) the second portion of the first content with a content user interface. In some embodiments, the device displays (730) additional content associated with the first content in the content user interface overlaid on top of the second portion of the first content. In one embodiment, device 100, in response to detecting the swipe gesture with contact 5511 illustrated in FIG. 6P from position 5511A to position 5511B, overlays a user interface, such as user interface 5018 illustrated in FIGS. 6G-6I, on a portion of content information user interface 5014, where user interface 5018 covers a portion of content 5114 for *Romeo and Juliet* that is displayed in content information user interface 5014. In one embodiment, device 100 displays additional content associated with content 5114, such as content about other books written by William Shakespeare or content affordances associated with content about other books written by William Shakespeare. In other embodiments, where a second portion of content 5112 for *The Art of War* is displayed in content information user interface 5014, device 100, in response to detecting a swipe gesture similar to the swipe gesture with contact 5511 in FIG. 6P from position 5511A to position 5511B, overlays user interface 5018 on a portion of content 5112 and displays additional content containing information about other books written by Sun Tzu, or additional content about other books in the military strategy genre in user interface 5018.

Displaying additional content affordances in another user interface while the content locking criteria have been met allows the user to view additional content affordances associated with related content without having to perform one or more gestures to satisfy the content unlocking criteria, thereby reducing the cognitive burden on the user and improving human-machine interface. Displaying content affordances associated with related content that the user may be interested in without having to access another user interface also reduces the cognitive burden on the user to manually search for content. The foregoing also reduces the number of extraneous inputs required for the user to manually search for content. The foregoing also reduces a need for the user to contact a third party to obtain suggestions on similar content, thereby freeing up communications systems, reducing bandwidth on networks, and preserving energy. For battery-operated computing devices, allowing the user to navigate through different content faster and more efficiently conserves power and increases the time between battery charges.

In some embodiments, while the content user interface is overlaid on top of the second portion of the first content, the device detects (732) a selection of a region of the display that does not display the content user interface. FIG. 6AF, for example, shows detecting the tap gesture with contact 5616 over a region not covered by user interface 5019. In some embodiments, the device, in response to detecting a selection of a region of the display that does not display the content user interface, ceases (732) to display the overlay of the content user interface. FIG. 6AG, for example, shows the removal of user interface 5019 in response to detecting inputs including the tap gesture with contact 5616 illustrated in FIG. 6AF. Allowing the user to perform a tap gesture in a region of the display not covered by the content user interface to remove the overlay reduces the cognitive burden on the user by providing the user with a simple solution to remove the overlay. Providing the user with an option to perform a tap gesture to navigate between different user interfaces also allows the user to quickly navigate between different user interfaces, thereby creating a more efficient human-machine interface. For battery-operated computing devices, allowing the user to navigate between different user interfaces faster and more efficiently conserves power and increases the time between battery charges.

In some embodiments, the locking criteria include a criterion that is met when the scrolling of the first content comprises two discrete vertical scrolls within a predetermined period of time and in the fourth direction (734). In some embodiments, the fourth direction is an upward direction. FIGS. 6L-6O, for example, show swipe gestures with contact 5509 from position 5509A to position 5509B and with contact 5510 from position 5510A to 5510B are performed within a period of time. In one or more of such embodiments, a locking criterion of the locking criteria is met in response to detecting inputs such as the swipe gestures shown in FIGS. 6L-6O, or similar gestures that include at least the same amount of movement over display 112. Alternatively, the aforementioned period of time may be dynamically determined based on a user's interaction with the device. Designating a specific timed sequence of gestures as a criterion for satisfying content locking criteria reduces the likelihood that unintentional gestures would lock a user interface, such as content information user interface 5014 illustrated in FIG. 6B, thereby reducing the cognitive burden on the user. Allowing the user to perform two discrete vertical scrolls to satisfy a content locking criterion also enables the user to perform simple gestures to lock the user interface also creates a more efficient human-machine interface. For battery-operated computing devices, allowing the user to lock a user interface faster and more efficiently conserves power and increases the time between battery charges.

In some embodiments, the device, after determining that the scrolling of the first content met content locking criteria, detects (736) inputs indicative of a second scrolling of the first content, where the second scrolling of the first content comprises two discrete vertical scrolls within a second predetermined period of time and in a fifth direction opposite the fourth direction. In some embodiments, the fifth direction is a downward direction. FIGS. 6X and 6Y, for example, show detecting inputs indicative of a downward swipe gesture with contact 5516 from position 5516A to position 5516B to unlock content information user interface 5014. In one or more embodiments, two discrete downward swipe gestures are performed within a period of time in lieu of the gesture with contact 5516 from position 5516A to 5516B to unlock content information user interface 5014. Alternatively, the aforementioned period of time may be dynamically determined based on a user's interaction with the device.

In some embodiments, the device, in response to detecting the second movement of a contact after determining that the content unlocking criteria are met, switches (736) from displaying the first content in the respective region of the display to displaying the second content in the respective region of the display. In some embodiments, the content unlocking criteria include a criterion that is met when the first content comprises two discrete vertical scrolls within the predetermined period of time and in the fifth direction. FIG. 6V, for example, shows displaying second portion 5164B of content 5164 for *Hamlet* while content information user interface 5014 is locked. In one or more embodiments, two or more discrete downward swipe gestures are performed within a period of time to unlock content information user interface 5014. Further, in one or more of such embodiments, second portion 5114B of content 5114 for *Romeo and Juliet* is re-displayed in content information user interface 5014 in response to detecting the downward swipe gesture (or gestures) that include (or collectively include) the threshold amount of movement. Alternatively, the aforementioned periods of time may be dynamically determined based on a user's interaction with the device. Designating a specific timed sequence of gestures as a criterion for satisfying content unlocking criteria reduces the likelihood that unintentional gestures would unlock a locked user interface, such as content information user interface 5014 illustrated in FIG. 6P, thereby reducing the cognitive burden on the user. Allowing the user to perform two discrete vertical scrolls to satisfy a content unlocking criterion also enables the user to perform simple gestures to unlock the locked user interface, thereby creating a more efficient human-machine interface. For battery-operated computing devices, allowing the user to unlock a locked user interface faster and more efficiently conserves power and increases the time between battery charges.

In some embodiments, the device (e.g., device 100, FIG. 6A) displays (738) a content preview affordance in a parent user interface. FIG. 6A, for example, shows the device displaying content preview affordance 5004A in parent user interface 5002. In the embodiment of FIG. 6A, content preview affordance 5004A is a product affordance associated with content containing information about *The Art of War*.

In some embodiments, the device detects (738) a selection of the first content preview affordance. FIG. 6A, for example, shows detection of a tap gesture with contact 5602 over content preview affordance 5004A for *The Art of War*. In other embodiments, the device detects an input including a tap gesture with contact on another content preview affordance (such as content preview affordance 5004B for *Romeo and Juliet* or content preview affordance 5004C for *The Count of Monte Cristo*) of scrollable set of content preview affordances 5004 illustrated in FIG. 6A.

In some embodiments, the device, in response to detecting a selection of the first content preview affordance, overlays (738) the parent user interface with a content information user interface. FIG. 6B, for example, shows content information user interface 5014 overlaid on a portion of parent user interface 5002 illustrated in FIG. 6A. In such embodiments, displaying the first portion of first content in the respective region of the display includes displaying the first portion of the first content in the content information user interface. FIG. 6B, for example, shows displaying first portion 5112A of content 5112 for *The Art of War* in content information user interface 5014. Displaying a scrollable set of content preview affordances allows the user to quickly scroll through content preview affordances associated with related content that user may be interested in viewing, thereby creating a more efficient-human-machine interface. Allowing the user to quickly scroll through content preview affordances associated with related content that the user may be interested in without having to access another user interface also reduces the cognitive burden on the user to manually search for content. The foregoing also reduces the number of extraneous inputs required for the user to manually search for content. The foregoing also reduces a need for the user to contact a third party to obtain suggestions on similar content, thereby freeing up communications systems, reducing bandwidth on networks, and preserving energy. For battery-operated computing devices, providing the user with suggested content and allowing the user to navigate through the suggested content faster and more efficiently conserves power and increases the time between battery charges.

In some embodiments, the device displays (740) a scrollable set of content preview affordances in the parent user interface, where the first content preview affordance is one content preview affordance of the scrollable set of content preview affordance. FIG. 6A, for example, shows device 100 concurrently displaying content preview affordance 5004A for *The Art of War*, content preview affordance 5004B for *Romeo and Juliet*, and a portion of content preview affordance 5004C for *The Count of Monte Cristo*. In the depicted embodiment, each of content preview affordances 5004A-5004C is a representation of a book recommended for the user. Moreover, content preview affordances 5004A-5004C form scrollable set of content preview affordances 5004.

In some embodiments, the device detects (740) a fourth movement of the contact on the parent user interface displayed on the touch-sensitive surface. In one or more embodiments, the fourth movement of the contact is a left swipe gesture such as the left swipe gesture from position 5502A to position 5502B in FIG. 6A. In some embodiments, the device, in accordance with a determination that the scrollable set of content preview affordances is selected, scrolls (740) the scrollable set of content preview affordances, where scrolling the scrollable set of content preview affordances replaces a displayed first content preview affordance with a displayed second content preview affordance of the scrollable set of content preview affordances in the parent user interface. FIG. 6A, for example, shows scrolling scrollable set of content preview affordances 5004 in response to detecting the left swipe that includes movement of contact 5502 from position 5502A to position 5502B. Although FIG. 6A illustrates concurrently displaying content preview affordance 5004A for *The Art of War*, content preview affordance 5004B for *Romeo and Juliet*, and a portion of content preview affordance 5004C for *The Count of Monte Cristo*, in some embodiments, only two content preview affordances (such as content preview affordances 5004A and 5004B) are concurrently displayed in parent user interface 5002. In such embodiments, a swipe gesture similar to the swipe gesture shown in FIG. 6A would cause device 100 to replace display of content preview affordance 5004A with content preview affordance 5004C. In further embodiments, only one content preview affordance of scrollable set of content preview affordances 5004 is displayed in parent user interface 5002 at a time. Allowing the user to quickly scroll through different content preview affordances that are associated with different content allows the user to easily access previews of different content that the user may be interested in, thereby reducing the cognitive burden on the user. The foregoing also creates a more efficient human-machine interface. For battery-operated computing devices, allowing the user to navigate between different content preview affordances faster and more efficiently conserves power and increases the time between battery charges.

In one or more embodiments, the first content and the second content are two of a set of content displayed in the content information user interface. In some embodiments, the scrollable set of content preview affordances displayed in the parent user interface and the set of content displayed in the content information user interface are displayed in the same order (742). FIGS. 6B-6E for example, show content 5112 for *The Art of War*, content 5114 for *Romeo and Juliet*, and content 5116 for *The Count of Monte Cristo* as consecutively ordered content of the scrollable set of content containing content 5112, content 5114, and content 5116. Similarly, FIG. 6A shows content preview affordance 5004A for *The Art of War*, content preview affordance 5004B for *Romeo and Juliet*, and content preview affordance 5004C for *The Count of Monte Cristo* as consecutively ordered content preview affordances of scrollable set of content preview affordances 5004. Arranging content preview affordances and corresponding content in the same order reduces the cognitive burden on the user while scrolling through the content preview affordances and corresponding content. More particularly, the foregoing allows the user to select a content preview affordance to view a corresponding content without having to determine whether the arrangement of the selected content preview affordance with respect to other content preview affordances of the scrollable set of content preview affordances is different from the arrangement of the corresponding content with respect to other content of the scrollable set of content. For battery-operated computing devices, allowing the user to navigate between different user interfaces faster and more efficiently conserves power and increases the time between battery charges.

In some embodiments, while the content information user interface is overlaid on top of the parent user interface, the device (744) detects a selection of a region of the display that does not display the content information user interface. Each of FIGS. 6B-6L, 6T, 6Z, and 6AA-6AG shows a region of the display that does not display content information user interface 5014. FIG. 6AF also illustrates detection of a tap gesture with contact 5616 over a region of the display that does not display content information user interface 5014. In some embodiments, the device, in response to detecting a selection of a region of the display that does not display the content information user interface, removes (744) the overlay of the content information user interface. In some embodiments, the device, upon detecting a tap gesture with contact on a region of parent user interface 5002 of FIG. 6A not covered by content information user interface 5014, removes the overlay of content information user interface 5014. In one or more of such embodiments, parent user interface 5002 of FIG. 6A is displayed once the overlay of content information user interface 5014 is removed. Allowing the user to perform a tap gesture in a region of the display not covered by a content information user interface to remove the overlay of the content information user interface reduces the cognitive burden on the user by providing the user with a simple solution to remove the overlay. Providing the user with an option to perform a tap gesture to navigate between different user interfaces also allows the user to quickly navigate between different user interfaces, thereby creating a more efficient human-machine interface. For battery-operated computing devices, allowing the user to navigate between different user interfaces faster and more efficiently conserves power and increases the time between battery charges.

In some embodiments, the device displays (746) an indication of the parent user interface in a region of the display that does not display the content information user interface.

FIG. 6B, for example, shows a background image 5802 displayed in parent user interface 5002 of FIG. 6A, where background image 5802 is also displayed in a region of display 112 above content information user interface 5014. In other embodiments, the indication of parent user interface 5002 includes text displayed in parent user interface 5002. Providing an indication of the parent user interface in a region of the display that is not covered by the content information user interface allows the user to keep track of different user interfaces that are (or were) displayed on the display, thereby reducing the cognitive burden on the user and creating a more efficient human-machine interface. In some embodiments, where the user may select the indication of the parent user interface to access the parent user interface, the indication also allows the user to efficiently navigate from the content information user interface to the parent user interface, thereby creating a more efficient human-machine interface. For battery-operated computing devices, enabling a user to navigate between different user interfaces faster and more efficiently conserves power and increases the time between battery charges.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method, comprising:
    at an electronic device with a display and a touch-sensitive surface:
        displaying a first portion of first content in a respective region of the display, wherein the first content is associated with second content that is not displayed on the display;
        while displaying the first portion of the first content, detecting first movement of a first contact on the touch-sensitive surface that includes movement in a respective direction;
        in response to detecting the first movement of the first contact on the touch-sensitive surface:
            in accordance with a determination that the respective direction of the first movement of the first contact is a first direction, scrolling the first content in the respective region of the display based on the first movement of the first contact to reveal a second portion of the first content that was not displayed in the respective region of the display prior to detecting the first movement of the first contact, wherein an amount of scrolling of the first content is determined based on an amount of movement of the first contact in the first direction during the first movement of the first contact;

in accordance with a determination that the respective direction of the first movement of the first contact is a second direction, different from the first direction, scrolling the first content in the respective region of the display based on the first movement of the first contact, wherein an amount of scrolling of the first content is determined based on an amount of movement of the first contact in the second direction during the first movement of the first contact;

after scrolling the first content based on the amount of movement of the first contact in the respective direction of the first movement of the first contact to reveal the second portion of the first content, detecting second movement of a second contact on the touch-sensitive surface that includes more than a threshold amount of movement in a third direction that is perpendicular to the first direction; and in response to detecting the second movement of the second contact:

in accordance with a determination that the scrolling of the first content based on the first movement of the first contact did not meet content unlocking criteria, wherein the content unlocking criteria include a requirement that the second portion of the first content include a predetermined portion of the first content, maintaining display of the second portion of the first content in the respective region of the display without displaying the second content or another portion of the first content not displayed in the respective region after detection of the first movement of the first contact in the respective region of the display; and in accordance with a determination that the scrolling of the first content based on the movement of the first contact did meet the content unlocking criteria, switching from displaying the first content in the respective region of the display to displaying the second content in the respective region of the display.

2. The method of claim 1, further comprising:

while displaying the second portion of the first content, detecting third movement of a third contact on the touch-sensitive surface that includes movement in a third direction opposite the first direction;

in response to detecting the third movement of the third contact on the touch-sensitive surface, scrolling the first content in the respective region of the display; and in response to detecting the second movement of the second contact after detecting the third movement of the third contact:

in accordance with a determination that the scrolling of the first content in response to detecting the third movement of the third contact did not meet content locking criteria, wherein the content locking criteria include a requirement that the first content is scrolled by more than a predetermined amount in the third direction opposite the first direction, switching from displaying the first content in the respective region of the display to displaying the second content in the respective region of the display; and in accordance with a determination that the scrolling of the first content did meet the content locking criteria, maintaining display of the first content in the respective region of the display without displaying the second content in the respective region of the display.

3. The method of claim 1, wherein the second portion of the first content comprises a scrollable set of content affordances, wherein a first content affordance of the scrollable set of content affordances is displayed in a second respective region of the display, and wherein the method further comprises, in response to detecting the second movement of the second contact, and in accordance with a determination that the scrollable set of content affordances is selected, scrolling the scrollable set of content affordances, wherein scrolling the scrollable set of content affordances replaces displaying the first content affordance in the second respective region of the display with displaying a second content affordance of the scrollable set of content affordances in the second respective region of the display, and wherein the second content affordance was not displayed in the second respective region prior to detecting the second movement of the second contact.

4. The method of claim 3, further comprising:

detecting a selection of the second content affordance; and in response to detecting the selection of the second content affordance, displaying a portion of content associated with the second content affordance in the respective region of the display.

5. The method of claim 3, further comprising:

detecting a selection of the second content affordance;

in response to detecting the selection of the second content affordance, obtaining content associated with the second content affordance;

overlaying a content user interface on top of a portion of the first content; and displaying a portion of content associated with the second content affordance in the content user interface.

6. The method of claim 1, further comprising:

displaying a first content preview affordance in a parent user interface;

detecting a selection of the first content preview affordance; and in response to detecting a selection of the first content preview affordance, overlaying the parent user interface with a content information user interface, wherein displaying the first portion of first content in the respective region of the display comprises displaying the first portion of the first content in the content information user interface after detecting a respective input scrolling the first content in a third direction, opposite the first direction.

7. The method of claim 6, further comprising:

displaying a scrollable set of content preview affordances in the parent user interface, wherein the first content preview affordance is one content preview affordance of the scrollable set of content preview affordances;

detecting fourth movement of a third contact on the touch-sensitive surface; and in response to detecting the fourth movement of the third contact, in accordance with a determination that the scrollable set of content preview affordances is selected, scrolling the scrollable set of content preview affordances, wherein scrolling the scrollable set of content preview affordances replaces displaying the first content preview affordance with displaying a second content preview affordance of the scrollable set of content preview affordances in the parent user interface.

8. The method of claim 6, further comprising:

displaying a scrollable set of content preview affordances in the parent user interface, wherein the first content and the second content are two of a set of content displayed in the content information user interface, and wherein the scrollable set of content preview affordances displayed in the parent user interface and the set of content displayed in the content information user interface are displayed in a same order.

9. The method of claim 6, further comprising:
while the content information user interface is overlaid on top of the parent user interface, detecting a selection of a region of the display that does not display the content information user interface; and
in response to detecting a selection of a region of the display that does not display the content information user interface, removing the overlay of the content information user interface.

10. The method of claim 6, further comprising displaying an indication of the parent user interface in a region of the display that does not display the content information user interface.

11. The method of claim 1, further comprising:
displaying a content information user interface on the display, wherein the first content is displayed in the content information user interface; and
in response to scrolling the first content in the respective region of the display to reveal the first portion of the first content, expanding dimensions of the content information user interface.

12. The method of claim 11, further comprising:
in response to scrolling the first content in the respective region of the display to reveal the first portion of the first content, expanding the dimensions of the content information user interface if dimensions of the display is less than a predetermined display area.

13. The method of claim 1, further comprising:
after scrolling the first content to reveal the second portion of the first content, and in response to detecting the second movement of the second contact after the determination that the scrolling of the first content did not meet the content unlocking criteria, overlaying the second portion of the first content with a content user interface; and
displaying additional content associated with the first content in the content user interface overlaid on top of the second portion of the first content.

14. The method of claim 13, further comprising:
while the content user interface is overlaid on top of the second portion of the first content, detecting a selection of a region of the display that does not display the content user interface; and
in response to detecting a selection of a region of the display that does not display the content user interface, ceasing to display the overlay of the content user interface.

15. The method of claim 1, wherein the content unlocking criteria include a criterion that is met when the scrolling of the first content comprises two discrete vertical scrolls within a predetermined period of time and in a fourth direction.

16. The method of claim 15, further comprising:
after determining that the scrolling of the first content met the content unlocking criteria, detecting inputs indicative of a second scrolling of the first content, wherein the second scrolling of the first content comprises two discrete vertical scrolls within a second predetermined period of time and in a fifth direction opposite the fourth direction, and
in response to detecting the second movement of the second contact after determining that content locking criteria are met, wherein content locking criteria include a criterion that is met when the second scrolling comprises two discrete vertical scrolls within the predetermined period of time and in the fifth direction, maintaining display of the first content in the respective region of the display without displaying the second content in the respective region of the display.

17. The method of claim 1, wherein movement in the first direction comprises movement along a vertical direction with respect to an orientation of a displayed user interface, and movement in the second direction includes movement along a horizontal direction with respect to the orientation of the displayed user interface.

18. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
displaying a first portion of first content in a respective region of the display, wherein the first content is associated with second content that is not displayed on the display;
while displaying the first portion of the first content, detecting first movement of a first contact on the touch-sensitive surface that includes movement in a respective direction;
in response to detecting the first movement of the first contact on the touch-sensitive surface:
in accordance with a determination that the respective direction of the first movement of the first contact is a first direction, scrolling the first content in the respective region of the display based on the first movement of the first contact to reveal a second portion of the first content that was not displayed in the respective region of the display prior to detecting the first movement of the first contact, wherein an amount of scrolling of the first content is determined based on an amount of movement of the first contact in the first direction during the first movement of the first contact;
in accordance with a determination that the respective direction of the first movement of the first contact is a second direction, different from the first direction, scrolling the first content in the respective region of the display based on the first movement of the first contact, wherein an amount of scrolling of the first content is determined based on an amount of movement of the first contact in the second direction during the first movement of the first contact;
after scrolling the first content based on the amount of movement of the first contact in the respective direction of the first movement of the first contact to reveal the second portion of the first content, detecting second movement of a second contact on the touch-sensitive surface that includes more than a threshold amount of movement in a third direction that is perpendicular to the first direction; and
in response to detecting the second movement of the second contact:
in accordance with a determination that the scrolling of the first content based on the first movement of the first contact did not meet content unlocking criteria, wherein the content unlocking criteria include a requirement that the second portion of the first content include a predetermined portion of the first content, maintaining display of the second portion of the first content in the respective region of the display without displaying the second content or another portion of the first content not displayed in the respective region after detection of the first movement of the first contact in the respective region of the display; and in accordance with a determination that the scrolling of the first content based on the movement of the first contact did meet the content unlocking criteria, switching from displaying the first content in the respective region of the display to displaying the second content in the respective region of the display.

19. The electronic device of claim 18, wherein the one or more programs further include instructions for:

while displaying the second portion of the first content, detecting third movement of a third contact on the touch-sensitive surface that includes movement in a third direction opposite the first direction;

in response to detecting the third movement of the third contact on the touch-sensitive surface, scrolling the first content in the respective region of the display; and in response to detecting the second movement of the second contact after detecting the third movement of the third contact:

in accordance with a determination that the scrolling of the first content in response to detecting the third movement of the third contact did not meet content locking criteria, wherein the content locking criteria include a requirement that the first content is scrolled by more than a predetermined amount in the third direction opposite the first direction, switching from displaying the first content in the respective region of the display to displaying the second content in the respective region of the display; and in accordance with a determination that the scrolling of the first content did meet the content locking criteria, maintaining display of the first content in the respective region of the display without displaying the second content in the respective region of the display.

20. The electronic device of claim 18, wherein the second portion of the first content comprises a scrollable set of content affordances, wherein a first content affordance of the scrollable set of content affordances is displayed in a second respective region of the display, and wherein the one or more programs further include instructions for, in response to detecting the second movement of the second contact, and in accordance with a determination that the scrollable set of content affordances is selected, scrolling the scrollable set of content affordances, wherein scrolling the scrollable set of content affordances replaces displaying the first content affordance in the second respective region of the display with displaying a second content affordance of the scrollable set of content affordances in the second respective region of the display, and wherein the second content affordance was not displayed in the second respective region prior to detecting the second movement of the second contact.

21. The electronic device of claim 20, wherein the one or more programs further include instructions for:

detecting a selection of the second content affordance; and in response to detecting the selection of the second content affordance, displaying a portion of content associated with the second content affordance in the respective region of the display.

22. The electronic device of claim 20, wherein the one or more programs further include instructions for:

detecting a selection of the second content affordance;

in response to detecting the selection of the second content affordance, obtaining content associated with the second content affordance;

overlaying a content user interface on top of a portion of the first content; and displaying a portion of content associated with the second content affordance in the content user interface.

23. The electronic device of claim 18, wherein the one or more programs further include instructions for:

displaying a first content preview affordance in a parent user interface;

detecting a selection of the first content preview affordance; and in response to detecting a selection of the first content preview affordance, overlaying the parent user interface with a content information user interface, wherein displaying the first portion of first content in the respective region of the display comprises displaying the first portion of the first content in the content information user interface after detecting a respective input scrolling the first content in a third direction, opposite the first direction.

24. The electronic device of claim 23, wherein the one or more programs further include instructions for:

displaying a scrollable set of content preview affordances in the parent user interface, wherein the first content preview affordance is one content preview affordance of the scrollable set of content preview affordances;

detecting fourth movement of a third contact on the touch-sensitive surface; and in response to detecting the fourth movement of the third contact, in accordance with a determination that the scrollable set of content preview affordances is selected, scrolling the scrollable set of content preview affordances, wherein scrolling the scrollable set of content preview affordances replaces displaying the first content preview affordance with displaying a second content preview affordance of the scrollable set of content preview affordances in the parent user interface.

25. The electronic device of claim 23, wherein the one or more programs further include instructions for:

displaying a scrollable set of content preview affordances in the parent user interface, wherein the first content and the second content are two of a set of content displayed in the content information user interface, and wherein the scrollable set of content preview affordances displayed in the parent user interface and the set of content displayed in the content information user interface are displayed in a same order.

26. The electronic device of claim 23, wherein the one or more programs further include instructions for:

while the content information user interface is overlaid on top of the parent user interface, detecting a selection of a region of the display that does not display the content information user interface; and in response to detecting a selection of a region of the display that does not display the content information user interface, removing the overlay of the content information user interface.

27. The electronic device of claim 23, wherein the one or more programs further include instructions for displaying an indication of the parent user interface in a region of the display that does not display the content information user interface.

28. The electronic device of claim 18, wherein the one or more programs further include instructions for:
  displaying a content information user interface on the display, wherein the first content is displayed in the content information user interface; and
  in response to scrolling the first content in the respective region of the display to reveal the first portion of the first content, expanding dimensions of the content information user interface.

29. The electronic device of claim 28, wherein the one or more programs further include instructions for:
  in response to scrolling the first content in the respective region of the display to reveal the first portion of the first content, expanding the dimensions of the content information user interface if dimensions of the display is less than a predetermined display area.

30. The electronic device of claim 18, wherein the one or more programs further include instructions for:
  after scrolling the first content to reveal the second portion of the first content, and in response to detecting the second movement of the second contact after the determination that the scrolling of the first content did not meet the content unlocking criteria, overlaying the second portion of the first content with a content user interface; and
  displaying additional content associated with the first content in the content user interface overlaid on top of the second portion of the first content.

31. The electronic device of claim 30, wherein the one or more programs further include instructions for:
  while the content user interface is overlaid on top of the second portion of the first content, detecting a selection of a region of the display that does not display the content user interface; and
  in response to detecting a selection of a region of the display that does not display the content user interface, ceasing to display the overlay of the content user interface.

32. The electronic device of claim 18, wherein the content unlocking criteria include a criterion that is met when the scrolling of the first content comprises two discrete vertical scrolls within a predetermined period of time and in a fourth direction.

33. The electronic device of claim 32, wherein the one or more programs further include instructions for:
  after determining that the scrolling of the first content met the content unlocking criteria, detecting inputs indicative of a second scrolling of the first content, wherein the second scrolling of the first content comprises two discrete vertical scrolls within a second predetermined period of time and in a fifth direction opposite the fourth direction, and
  in response to detecting the second movement of the second contact after determining that content locking criteria are met, wherein content locking criteria include a criterion that is met when the second scrolling comprises two discrete vertical scrolls within the predetermined period of time and in the fifth direction, maintaining display of the first content in the respective region of the display without displaying the second content in the respective region of the display.

34. The electronic device of claim 18, wherein movement in the first direction comprises movement along a vertical direction with respect to an orientation of a displayed user interface, and movement in the second direction includes movement along a horizontal direction with respect to the orientation of the displayed user interface.

35. A non-transitory computer readable storage medium storing one or more programs, the one or more programs comprising instructions which, when executed by one or more processors of an electronic device with a display and a touch-sensitive surface, cause the electronic device to:
  display a first portion of first content in a respective region of the display, wherein the first content is associated with second content that is not displayed on the display;
  while displaying the first portion of the first content, detect first movement of a first contact on the touch-sensitive surface that includes movement in a respective direction;
  in response to detecting the first movement of the first contact on the touch-sensitive surface:
    in accordance with a determination that the respective direction of the first movement of the first contact is a first direction, scroll the first content in the respective region of the display based on the first movement of the first contact to reveal a second portion of the first content that was not displayed in the respective region of the display prior to detecting the first movement of the first contact, wherein an amount of scrolling of the first content is determined based on an amount of movement of the first contact in the first direction during the first movement of the first contact;
    in accordance with a determination that the respective direction of the first movement of the first contact is a second direction, different from the first direction, scrolling the first content in the respective region of the display based on an amount of movement of the first contact in the second direction during the first movement of the first contact;
  after scrolling the first content based on the amount of movement of the first contact in the respective direction of the first movement of the first contact to reveal the second portion of the first content, detect second movement of a second contact on the touch-sensitive surface that includes more than a threshold amount of movement in a third direction that is perpendicular to the first direction; and
  in response to detecting the second movement of the second contact:
    in accordance with a determination that the scrolling of the first content based on the first movement of the first contact did not meet content unlocking criteria, wherein the content unlocking criteria include a requirement that the second portion of the first content include a predetermined portion of the first content, maintain display of the second portion of the first content in the respective region of the display without displaying the second content or another portion of the first content not displayed in the respective region after detection of the first movement of the first contact in the respective region of the display; and
    in accordance with a determination that the scrolling of the first content based on the movement of the first contact did meet the content unlocking criteria, switch from displaying the first content in the respective region of the display to displaying the second content in the respective region of the display.

36. The non-transitory computer readable storage medium of claim 35, wherein the instructions, when executed by the one or more processors of the electronic device, further cause the electronic device to:
  while displaying the second portion of the first content, detect third movement of a third contact on the touch-sensitive surface that includes movement in a third direction opposite the first direction;
  in response to detecting the third movement of the third contact on the touch-sensitive surface, scroll the first content in the respective region of the display; and
  in response to detecting the second movement of the second contact after detecting the third movement of the third contact:
  in accordance with a determination that the scrolling of the first content in response to detecting the third movement of the third contact did not meet content locking criteria, wherein the content locking criteria include a requirement that the first content is scrolled by more than a predetermined amount in the third direction opposite the first direction, switch from displaying the first content in the respective region of the display to displaying the second content in the respective region of the display; and
  in accordance with a determination that the scrolling of the first content did meet the content locking criteria, maintain display of the first content in the respective region of the display without displaying the second content in the respective region of the display.

37. The non-transitory computer readable storage medium of claim 35, wherein the second portion of the first content comprises a scrollable set of content affordances, wherein a first content affordance of the scrollable set of content affordances is displayed in a second respective region of the display, and wherein the instructions, when executed by the one or more processors of the electronic device, further cause the electronic device to, in response to detecting the second movement of the second contact, and in accordance with a determination that the scrollable set of content affordances is selected, scroll the scrollable set of content affordances, wherein scrolling the scrollable set of content affordances replaces displaying the first content affordance in the second respective region of the display with displaying a second content affordance of the scrollable set of content affordances in the second respective region of the display, and wherein the second content affordance was not displayed in the second respective region prior to detecting the second movement of the second contact.

38. The non-transitory computer readable storage medium of claim 37, wherein the instructions, when executed by the one or more processors of the electronic device, further cause the electronic device to:
  detect a selection of the second content affordance; and
  in response to detecting the selection of the second content affordance, display a portion of content associated with the second content affordance in the respective region of the display.

39. The non-transitory computer readable storage medium of claim 37, wherein the instructions, when executed by the one or more processors of the electronic device, further cause the electronic device to:
  detect a selection of the second content affordance;
  in response to detecting the selection of the second content affordance, obtain content associated with the second content affordance;
  overlay a content user interface on top of a portion of the first content; and
  display a portion of content associated with the second content affordance in the content user interface.

40. The non-transitory computer readable storage medium of claim 35, wherein the instructions, when executed by the one or more processors of the electronic device, further cause the electronic device to:
  display a first content preview affordance in a parent user interface;
  detect a selection of the first content preview affordance; and
  in response to detecting a selection of the first content preview affordance, overlay the parent user interface with a content information user interface,
  wherein displaying the first portion of first content in the respective region of the display comprises displaying the first portion of the first content in the content information user interface after detecting a respective input scrolling the first content in a third direction, opposite the first direction.

41. The non-transitory computer readable storage medium of claim 40, wherein the instructions, when executed by the one or more processors of the electronic device, further cause the electronic device to:
  display a scrollable set of content preview affordances in the parent user interface, wherein the first content preview affordance is one content preview affordance of the scrollable set of content preview affordances;
  detect fourth movement of a third contact on the touch-sensitive surface; and
  in response to detecting the fourth movement of the third contact, in accordance with a determination that the scrollable set of content preview affordances is selected, scroll the scrollable set of content preview affordances, wherein scrolling the scrollable set of content preview affordances replaces displaying the first content preview affordance with displaying a second content preview affordance of the scrollable set of content preview affordances in the parent user interface.

42. The non-transitory computer readable storage medium of claim 40, wherein the instructions, when executed by the one or more processors of the electronic device, further cause the electronic device to:
  display a scrollable set of content preview affordances in the parent user interface, wherein the first content and the second content are two of a set of content displayed in the content information user interface, and wherein the scrollable set of content preview affordances displayed in the parent user interface and the set of content displayed in the content information user interface are displayed in a same order.

43. The non-transitory computer readable storage medium of claim 40, wherein the instructions, when executed by the one or more processors of the electronic device, further cause the electronic device to:
  while the content information user interface is overlaid on top of the parent user interface, detect a selection of a region of the display that does not display the content information user interface; and
  in response to detecting a selection of a region of the display that does not display the content information user interface, remove the overlay of the content information user interface.

44. The non-transitory computer readable storage medium of claim 40, wherein the instructions, when executed by the one or more processors of the electronic device, further cause the electronic device to display an indication of the parent user interface in a region of the display that does not display the content information user interface.

45. The non-transitory computer readable storage medium of claim 35, wherein the instructions, when executed by the one or more processors of the electronic device, further cause the electronic device to:
  display a content information user interface on the display, wherein the first content is displayed in the content information user interface; and
  in response to scrolling the first content in the respective region of the display to reveal the first portion of the first content, expand dimensions of the content information user interface.

46. The non-transitory computer readable storage medium of claim 45, wherein the instructions, when executed by the one or more processors of the electronic device, further cause the electronic device to:
  in response to scrolling the first content in the respective region of the display to reveal the first portion of the first content, expand the dimensions of the content information user interface if dimensions of the display is less than a predetermined display area.

47. The non-transitory computer readable storage medium of claim 35, wherein the instructions, when executed by the one or more processors of the electronic device, further cause the electronic device to:
  after scrolling the first content to reveal the second portion of the first content, and in response to detecting the second movement of the second contact after the determination that the scrolling of the first content did not meet the content unlocking criteria, overlay the second portion of the first content with a content user interface; and
  display additional content associated with the first content in the content user interface overlaid on top of the second portion of the first content.

48. The non-transitory computer readable storage medium of claim 47, wherein the instructions, when executed by the one or more processors of the electronic device, further cause the electronic device to:
  while the content user interface is overlaid on top of the second portion of the first content, detect a selection of a region of the display that does not display the content user interface; and
  in response to detecting a selection of a region of the display that does not display the content user interface, cease to display the overlay of the content user interface.

49. The non-transitory computer readable storage medium of claim 35, wherein the content unlocking criteria include a criterion that is met when the scrolling of the first content comprises two discrete vertical scrolls within a predetermined period of time and in a fourth direction.

50. The non-transitory computer readable storage medium of claim 49, wherein the instructions, when executed by the one or more processors of the electronic device, further cause the electronic device to:
  after determining that the scrolling of the first content met the content unlocking criteria, detect inputs indicative of a second scrolling of the first content, wherein the second scrolling of the first content comprises two discrete vertical scrolls within a second predetermined period of time and in a fifth direction opposite the fourth direction, and
  in response to detecting the second movement of the second contact after determining that content locking criteria are met, wherein content locking criteria include a criterion that is met when the second scrolling comprises two discrete vertical scrolls within the predetermined period of time and in the fifth direction, maintain display of the first content in the respective region of the display without displaying the second content in the respective region of the display.

51. The non-transitory computer readable storage medium of claim 35, wherein movement in the first direction comprises movement along a vertical direction with respect to an orientation of a displayed user interface, and movement in the second direction includes movement along a horizontal direction with respect to the orientation of the displayed user interface.

* * * * *